United States Patent [19]

McLeod

[11] 3,932,339
[45] Jan. 13, 1976

[54] PRODUCT AND PROCESS

[75] Inventor: Gordon D. McLeod, Adrian, Mich.

[73] Assignee: G. D. McLeod & Sons, Incorporated, Adrian, Mich.

[22] Filed: Oct. 24, 1973

[21] Appl. No.: 409,067

Related U.S. Application Data

[63] Continuation-in-part of Ser. No. 283,964, Aug. 28, 1972, which is a continuation-in-part of Ser. No. 107,578, Jan. 18, 1971, abandoned, which is a continuation-in-part of Ser. No. 75,306, Sept. 24, 1970, abandoned.

[52] U.S. Cl. ............... 260/32.8 SB; 106/1; 106/14; 260/2 S; 260/33.4 SB; 260/33.6 SB; 260/37 SB; 260/46.5 P
[51] Int. Cl.² ......................................... C08K 5/07
[58] Field of Search ............ 106/14, 1; 260/448.8 R, 260/2 S, 33.4 SB, 33.6 SB, 32.8 SB

[56] References Cited
UNITED STATES PATENTS

| | | | |
|---|---|---|---|
| 2,027,931 | 1/1936 | Ray | 260/2 S X |
| 2,027,932 | 1/1936 | Ray | 260/2 S X |
| 2,630,446 | 3/1953 | Gresham | 260/2 S X |
| 3,489,709 | 1/1970 | Halsey | 260/33.4 SB |
| 3,653,930 | 4/1972 | Law et al. | 106/14 X |

*Primary Examiner*—Lewis T. Jacobs
*Attorney, Agent, or Firm*—Morton, Bernard, Brown, Roberts & Sutherland

[57] ABSTRACT

Protective coating compositions are prepared comprising aliphatic polyol-derived silicates and zinc dust as a filler. The compositions provide long-life protection for ferrous substrates against rusting in moist and salty atmospheres. The zinc filler and silicate components may be compounded in one package or as two packages to be mixed prior to application as a film. Compositions comprising zinc filler and the aliphatic polyol-derived silicates with solvents, and with or without other fillers or organic polymeric materials are especially useful as coatings. A range of aliphatic polyol to total alkyl-type or alkoxyalkyl-type silicate reacted in making the polyol-derived silicates is about 0.15 to 1.8 moles of reactive OH grouping supplied by the polyol per mole of ester-exchangeable group in the silicates, the larger ratios being especially useful for the silicate reactants having up to, for instance, an average of 5 to 6 $SiO_2$ groups per molecule and decreasing progressively as the

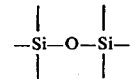

content increases. The preferred range of reactants provides about 0.35 to 1.5 moles of reactive OH grouping from the polyol per mole of ester-exchangeable groups of the silicate. The preferred silicate reactants have from 1 up to about 6 to 8 SiO groups per average molecule which corresponds to an extent of hydrolysis from 0% up to about 50%. Such hydrolysis may occur before or during the ester-exchange reaction which forms the aliphatic polyol-derived silicates of this invention. The polyol-derived silicates can also have other uses, e.g., as a binder for ceramic molding compositions using non-zinc fillers.

55 Claims, No Drawings

PRODUCT AND PROCESS

This application is a continuation-in-part of my application Ser. No. 283,964, filed Aug. 28, 1972, which, in turn, is a continuation-in-part of my application Ser. No. 107,578, filed Jan. 18, 1971, now abandoned, which, in turn, is a continuation-in-part of my application Ser. No. 75,306, filed Sept. 24, 1970, now abandoned.

The present invention relates to compositions which are particularly useful in coatings that can provide galvanic protection when cured on ferrous substrates. These coatings contain as essential ingredients solvent-soluble, aliphatic-polyol-derived silicate (hereinafter sometimes referred to as "polyol silicate") and metallic zinc filler in finely divided form. The invention is also directed to liquid solutions containing the polyol silicate and an organic solvent for the silicate which solvent is compatible therewith and does not cause the composition to rapidly gel or change greatly to produce an undesireable composition. Although these polyol silicates and their solutions may be used in various types of compositions, the invention especially combines metallic zinc-containing fillers with these materials to provide slurries or dispersions which are relatively stable as single component or single package coating compositions and which can be applied and cured as coatings on ferrous surfaces and thereby protect the substrates by galvanic action against the deteriorating effects of corrosive environments. Aside from the zinc filler, the compositions may preferably also contain other finely divided filler materials, and, in this regard, alumina in its various forms may be used to decrease the amount of zinc that might otherwise be required to provide satisfactory coatings. The addition to the compositions of this invention of weakly-basic, heterocyclic, unsaturated nitrogen compounds may serve to prevent agglomeration of the zinc dust particles during storage and to prevent gassing of the compositions. The polyol silicates and their solutions of this invention can also be used as ceramic molding compositions containing the various fillers disclosed herein, with or without metallic zinc.

Many of the polyol silicates of the present invention, when composited with finely divided metallic zinc-containing fillers, give relatively stable products which remain essentially ungelled and in usable condition over exceptionally long periods of time. These preferred products when kept in a moisture-tight and air-tight container, are stable for relatively long periods of time against substantial changes in properties, and are ready for easy use without further additions being necessary. Thus, these preferred compositions offer the great advantage of being single-component coating compositions which are more stable for longer periods of time than heretofore known alkyl silicate binder-containing coating compositions, and which can be readily applied to ferrous substrates and very rapidly self-cured under various atmospheric conditions — dry, rainy, cold or hot — to form rapidly upon curing strongly adherent, relatively hard, stable, galvanically-protective coatings.

The present invention is also directed to a variety of multiple package coating compositions of exceptional properties. In one of these, one package of the two-package system contains the polyol silicate, while the finely divided zinc is in another package. Either or both of these packages may contain additional ingredients, e.g., the polyol silicate may be dissolved in a solvent and contain a dispersed filler, and the zinc package may contain a variety of fillers, e.g. alumina. In another preferred form of the invention, one package designed to be added to a polyol silicate package, is comprised of finely divided zinc dispersed in an organic solvent, e.g. methyl ethyl ketone, and an acidic zinc salt such as zinc chloride, and this package may also contain one or more other fillers such as silica, zircon, clay, alumina, talc and the like. These ingredients, with or without the elemental zinc, may also serve as curing catalyst formulations when combined with silicate-type coating compositions, which may or may not contain elemental zinc. The zinc metal-containing filler package may be added to the polyol silicate package shortly before use. The compositions of this invention may also contain minor amounts of other ingredients such as organic polymers, e.g. polyvinyl materials, particularly those having reactive OH groups, for instance, polyvinyl butyral, preferably reacted with the polyol silicate to form stable, one package binders for zinc paint. All of the compositions of this invention may contain inorganic fillers, anti-sag agents, thickening agents, suspending agents and the like to stabilize, actuate or dilute the compositions and provide easy to use, preferably single package, zinc paints.

The present invention is further directed to certain of the polyol silicates which are novel products, and which in the most preferred form, can be employed in single-package, zinc-containing, galvanic coating compositions. By the present invention, I have also devised advantageous ways of making the polyol alkyl silicates which are essentially ester-exchange reaction products of ortho silicates and polyhydric alcohols, particularly the ester exchange products of ethylene glycol and lower alkyl and $C_3$ to $C_7$ alkoxyalkyl silicates, including their siloxane forms, preferably having up to about 8 SiO groups per average molecule. The products are useful in the single package, zinc-containing compositions of this invention, which can be stored in a container in ready-to-use condition.

I am aware that serious difficulties exist in making and using presently available galvanic coating compositions containing metallic zinc and inorganic silicate binders, and effort expended towards devising products containing an organic silicate binder and metallic zinc is in order to obtain improved coating and protective characteristics. Commerically-available products have not been sucessful in eliminating the problems inherent to these materials. Such products are disclosed in U.S. Pat. No. 3,056,684, and contain a partially hydrolyzed, tetraethyl orthosilicate as the organic silicate binder. Other galvanic coating compositions have been based on the use of hydrolyzed tetraethoxyethyl silicate as the binder, but the variety of available organic silicate-based galvanic coating compositions is limited. Moreover, these conventional hydrolyzed silicates, if they are highly enough hydrolyzed to cure rapidly with zinc as a paint, have a poor shelf life of only a few months and a pot life, when mixed with zinc dust, of only a few hours. As a consequence, these components are maintained as separate packages until shortly before use, whereas certain of the products of the present invention may be made into single package, stable compositions containing both the silicate binder and zinc dust. Further, the conventional hydrolyzed silicates, if they have good shelf life in the presence of zinc dust, may not cure rapidly at lower temperatures and humidities, if at all, and their application as coatings is often prohibited under a variety of weather conditions that do not hinder the use of the compositions of the present invention. Thus, my compositions can have improved pot life and shelf life and cure under all weather conditions. One purpose of the present invention is, therefore, to provide new fat-curing, stable, easier-to-use galvanic coating compositions containing meetallic zinc and polyol silicate reaction products having superior coating and curing characteristics under a variety of application conditions such as adverse weather, and which provide highly advantageous galvanically-protective coatings when cured on ferrous substrates.

Prior organic silicate coating products have a number of disadvantages, and, in particular, they may not be formulated into rapidly-curing, single-package, galvanic coating compositions without severe limitations. Thus, the pot life of some of these silicate products, when mixed with finely divided metallic zinc, is so short, e.g. about four hours, that the compositions cannot be marketed or used on a practical basis as a single package. Instead, the user of the product must mix the silicate binder with the metallic zinc more or less at the time the composition is to be applied to the ferrous substrate. In many situations, this is a severe disadvantage to the coatings applicator and he must carefully control the operation to insure that the zinc-containing product is applied quickly as a coating, otherwise it may gel prematurely and cause waste and perhaps even the loss of equipment in which the premature curing action occurs. The products of U.S. Pat. No. 3,056,684 currently marketed are of this type and thus do not permit the formulation of satisfactory rapidly-curing, zinc-containing, galvanic coating compositions having a pot life of over a few hours.

There is possibly one other single package, zinc-containing composition on the present commercial market, but its properties are quite inferior in making rapidly-curing, hard, adhesive coatings. In any event, the art is in great need of improved organic silicate-metallic zinc products of the single package variety in order that the coatings applicators may have faster curing, harder and more adhesive coatings under a variety of adverse application conditions than afforded by the products available, and so that a more appropriate selection can be made to satisfy the ultimate requirements for the coatings in a greater number of given situations.

Heretofore, the most widely used zinc and silicate-containing coating compositions employed for the protection of metallic substrate surfaces, have been, to my knowledge, characterized by a hydrolyzed silicate binder having nearlly completely a -Si-O-Si- polymeric and cross-linked structure. Such previous paint compositions containing substantial amounts of the -Si-O-Si- structure, if they are sufficiently hydrolyzed to cure rapidly with zinc dust, are not reliable if requiring long storage, since they tend to form lumps when combined with zinc dust, develope gaseous pressure or even form solid gels upon long-aging, even without zinc dust being present. Consequently, such prior zinc-silicate coatings had to be blended or mixed at the point of use, due to the necessity of keeping various constituents of the ultimate coating composition in separate container prior to its application, and even as a two package system, the silicate portion was subject to being unusable after six months to a year or more of aging. Where such blending or mixing had to be carried out manually by the operator, it was difficult and sometimes not possible to provide smooth blends free from lumps that would cause clogging of spray equipment if the paint compositions were applied by spraying. Also, the "pot life" of the zinc-silicate materials was often limited to from 2 to 12 hours, and clogging of conduit lines with solid zinc silicate particles presented a real problem, particularly where such lines were exposed to high temperatures, as on the hot decks of ships.

In addition to the necessity of making available separate coating containers in the previous use of silicate coatings, the container for the highly hydrolyzed alkyl silicate or organosol, if made of steel had to be lined with a special, relatively expensive, corrosion-resistant lining, since otherwise the coating composition would ge or become unusable upon extended contact with the iron-containing surface, because of the instability of the composition. In my novel "one-package" system, a simple unlined paint can suffices and is highly satisfactory, without any special coating or lining, for storing my liquid suspension coating compositions. Some of these coating compositions of my invention when properly compounded have a pot life of several days to many years. The longer stable products offer an inorganic zinc composition ready for use right out of the can sold from the shelf of a paint store for use in the home, in preconstruction primers, on ships, in industrial plants or in aerosol cans or drums for spraying. Others of my compositions that may be especially prepared for certain fast-curing applications, may have a pot life of about 1 to 40 weeks or longer and can be made and used before gelling or changing enough to materially reduce their advantageous coating characteristics. To suspend the zinc dust, it is often advantageous to highly shear suspending, antisaging, and anti-setting fillers in the polyol silicate binder, prior to slowly stirring in the zinc dust. Zinc and othe filler particulates, whether in the form of fillers containing finely divide elemental metal, even metal dust, or metal silicate, or in the form of zinc silicate, are so difficult to mix and suspend into a liquid without lumping that controlled mixing or blending, such as can be practiced in a paint factory, or the like, is far superior to leaving it up to the operator to mix the constituents manually (and usually ineffectively) at the locus of use in the field.

Some of the advantages of my new compositions are that they can be preblended in large batches and made up into single package compositions, ready for instant use for a coating application or they can be activated by adding an accelerator just before using. Additional advantages are that they may be made self-curing, do not freeze, are not subject to bacterial attack, can be used in the form of an aerosol, can be attractively pigmented for high temperature color coatings, and have rapid curing characteristics, making possible painting in winter and painting using automated programmed dipping, spraying and curing cycles, such as the application of a preconstruction primer which may later be welded together and recoated with the zinc silicate paint and for coating rolled steel which is subsequently recoated, formed or coiled. In addition, the zinc dust-containing coatings provide exceptional rapidly self-curing, galvanic, porous coatings for ferrous surfaces, and can be incorporated into single package or separate package compositions as desired. The single package characteristic makes the coating material ready for instant application by the user who otherwise may be required to stir for days to assure breakup of lumps, if, indeed, this can be even be practically accomplished. In addition, the single package permits attaining homogeneous and quality-controlled thixotropic slurries of the suspending agents in a larger plant, rather than mixing in small uncontrollable batches at the locus of use. Because of the exceptional adhesion of these coatings, they often can be applied even to surfaces having poor preparation and even over scale and give good protection.

My novel long pot life or single component, stable systems which are one preferred form of the present invention, make it possible to apply the coating composition by dipping in large tanks, whereas the relatively short pot life of prior zinc silicate coatings precluded any possibility of successfully dipping large objects in the zinc dust-silicate paint because gelling or degradation would occur within a few hours and a new batch of zinc dust-silicate paint had to be provided for continuing the operation. The resulting loss was sufficiently great to prevent the adoption of large scale dip-coating of ferrous objects and surfaces. As indicative of their ease of application, my novel one-package, zinc-silicate paint compositions can be applied by conventional means, including spraying, brushing, rolling or dipping, or by the so-called "airless" spraying technique. Another important benefit of some of my compositions is that they can be formulated with a high boiling solvent to give a product having a flash point of over 100°F.

One of the important benefits of some of my compositions is that they can be packaged in a container, such as an ordinary paint can, and kept therein indefinitely, ready for use at any time as self-sufficient coating compositions requiring no mixing with other compositions or additives. When placed in a moisture and air-tight container, these compositions remain smooth, free from lumps and without any tendency to gel or become objectionably viscous when tightly sealed. Some of my preferred composition have such properties even when the finely divided zinc component is included to give a composition ready for application to a supporting substrate. When applied and dried, the compositions cure in the presence of air and moisture in a minimum amount of time under evaporative conditions to give relatively hard, strongly adhesive coatings having exceptionally good protective properties toward corrosion and having self-healing properties toward scratches that may be formed on the surface of the coating. This self-healing property is particularly advantageous where the coating is exposed to salt or other corrosive atmospheres. The strong adhesion of the coating to the substrate surface, even when applied to non-sandblasted, but otherwise clean ferrous metal surfaces, is especially advantageous where subsequent coatings to be applied do not adhere well to the surface of the substrate itself, such as where certain plastics are to be applied to a surface of a steel, aluminum, glass or ceramic substrate to which such plastics ordinarily do not bond. Thus, the metallic zinc-containing coating compositions of my invention can suitably be used as a primer for application to a substrate to condition the surface thereof for another of the same or other coatings, even when a coating containing a plastic or polymeric material or an inorganic, ceramic or porous topcoat.

Another advantage of some of my coating materials is that they have exceptional protective properties at high temperatures, such that a finished, dry coating of my composition on a 20-gauge, cold-rolled steel test plate can be heated to red heat and then quenched in cold water without the slightest indication of cracking or decomposition of the coating material. The thermal cycle of high temperature heating and low temperature quenching can be repeated many times without any apparent degradation of the coating. The exceptional heat resistance of my composition is believed to be due to the driving-off by evaporation on exposure to air and moisture of all organic groups to leave the inorganic grouping —$SiO_2$, ZnO, $SiO_2$—, zinc silicate and possibly zinc oxychloride, which is stable up to red heat temperatures, such as 1100° to 1200°F.

Coatings formulated from my polyol silicates made from ethylene glycol, particularly when methyl ethyl ketone, zinc dust-containing fillers and optionally an acidic zinc salt such as a zinc salt of a mineral acid, e.g. zinc chloride, or mineral acid catalyst, are used in the products, exhibit a very strong, tenacious adhesion to metal substrates. The protective surface not only provides a decorative gray color, but also enhances the resistance of the metal substrate to oxidation, rusting or other forms of corrosion. The adhesion of the coating to the substrate is so extremely strong as to indicate the possibility of a chemical reaction between the silicate, acidic zinc salt, and ferrous metal-containing substrate. A chemical bond between the coating and the substrate seems most likely in view of the fact that the coating on the substrate successfully withstands bending, impact and thermodegradation.

The organic silicate binders of the products of the present invention are ester-exchange reaction products made from polyol and organic silicate. The silicate reacted with polyol is essentially composed of ortho silicate whose major portion of organic substituents is essentially of aliphatic, including cycloaliphatic, configuration, although a minor amount of non-aliphatic radicals, e.g. aromatic groups may be present. The organic radicals of the essential ortho silicate are generally saturated and each may have up to about 6 or 7 carbon atoms, preferably up to 4 carbon atoms. These aliphatic radicals which are attached to a silicon atom through an oxygen atom, consist essentially of carbon and hydrogen, and often contain oxygen, particularly in the case of ether, ether-alcohol, alcohol, or even ester groups. For example, the silicate reactant may contain ortho silicates in which the organic radicals are in the form of alkyl, hydroxyalkyl, alkoxyalkyl, hydroxyalkoxyalkyl or carboxyalkyl groups attached to a silicon atom through an oxygen atom, and preferably these groups have straight chain or primary structures. At least two of the organic groups per molecule of at least a substantial portion of the essential silicate reactant are ester-exchangeable with the polyol reactant. Also, these aliphatic or alkyl-type silicate reactants may contain one or more siloxane groups, that is, —Si—O—Si—, in aliphatic or cyclic and cross-linked configuration. Thus, the silicon atoms may be bonded through oxygen to 1, 2, 3 or 4 other silicon atoms with its other valences being satisfied with an organic radical of the types described herein. The silicate reactant, when in siloxane form, will often have up to about 5 or 10 silicon atoms per average molecule, and preferably not more than an average of about 6 silicon atoms. If the silicate reactant is hydrolyzed to a greater extent, its structure may contain a larger number of the siloxane groupings, and they may be in cyclic, crosslinked configuration. When the silicate reactant is hydrolyzed, I prefer it to be up to about 75% hydrolyzed, preferably up to about 45% hydrolyzed for single package paints. For two package paints, the preferred extent of hydrolysis is up to about 75%. Mixed or blended silicates differing in extent of hydrolysis may also be useful reactants. With hydrolyzed silicates, the reaction with polyol decreases cure time and this is a particularly important property with silicates that are hydrolyzed below about 75% since these products also have longer shelf-life than higher hydrolyzed products. The siloxane-type structures are considered herein to be ortho silicates, i.e. the four valences of the essential silicon atoms are bonded through oxygen atoms to either carbon or another silicon atom in cyclic, cross-linked, or aliphatic chain configuration.

The ortho silicate reactants employed in making some the binder components of the present invention include, among others, those having the formula:

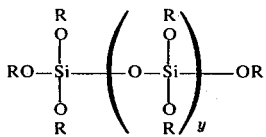

in which the R groups may be similar or dissimilar alkyl-type radicals having up to about 4 or 6 carbon atoms, e.g. alkyl, hydroxyalkyl, alkoxyalkyl, hydroxyalkoxyalkyl, carboxyalkyl and the like, and y is 0 or a number up to about 5, 6 or 10 or more, e.g. about 3 to 9, to provide a siloxane structure. Preferably, y does not exceed about 7 for the average molecule. The siloxane structures may be disposed in a simple single ring or may be in multiple rings formed by cross-linking, e.g., as represented by the following examples:

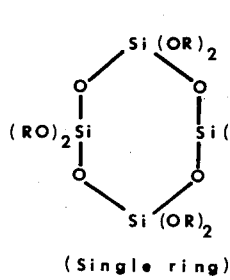

(Single ring)

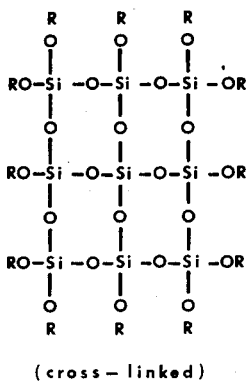

(cross–linked)

The R groups may be the same or different in a given reactant. Also, most of the R groups are not stearically-hindered to the extent that the reaction will not take place. Included among these useful R groups are alkyl of up to, for instance, 4 carbon atoms, e.g., methyl ethyl, propyl and butyl groups. Tetraethyl ortho silicate, polymeric ortho silicates of about 4 to 10 silicon atoms per molecule, ethoxyethyl or methoxyethyl silicates, mixed esters of alkyl and alkoxyalkyl silicates, and the like, are highly preferred reactants. The mixed ester silicates may especially have ester-exchangeable groups which are predominantly alkoxy alkyl. The R groups may also be alkoxyalkyl or carboxyalkyl radicals of 2 to 6 carbon atoms, such as ethoxyethyl, methoxyethyl, carboxymethyl and the like. Another type of alkyl ortho silicate which may be employed in making my binders are those in which one or more R groups are hydroxyalkyl such as hydroxyethyl, hydroxypropyl, and the like, or R groups in which are contained both ether and alcohol oxygen atoms such as hydroxyethyloxyethyl, and in the case of the latter, only minor amounts may be desirable due to the low volatility of this substituent. The ortho silicates which can be employed in preparing the binders of the present invention may contain minor amounts of other ingredients, some or all of which may be of silicate configuration and monomeric or polymeric in form.

A preferred essentially monomeric reactant is a tetraethyl ortho silicate containing, for instance, about 75 to 95% or more monomer, and a small amount, for instance, about 4 to 10 or 20% of dimer having the formula:

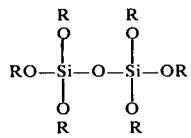

as well as a minor amount of higher polymers. One product of this type which is commercially available is designated "ethyl silicate condensed," and contains about 90 to 95% of tetraethyl ortho silicate, 4 to 9% of the above dimer in which R is ethyl, and a small amount, say about 1%, of higher polymers. A highly preferred reactant is commercially available under the name of "Ethyl Polysilicate 40", which may not only be transesterified by reaction with polyol, but also with monohydric compounds such as 2-ethoxyethanol, 2-methoxyethanol, and the like to give mixed ester products. The ortho silicate reactant may thus include various monomers and polymers and mixed monomers and polymers of the ortho silicate type, having minor amounts of silanes, having a minor amount of carbon-to-silicon bonds, and having carbon–oxygen-silicon linkages, with or without silicon-oxygen-silicon linkages. Materials of these types may include minor amounts of tri- or di-alkoxy silanes containing other radicals attached by a carbon-silicon linkage, as well as polymers of these various materials. Thus, the alkyl ortho silicate may have a co-mixture of an alkyl silicate, such as tetraethyl ortho silicate and polymers thereof, and a mono- or di-alkyl or aryl, alkoxy silane, such as propyl trimethoxysilane, to form a product containing the reacted form of such materials. The silicon-carbon bond may in some instances increase the water repellancy of the protective coating and offers the possibility of the organic portion of the product having functional groups which may bond to a functional group on a plastic top coat or an antifoulant coating material to improve the adhesion to a substrate.

The polyol silicate binders of this invention are essentially reaction products of the above-described ortho silicates with aliphatic, including cycloaliphatic, polyols which are preferably diols or triols, but may have many hydroxyl groupings per molecule. The essential polyol reactant may be partially etherified or otherwise modified providing it has at least 2 free hydroxyl groups per average molecule to participate in the ester-exchange reaction. Other hydroxy-bearing materials may be present and may or may not ester-exchange with another reactant, e.g. the ortho silicate reactant. Thus, the polyol-silicate reaction mixture may contain a monohydroxy reactant such as an alkanol, ether alkanol or the like, and such monohydroxy material may be mixed or ester-exchanged with the polyol silicate while or after the latter is formed. Although the polyol or monohydroxy material may have a molecular weight of up to about 200 or 400 or more, especially if they are polyoxyalkylene polyols, such as the polyoxyalkylene glycols, e.g. polyethylene glycols, or alkyl-capped, polyoxyalkylene polyols, the polyols and monohydroxy materials often have molecular weights up to about 100. Higher molecular weight polyols are usually a minor molar amount of the total polyol employed with the lower molecular weight polyol being the major amount. Preferred polyols are ethylene glycol, propylene glycol and glycerol, and ethylene glycol is the most highly preferred polyol reactant from both the product quality and cost standpoints. Although the polyol silicate binders of this invention consist essentially of carbon, hydrogen and oxygen, they may contain other elements such as nitrogen, as is the case when diethanol amine or triethanol amine is employed as a polyol reactant, although these polyols may not be preferred. The polyol silicates derived from nitrogen-containing polyols may be employed along with polyol silicates derived from other polyols, and such mixtures may be prepared by physical admixing or sequential ester-exchange. Such mixtures preferably contain a major weight portion of polyol silicates derived from non-nitrogenous polyols, and a minor amount of the nitrogen-containing polyol-derived polyol silicate sufficient to improve the stability of the compositions. The use of nitrogen-containing, polyol-derived polyol silicates may serve to reduce lumping of the zinc dust and gassing of the composition. Other polyols which may be employed in making the binders of the invention include diethylene glycol, trimethylene glycol, triethylene glycol, dipropylene glycol, tripropylene glycol, polyethylene glycols, trimethylol propane, 1,6- or 2,6-hexanediol, neopentyl glycol, 1,3-butylene glycol, pentaerythritol, sorbitol, hexylene glycol, partially-esterified polyols, cyclopentanediol and the like. Mixtures of these polyols may also be reacted, especially those which contain a major portion of ethylene glycol, propylene glycol or glycerol. The choice of polyol may affect the gelling characteristics of the product, for instance, if higher molecular weight polyols having several hydroxyl groups are used, proper adjustment to lower ratios of polyol with respect to the silicate reactant on the basis of the number of hydroxyl groups per ester-exchangeable group in the silicate is advisable, and the extent of alcohol removal or addition from the ester-exchange reaction mixture may be varied to obtain a hard, adhesive coating, yet having a mixture that will not gel as a single package, zinc-containing paint due to excessive cross-linking. The use of polyols having more than 3 carbon atoms may lead to slower curing products, especially as the ratio of polyol to silicate increases and thus the use of polyols having up to 3 carbon atoms is preferred for materials having no residual organic materials in the coating. Similarly, the gelling characteristics of the reaction mixture and properties of the coating compositions may be affected, depending upon the choice of the silicate reactant and the extent of

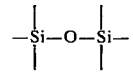

and silicon-carbon bonds that may be present. The use in high ratios to silicate of higher molecular weight glycols or other polyols having other groupings thereon and less volatile, may lead to products which are slow-curing and give soft coatings due to their low volatility. This may indicate the use of only minor molar amounts of these polyols based on the total polyol reacted.

The ester-exchangeable, monohydroxy components which may be ester-exchanged into the polyol silicate reaction products of this invention are monofunctional materials, and they generally have a higher boiling point than the alcohol formed as the result of this ester-exchange. These monohydroxy materials may have a molecular weight up to about 300 to 400 or more, usually a molecular weight below about 100, and they often consist essentially of carbon, hydrogen and oxygen. Among these monohydroxy reactants are the alkanols, ether alkanols, keto alkanols and the like having, for instance, up to about 24 carbon atoms, but preferably up to about 4 or 8 carbon atoms. Thus, materials such as branched alcohols may be used to impart stability to the coatings ultimately formed, and, in this respect, even t-butyl alcohol and 2-ethylhexyl alcohol may be employed, although not preferred. Among the useful alkoxy alkanols are methoxyethanol, ethyoxyethanol, and the like. Alkyl-terminated ether glycols may also be reacted, e.g. methyl-terminated diethylene glycol, $CH_3OCH_2CH_2OCH_2CH_2OH$. When used, the low volatility, monofunctional, polyethers are preferably present in minor amounts compared with the highly desirable alkyl-terminated monoether alcohols such as 2-ethoxy ethanol and methoxyethanol. The amount of monohydroxy material reacted during the formation of the polyol silicate or subsequently, any range from very small proportions up to preferred amounts sufficient to ester-exchange with essentially all of the ester-exchangeable groups of the polyol silicate, and even amounts in substantial excess being present as a solvent. Preferably the amount of monohydroxy material is sufficient to stabilize the polyol silicate against gelling and may vary according to the ratio of polyol to silicate reacted, the extent of hydrolysis of the silicate, and the presence of zinc or other fillers or polymeric materials such as polyvinyl butyral in the composition. The ester-exchange reaction can be conducted under the conditions disclosed herein for forming the polyol silicates of this invention.

In the case of polyol silicates made from siloxane reactants having a plurality of

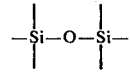

bonds, the presence of substantial amounts of monohydroxy materials in the product or the reaction mixture in which the polyol silicate is formed, can serve to reduce the gelling tendencies of the polyol silicates when metallic zinc is or is not present. This stabilizing effect is particularly apparent when the monohydroxy material is alkoxy alkanol. Preferably, this amount is a substantial molar excess of monohydroxy material based on the ester-exchangeable groups of the polyol silicate. Apparently, even at low temperatures in the presence of an acid catalyst, the monohydroxy material ester-exchanges into the polyol silicate structure, and this reaction takes place much more rapidly at elevated temperatures.

The ratio of silicate and polyol reactants reacted in making the binders of the present invention may affect the structure and properties of the resultant products, as well as the manner in which they may be used in coating compositions. Generally, the binder reaction products are made by reacting polyol and silicate in amounts such that the ratio of hydroxyl groups supplied by the reacted polyol is about 0.15 to 1.8 moles per mole of ester-exchangeable group provided by the reacted silicate, preferably this amount is about 0.35 to 1.5:1 or even about 0.5 to 1.3:1, or, in the case of monomeric silicates, even about 0.5 to 0.9:1. These preferred amounts are especially advantageous in making single-package, zinc-containing, galvanic coating compositions. In the case of tetraalkyl silicate and glycol reactants, these amounts may correspond to about 0.7 to 3.5 moles of glycol per mole of tetraalkyl ortho silicate, preferably about 0.7 to 3:1 or even about 1 to 1.9:1. In the case of silicate esters having siloxane polymers therein and having an average of about 5 to 7 silicon atoms per molecule, ratios of about 0.3 to 3.5, preferably about 0.7 to 3.5, moles of hydroxy group supplied by the reacted polyol per mole of silicon atom in the siloxane, are preferred. Minor amounts of unreacted polyol may also be present in the products and serve as a solvent or suspending agent for the zinc dust, although the amount of unreacted polyol should not be so great as to cause gelling.

Generally, with the presence of many siloxane groupings in the molecule of the silicate reactant, smaller amounts of polyol per unit of siloxane may be used to produce coating compositions of desirable curing characteristics. As the number of siloxane groupings increases in the silicate reactant, the use of smaller amounts of polyol per silicate unit

in the polysilicate molecule may be necessary to prevent gelling because of the large number of sites per molecule available for cross-linking, and thus, especially with highly hydrolyzed silicates, the tendency to gel is great if the polyol silicate products are not highly diluted with a solvent, preferably with a stabilizing monohydric alcohol or alcohol ether compound such as 2-ethoxy ethanol, and in the highly hydrolyzed binders, the silica content of the ester-exchange product may be about 14% or less in order to be stable to gelling tendencies.

The preferred reacted ratio of glycol to silica in the binder changes with the extent of hydrolysis of the silicate, and may also be described in the terms of the pounds of glycol per 100 pounds of silica present in the binder for preferred curing characteristics and stability against gelling. For instance, the monomer, tetraalkoxy or tetraalkoxyalkyl silicate, when essentially 0% of hydrolyzed (unhydrolyzed) may have an optimum ratio range of around 105 to 200 lbs. of glycol for each 100 lbs. silica (calc. $SiO_2$ of mol. wt. 60) present in the binder; for the dimer of this silicate having about 25% hydrolysis, the optimum ratio may be around 80 to 105 lbs. of glycol for each 100 lbs. silica present in the binder. When using a silicate which is about 40% hydrolyzed, e.g. ethyl silicate 40 having an average of about 5 silicon atoms per molecule, an optimum ratio of about 55 to 140 lbs. of glycol per 100 lbs. of silica may be present in the binder. For a silicate that is hydrolyzed to about 70%, it may be necessary and advisable to react only about 10 to 50 lbs. of glycol for each 100 lbs. silica in the binder to achieve adequate shelf life and adequate curing of the coating. The latter binder is useful in two package systems having limited shelf life and should be highly diluted with monofunctional hydroxy compounds to achieve non-rapid gelling characteristics. It must be noted, however, that as the hydrolysis increases, the stability of both the polyol silicate and the slurry containing the polyol silicate and zinc decreases, and dilution with adequate monofunctional compound and adjustment of pH (buffering) to prevent rapid gelling become increasingly more necessary. The binder stability is far longer than the zinc slurry, since the zinc tends to react with the higher hydrolyzed binders. For instance, a polyol silicate made from a 95% hydrolyzed silicate may have a can life in the presence of zinc dust of only 1 day or even 5 hours before gelling, while the can life of a polyol silicate made from a 40% hydrolyzed binder may be many years, even in the presence of zinc dust, particuularly when buffering agents (fillers) are present. The can life of a polyol silicate made from a 95% hydrolyzed silicate and having no zinc dust may be no longer than a few weeks when highly diluted with monofunctional solvent and having a less acidic pH, while the can life of a 75% hydrolyzed silicate derived binder is much longer, particularly when diluted with a monofunctional-OH solvent. For a binder made from a 40% or less hydrolyzed silicate diluted with some monofunctional-OH solvent may have a shelf-life of many years under sealed ambient conditions. It should be noted that the presence of the glycol or polyol ester-exchanged into the silicate can give faster curing coatings with zinc dust than would ever have been possible without the polyol (at the same silicate hydrolysis); and hence, the addition and ester exchange of the polyol into the silicate helps achieve a coating having a rapid cure at low hydrolysis (0 to 60% hydrolyzed), where ordinary hydrolyzed silicates would never normally cure, without added accelerators, as coatings with zinc dust, and this coating would be very soft. The low hydrolysis of the silicate employed is advantageous because of highly extended can life of slurries with zinc, and hence, rapid curing single package compositions of polyol silicate binders and zinc dust, which are stable for long periods of time, and yet when applied as a film, cure out very rapidly to hard superior adhesive coatings. In any event, enough of the polyol is ester-exchanged with the silicate to give a product having improved rapid curing characteristics compared with those of the silicate reactant itself, regardless of its extent of hydrolysis, but being more noticeable in rapid curing at the lower hydrolysis extents up to about 60% hydrolyzed as compared to binders not having the polyol reacted therein at these lower hydrolysis extents.

I have found that silicon-to-carbon bond containing reactants or silicone polymers can sometimes be usefully incorporated in minor amounts in the novel backbone of my silicate and polysilicate products, although, for inorganic zinc coatings, these may not be preferred. Examples of such reactants which may be so incorporated are methyl triethoxy silane, propyl trimethoxy silane, vinyl trimethoxy silane and hydroxy functional silicone polymers. Cross-linking of the silicate product can be effected by attaching a functional organic grouping to the silicon of the silicate product which may then be made to chemically bond to a plastic topcoat containing a reactive grouping.

The following table gives considerable data with regard to the physical form and properties observed, analytical results obtained and postulated chemical structures of products prepared by reacting the simplest of the aliphatic ortho silicate, specifically tetraethyl ortho silicate, with the simplest glycol reactant, specifically ethylene glycol, under conditions effecting an ester-alcohol exchange with accompanying near total removal by distillation of alcohol released from the reaction mass to show how the compositions change with various ratios of silicate/polyol, and the chemistry involved. This study was conducted to establish the structure of the tetraalkyl silicate-glycol ester exchange products, and the chemistry could be extrapolated to polysilicate/polyol reactants, but because of the number of available reaction sites and cross-linking possibilities, only characterization of the products from monomer reactants was attempted. These products were made by removing essentially all alcohol to the point of gelling of the product to show how the structures change upon curing.

Certain information has been omitted from the table in the interest of conserving space. Such information includes the following: As to the boiling points of the glycol alkyl silicate reaction products of my invention, the mole ratio of glycol to silicate is important. When the ester-exchanged and reacted mole ratio of glycol to tetraalkyl ortho silicate ranges from about 0.5 to below 1 glycol per mole of tetra ortho silicate, the resultant products are extremely thermally stable and contain structures having predominately the following grouping when ester-exchanged released alcohol is removed, causing the bridged structure to predominate:

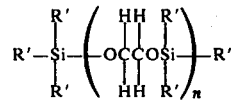

where $n$ is greater than 1 and the R' groupings are alkoxy. As the ratio of glycol to tetraalkyl ortho silicate is progressively increased from 1 to less than 2, the structure of the silicate progressively changes from bridged to pendant glycol which, with excessive heating and removal of monofunctional compounds, gels the resultant polymer, possibly through cross-linking-ester exchange condensation of pendant polyol groupings with monofunctional alcohol groupings on the silicate, and possibly resulting in rearrangements with release of alcohol from the predominant structure present in this ratio range which must be carefully made so as to not exceed the temperature and degree of alcohol removal where gelling and rearrangement occur. As the ratio of glycol to silicate increases from 2 to 3.5:1, the ratio of pendant to bridged glycol structures increases even more when alcohol is removed. These products may be characterized by the above structure wherein $n$ is usually only 1 or 2 and the R' groupings are both alkoxy and pendant glycol (hydroxyakyloxy). At ratios of over 4 moles of glycol/1 mole tetraalkyl silicate, the structure is

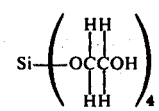

and this material is well-known and distillable under vacuum.

As to the physical forms of my reaction products, they are all colorless and range from non-viscous through viscous, syrupy, semi-solid, but flowable, to semi-solid and non-flowable substances. As to the solubilities of my products as identified in the following table, product No. 1 is soluble in all hydrocarbon solvents and oxygenated organic solvents, but insoluble in water;

No. 2 is soluble in aromatic hydrocarbon solvents; insoluble in paraffinic hydrocarbons, soluble in oxygenated solvents; and insoluble in water;

Nos. 3 through 6 have the same solubilities as No. 2;

No. 7 is insoluble in aromatic hydrocarbon solvents, soluble in ketones and insoluble in water;

No. 8 is insoluble in most organic solvents except hot alcohol and compounds having an active hydrogen.

It should be noted that any of the above will be water-soluble if water is very slowly added to acidic solutions to increase hydrolysis and solubility, and could be classified as miscible if added extremely slowly to allow hydrolysis reactions to occur before adding the remaining water.

The following table gives further data as to the same reaction products identified above and in the table as Nos. 1 through 8. As to products Nos. 1 through 8, the mole ratio of ethylene glycol to tetraethyl ortho silicate is increasing from 0.5 mole glycol/1 mole tetraethyl ortho silicate in No. 1, to 3 moles of glycol/1 mole tetraethyl ortho silicate in No. 8. As the glycol ratio is increased, the structure changes drastically from products having the glycol-alkyl silicate backbone structure,

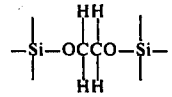

in which both hydroxyls of essentially all of a given glycol molecule are bonded to different silicon atoms in the ratio of 0.5 to 1 mole glycol per mole silicate, to predominately tye pendant-type structure in which only one hydroxyl group of the glycol is bonded to a silicon atom. Glycol alkyl silicate molecules with perhaps only one or two of the

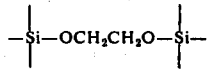

backbone groupings per molecule were formed when there was a mole ratio of 1 mole of tetraethyl ortho silicate to less than 2 moles of glycol, and perhaps less than 1 as the ratio increases from 2 to 3.5 and the products had none of these backbone groups when the mole ratio was over 4 glycols/1 silicate and substantially all alcohol was distilled therefrom. In each instance in making these products, I withdrew only enough alcohol to polymerize the reaction mixture to a very viscous, but not a solid, insoluble, consistency.

It is noted that in the data table, the analysis and structure postulated are based on average composition. It is assumed that a distribution of products occurs having masses higher and lower in molecular weight, but averaging to the given composition, and they are not just a single compound.

While these data are applicable to the monomer, it can readily be seen that siloxane polymers having a greater number of available sites for cross-linking by ester exchange with a polyol, behave similarly to the monomer and have the same ratios, based on hydrolyzable grouping on the silicate reactant, and similar structures, but, because of their complexity, are more dependent on dilution with monohydric compounds to prevent the cross-linking reaction of the pendant type glycol with alkoxy groupings on other silicate molecules because of the numerous available sites present for ester exchange increases as the siloxane polymer gets larger from increasing hydrolysis. The chemical mass action law probably applies wherein the affinity of the polyol grouping to undergo cross-linking is counteracted (or stabilized against gelling) by the monohydric compounds whose affinity for the silicon atom and amount present on equilibration with the polyol prevent such cross-linking and gelling reactions from occuring, as happens with the polyol until, as the coating dries and the reaction solvent evaporates, the cross-linking reaction occurs. The control of molecular weight (viscosity) of the polyol silicate by addition or removal of monohydric compound is shown in its simplest form, for the monomer in equation Y below.

TABLE I

| Product No. | Mole Ratio Silicate/ Glycol | Refractive Index, 30°C. | Analysis of Product | | | | | Molecular wt. | Moles alcohol collected per mole of glycol charged |
|---|---|---|---|---|---|---|---|---|---|
| | | | Density, 25°C. | % $SiO_2$ | % C | % O | % H | | |
| 1 | 1/0.5 | 1.4004 | 1.004 | 31.1 | 43.2 | 32.2 | 8.3 | 386 | 2/1 |
| 2 | 1/0.9 | 1.4106 | 1.062 at 29°C. | — | — | — | — | — | 2/1 |
| 3 | 1/1 | 1.4115 | 1.075 | 29.9 | — | — | — | — | 1.82/1 |
| 4 | 1/1.2 | — | 1.075 at 29°C | 28.5 | — | — | — | — | — |
| 5 | 1/1.3 | 1.4200 | 1.08 at 29°C | 28 | — | — | — | — | 1.45/1 |
| 6 | 1/1.5 | 1.4190 | 1.09 | 28 | — | — | — | — | 1.35/1 |
| 7 | 1/2 | 1.4204 | 1.10 | 25.4 | — | — | — | — | 1.1/1 |
| 8 | 1/3 | 1.4306 | 1.13 | 20.2 | — | — | — | — | 0.82/1 |

| Product No. | Postulated Structure ("EtO") stands for ethoxy | Proof of Structure |
|---|---|---|
| 1 | $(EtO)_3$—Si—OCCO—Si—$(OEt)_3$ with HH / HH | The lack of absorbency peaks (or troughs) in the IR spectrograph in the 2.7 micron region indicates no (OH) group, hence substantially all of the glycol present must be in the backbone in the first two example herein. Silica content and hydrogen, oxygen and carbon content all support the postulated structure shown, as does also the weight balance; and the IR NMR data indicate the ratios of backbone to pendant type glycol in my polymer that are shown in the adjoining column. |
| 2 | $(EtO)_3$—Si—(OCCO—Si—OEt with HH/HH and O-Et)$_6$ | |
| 3 | 82% backbone glycol 18% pendant glycol in polymer | |
| 4 | Contains both backbone and pendant glycol groupings in polymer | |
| 5 | 35% backbone glycol 65% pendant glycol | |
| 6 | 35% backbone glycol 65% pendant glycol | |
| 7 | Some backbone glycol but predominantly pendant glycol | *For explanation of NMR date, see following. |
| 8 | Small amount of backbone glycol but predominantly pendant glycol, some free glycol in the product | |

*The area underneath the Nuclear Magnetic Resonance (NMR) signal peaks is directly proportional to the type of hydrogens contributing. When the peaks are integrated, one gets the number (or summation) of hydrogen types contributing to the peaks relative to others present. When integrated, one obtains a ratio of methylene to methyl to methine type hydrogens. The structure given and the ratio of backbone to pendant glycol in the table of various compositions correlate with the NMR results for the predicted composition based on relative charges, assumed reaction, amount of alcohol recovered during ester-exchange occurring and also were obtained, elemental analysis.

The NMR of the -OH group in the pendant glycols,

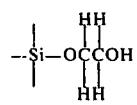

fall in the range of frequencies 3.25 to 3.45 ppm (delta). The -OH peak is absent in the case of backbone glycol type structure.

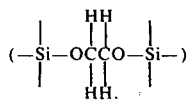

The methylene in both the pendant and backbone glycol resonate in the same frequency region, and therefore cannot be used for differentiation. This is why the -OH is used to identify the pendant from the backbone glycol type. The -OH groups in Reagent Grade Glycol molecule (which is not bonded to the silicon atom) does not fall in this region.

Solutions were in 15% deuterated chloroform and NEAT.

While the structures of the reaction products of the polyol and monomeric silicate (e.g., tetraalkyl ortho silicate) are relatively simple, the polyol and polymeric alkyl and alkoxy alkyl silicate reaction products and mixed esters of these types are of relatively complex structure with larger molecules and many more reactive ester exchange sites. Therefore, bridging for the larger polymers as the extent of hydrolysis increases is thought to occur more easily because of the many sites available, and hence, to avoid excessive bridging with ultimate gelling of the products, more monomeric hydroxy compounds such as 2-ethoxy ethanol or alcohol may be necessary to compete for the sites on the silicon atom with the polyol, which, because the polyol is polyfunctional, tends to bridge, cross-link and polymerized, while the monomer hydroxy compounds inhibit and stop this reaction. It is, therefore, believed that as the polymeric silicate reactant is more highly hydrolyzed and more ester exchangeable sites are available for ester exchange reaction, in the presence of a large excess of monomeric hydroxy compounds, most of the polyol groupings are of the pendant type (not cross-linked) until the coating cures, due to alcohol or OH-compound removal upon which the hydroxyl groups of the polyol are cross-linked between silicon atoms present in the large molecules. This seems to be also true, for example, with the usual silicate reactants found in Ethyl Silicate 40, which is 40% hydrolyzed and has an average of about 5 silicon atoms per molecule and may have a broad distribution of monomeric, dimeric, trimeric, tetrameric, cyclic tetramer, cyclic pentamer, cross-linked hexamer, cross-linked heptamer-octamer-decamer, and so forth, to molecules having up to a maximum of about 16 silicon atoms per molecule. With highly hydrolyzed silicates, the cross-linked type structures occur have more of the silicon atoms being oxygen-bonded to a higher proportion of other silicon atoms as compared to oxygen bonded to organic radicals.

The polyol silicate binders of the present invention can be made by a liquid phase, ester-exchange reaction between the polyol and the silicate, and during the reaction alcohol corresponding to the alcohol of the R groups, as defined above, i.e. ROH, is formed. Although the reaction may proceed to an acceptable extent without the removal of the alcohol from the reaction mixture, it is preferred, especially with the lower boiling products, to remove at least some or even a major portion, if not substantially all, of the low boiling alcohol formed and replace it with a higher boiling material to raise the flash point of the reaction mixture. If a single package product is desired, it is preferable to remove only enough of the alcohol to provide a stable product having a sufficiently high flash point. This may be a major portion of the alcohol formed. The alcohol can be removed by distillation after the reaction or during the reaction where the polyol reactant and alkoxy alkanol reactant have higher boiling points than the alcohol formed. It is most advantageous to remove a portion of the alcohol from the reaction mixture and replace it with an alkoxy alkanol, especially where the polyol-ortho silicate product is employed to form high flash point, single package metallic zinc-containing compositions.

The extent of the alcohol removal from the reaction mixture may affect the molecular weight and gelling tendencies of the product since this removal can permit the cross-linking reaction to proceed. Generally, the ester-exchange is not allowed to be conducted to the extent that a solvent-insoluble product is obtained or gelling occurs when zinc dust is added to the product to form a paint, since this would make the polyol ortho silicate product virtually useless in coating compositions. It is preferred that the reaction be stopped well before the product is substantially gelled or will gel in contact with zinc dust, to the point of insolubility, although if gellation has not proceeded too far, the molecular weight, viscosity and tendencies of the product to gel may be reduced by the addition and reaction, e.g. by chain-termination, of alcohol back into the product. An example of this type of reaction for a monomeric silicate is as given below, and the general stabilizing or anti-gelling effect is observed to occur for higher siloxane polymers as well, and hence, this controls the tendency to gel or become objectionably viscous:

Equation Y

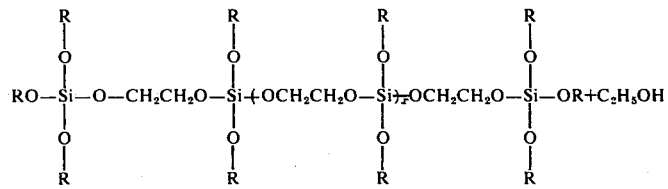

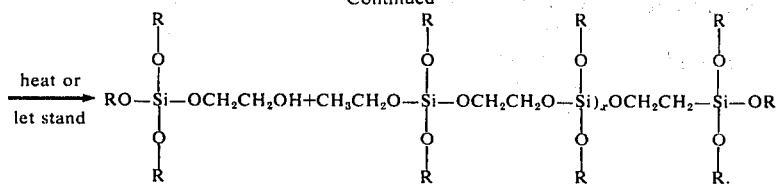

If excessive alcohol is present, the entire highly polymeric structure may be broken down. The reaction occurs more slowly at lower temperatures. The binder resulting from excess alcohol addition has a lower flash point and poorer properties in zinc-silicate coatings. Alkoxy alkanols as solvents are highly preferably to alcohols and it is highly advisable to have a minimum of low molecular weight alcohol in the binder as solvent both from a standpoint of flash point and cure rate of the zinc film. The presence of the alkoxy alkanol may counteract any undesirable result due to any alkanol in the product.

The ester-exchange reaction employed to make the polyol silicate binders of this invention generally takes place at elevated temperatures, for instance, about 50° or 80° to 150° or 160°C., preferably about 90° to 130°C. The use of an ester-exchange catalyst may be necessary to obtain the desired reaction, and a small amount, e.g. a trace, or a relatively strongly acidic catalyst, for instance, having a dissociation constant at 25°C. of at least about 0.001, such as sulfuric acid or hydrochloric acid, is highly preferred for the silicate-polyol reaction, especially when the latter does not contain nitrogen. After the exchange reaction, the acidic catalyst can be removed as by distillation, neutralization, reaction, adsorption on a filler, or ion exchange. In some instances, a separate catalyst may not be necessary, for example, when the polyol reactant contains a nitrogen atom, e.g. as with diethanol amine or triethanol amine, or when an alkoxy alkanol or another material present in the reaction mixture exerts a catalytic effect. For instance, if the reaction mixture contains a material having a carbonsilicon bond, e.g., alkyl trialkoxy silane, the reaction may proceed adequately in the absence of a separate catalyst, although the product is superior as a coating when acid is present. Other materials that may provide a catalytic effect are compounds which may participate in the ester-exchange reaction such as the alkyl titanates, e.g. butyl titanate or alkyl borates, aluminum alcoholates, but their use is not necessary and may not be advisable. The ester-exchange reaction system and the product may be essentially anhydrous, at least to the extent that insufficient water is present to cause the product to gel or cure to an essentially solvent-insoluble material. The presence of small amounts of water may not be unduly deleterious and may lead to partial hydrolysis of the product in situ. The polyol ortho silicate binder reaction products of this invention, exhibit substantial, and preferably essentially complete solubilty in, solvents for instance, methyl ethyl ketone, 2-ethoxy ethanol, and the like, and in some areas the products may react with this solvent on standing.

The polyol ortho silicate binder reaction products of the present invention may be by other procedures, and these include an ester-exchange system involving the reaction of the ortho silicate, e.g. tetraalkyl ortho silicate, tetraalkoxyalkyl silicate mixtures thereof of tetra ortho silicates having both alkyl and alkoxy alkyl groups attached to the same silicon atom, with a larger amount of the polyol, for instance, by using a ratio of greater than 1.8, especially greater than 2 moles of hydroxyl group supplied by the polyol per mole of ester-exchangeable group in the ortho silicate reactant. Polymeric forms of these silicates may also be used as reactants in this procedure. This reaction produces a material which can be designated a silicon tetraglycollate in the case of reacting a monomeric silicate, i.e. $Si(OMOH)_4$ wherein M is the residue of the glycol. This intermediate can then be reacted with additional tetraalkyl or tetraalkoxyalkyl silicate or their polymeric forms to provide the polyol silicate reaction product of this invention. These reactions can be illustrated in simplified form as follows:

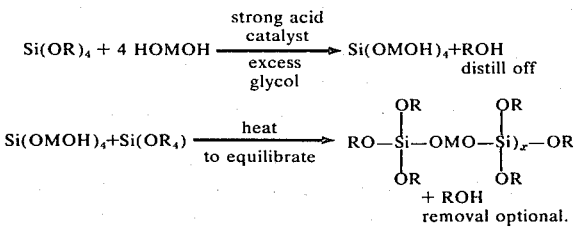

wherein R is ester-exchangeable alkyl, hydroxy alkyl of alkoxyalkyl of, say, up to about 4 or 7 carbon atoms, M is the glycol minus its 2 hydroxy groups, and $x$ is 1 or more. The removal of the ROH drives the polymerization reaction more to completion, and when not removed, the glycol groups may be pendant. The overall ratio of polyol or ortho silicate reactants supplied to this system can be controlled by the amount of the reactants in the second reaction and to supply the desired ratio of polyol to ortho silicate as herein designated for making the reaction products of this invention. There can also be incorporated in the second reaction a variety of other reactants, e.g. polysilicates or silicone monomers and polymers, to make products useful in coatings. Also, various other reactants such as monohydroxy materials and polyols having at least 2 functional hydroxy groups per molecule of the types mentioned herein, can be present in the second reaction providing the overall ratio of polyol, monohydroxy reactant and ortho silicates are in the ratios set forth herein for my desired binder products. Generally, in the second reaction, the amount of the ortho silicate, e.g. $(RO)_4 Si$, present provides about 0.2 to 11 moles of ester-exchangeable group, per mole of functional hydroxy group in the intermediate silicate, e.g. $Si(OMOH)_4$, and preferably this amount is about 0.3 to 5:1 or even about 0.3 or 1.1 to 3:1. The initial reaction of ortho silicate may be conducted with excess polyol while optionally removing by distillation alcohol formed in the reaction, and optionally continuing this separation until the reaction mixture is in an essentially semisolid condition. Then, the additional ortho silicate can be added and reacted, optionally with further removal of alcohol by distillation, to prepare binder products of the present invention. These ester-exchange reactions can be conducted under the conditions disclosed herein for this type of reaction.

The ester-exchange reaction by which my polyol silicate binder products are made, can be conducted in the absence of the addition of separate or extraneous solvent, although I prefer that at least some solvent be present before the reaction is completed in order to lower the viscosity of the product during the latter stages of the reaction, and to facilitate its handling and prevent its gelling in the presence of zinc. The polyol silicate binder is usually the bottoms or residual material in the reaction vessel at the conclusion of the ester-exchange, and all or a portion of any organic solvent added to the system may also be in the bottoms. When a solvent is employed during a reaction, it may often be present in amounts from about 5 to 400, preferably about 25 to 300, weight percent, based on the polyol silicate reaction product formed. The solvent may also be added to dilute the reaction product after the ester-exchange is complete, and this addition may be used alternatively or in conjunction with the addition of solvent before or during the reaction. Regardless of the time and manner of adding the solvent, it is advantageous to prepare a solvent solution of the polyol silicate binder for further handling or usage. Frequently, these solutions contain at least about 0.1 weight part of solvent per part of polyol silicate, and preferably about 0.5 to 10 weight parts of solvent per part of polyol silicate, including as solvent any alcohol present in the composition. While in some instances it may be preferable to remove some of any lower flash point alcohol formed in the ester-exchange reaction, removal of alcohol ether, e.g. alkoxy alkanol, formed in the ester-exchange is not as significant and its presence may be advantageous because of its higher flash point and to improve the stability of the product.

The organic solvents which can be included in the polyol silicate reaction products of this invention, either before, during or after the reaction, include the normally liquid organic solvents which are essentially inert to objectionable reaction with the polyol silicate binder reaction products and metallic zinc if the latter component is to be included in the composition for extended periods of time as in the single package systems. Thus, the solvent component can be essentially one which dissolves the polyol silicate in the presence of zinc dust and will not in the time the composition is stored before being applied as a coating, cause significant deterioration of the coating of excessive gassing, settling out in the can or lumping up due to excessive reaction with zinc dust. The problems are minimized and less important when two-component systems are used. The solvents are generally essentially anhydrous, at least to the extent that they do not cause undesirable gelling of the polyol silicate reaction product through reaction with any water present. If the solvent is added before the zinc dust is included in the composition, the polyol silicate may react with moisture present to form an essentially anhydrous system and prevent excessive gassing. Among the useful solvents are ketones, e.g., the methyl ketones such as methyl ethyl ketone, especially those ketones other than acetone which may react with zinc or zinc chloride or oxide if present; hydrocarbons such as aliphatic, aromatic, or mixed hydrocarbon solvents; glycol ethers; ethers; alcohols; ether alcohols; keto alcohols; esters; and other essentially neutral, non-reactive (with zinc dust) solvents composed essentially of carbon and hydrogen and with or without one or both of oxygen and nitrogen. Lower flash point alkanols are usually undesirable in most paints, although some may be present to stabilize the composition against gelling. Mixtures of the various solvents may also be employed and examples of suitable solvents are xylene, toluene, naphtha, naphtol spirits, methylethyl ketone, kerosine, mineral spirits, methylisobutyl ketone, cyclohexane, 2-ethoxyethanol, 2-methoxyethanol, ethanol, t-butyl alcohol, isopropanol, and the like. It may be advantageous in this invention to use solvents composed to a substantial extent, e.g. at least about 10 weight %, of alkoxyalkanol or methyl ketone. For instance, in the case of polyol silicate binder compositons in which metallic zinc is present, the alkoxyalkanol solvent can be used with advantage as a stabilizer, and optionally may be a major molar amount based on the total moles of ester-exchangeable groups on the polyol silicate plus the moles of monohydroxy solvent present. The solvent may even be composed predominately or essentially entirely of alkoxy alkanol, alkanol or hydrocarbon or their mixtures. This may be the case when, for instance, the polyol silicate reaction product is made from a silicate whose ester-exchangeable groups are predominantly alkoxy or alkoxy alkyl and the silicate has up to about 10 SiO groups per average molecule. In compositions containing the polyol silicate and zinc, the solvent may even be composed of a sufficient amount of methyl ketone other than acetone, e.g. methyl ethyl ketone with or without alcohol, to stabilize the polyol silicate against gelling, and such amounts are often at least about 10 or at least about 25 weight percent of the total solvent. The methyl ketone solvents are very susceptible to reaction and gelling with some of the polyol silicates of this invention if the pH is not buffered, as for instance with one or more weakly basic materials such as unsaturated, heterocyclic amines, or finely divided hydrated alumina or chrome oxide filler or a magnesium or calcium silicate, or added zinc dust which itself may change the pH enough to prevent the exothermic reaction between the polyol silicate and methylethyl ketone or other ketone solvent. The solvent component may have a boiling point below about 200°C., preferably below about 140°C., and may also have a Kauri-Butanol value (ASTM D1133) of over about 50, preferably over 60. For single package formulations in which the solvent, polyol silicate reaction product and zinc dust are in contact for long periods of time, the solvent component may also have a dielectric constant of preferably less than about 18. For two-package formulations, this property may not be important, and glycol esters, alcohols and solvents of higher dielectric constant can be employed without causing lumping of zinccontaining filler components into a difficult-to-use form in the bottom of its container.

It has been discovered that in order to produce faster curing and harder coatings from compositions in which the polyol silicate binder has alkoxyalkyl groups, the solvent present should have a more rapid rate of evaporation than the bonded groupings on the silicon atoms of the silicate. For instance, if the groupings on the silicate are ethoxyethyl then the major portion of solvent or diluent should preferably be one that evaporates more rapidly than 2-ethoxyethanol if a less porous, stronger film is desired. The solvent should evaporate before the coating cures, and if the solvent is present when the coating cures, the cured coating will be softer and more porous and have less strength and less abrasion resistance.

The galvanic protective coating compositions of the invention are comprised essentially of the polyol silicate binder and finely divided particulate filler containing metallic zinc as an essential ingredient. The metallic zinc component of the filler may be elemental zinc or a zinc alloy higher than iron in the electromotive series of metals. These finely divided zinc materials may be referred to as dust and often they may have particle sizes below about 50 microns, but for some compositions, courser particles may be used. The preferred size range for the zinc dust is about 2 to 10 microns. The zinc component is galvanically-active and often contains at least about 85 or 90, preferably over 99, weight % zinc with or without a small amount of zinc oxide. The galvanic protective coating compositions contain a sufficient amount of metallic zinc to provide a galvanic effect when the coating composition is cured on a ferrous substrate. The amount of metallic zinc based on the total weight of the polyol silicate and zinc, or on a cured coating basis, may be at least about 1 weight %. The amount of zinc is often at least about 40 weight %, and preferably about 50 to 95 or 98 weight %, on the same bases. This amount is not so high or low that the composition is not suitable for its intended use. These galvanic protective compositions may also contain an organic solvent, e.g. of the types and in the amounts described above, and preferred compositions of the invention contain a solvent in an amount to provide a coating formulation of satisfactory viscosity considering the other ingredients present and the contemplated use for the composition.

My coating compositions containing the polyol silicate binder reaction product may have inorganic fillers, as well as various other components added to provide beneficial effects. Thus, the composition may contain one or more essentially organic solvent-insoluble components, and these materials are often naturally-occurring or synthetic mineral materials in finely divided form. The fillers may be, for instance, oxygen-containing forms of various metals, including silica in its various forms, or the oxides or silicates of aluminum, zirconium, zinc, tin, magnesium, chromium, titanium, iron and mixtures of such materials. The naturallyoccurring minerals may be of the acidic, basic or neutral or amphoteric types. The preferred materials for single component compositions include one or more of talc, hydrated alumina, alumina, chrome oxide, novaculite silica, iron phosphide, and minor amounts of suspending clays such as bentonite, montmorillonite, suspending asbestos or talcs, in addition to the zinc dust — although a great variety of fillers may be used. Of all the fillers and diluents for the zinc, alumina imparts much greater life and hardness to the zinc silicate coatings of this invention, inhibiting white zinc rust formation, and extending life in moist and salty atmospheres without causing stability problems. A greater effect of the use of alumina and iron phosphide with the zinc filler was noted in long aging of these coatings and dilution of the zinc with as much as about 60% of alumina is possible in thicker, higher build coatings using the novel polyol silicates of the invention. Alumina is an inexpensive diluent for the zinc and imparts stability to the paint and hardness to the resulting coatings without decreasing the coating life greatly. Both montmorillonite clay and neutral talc, as finely divided fillers, impart smoothness to the zinc films and improve coating life as diluents for the zinc dustpolyol silicates, used in my invention.

The amounts of these non-zinc inorganic fillers that may be included in the compositions of this invention are not so great that an unduly deleterious result is obtained, for instance, they should not in single-package compositions cause undesirable gelling or gassing of the composition. Moisture in the filler is not desirable in single-package compositions, and the filler, in the absence of zinc dust, may be dried by allowing it to stand or by heating it with the polyol silicate prior to addition of the zinc. The moisture can react with the polyol silicate, and if the moisture is present in minor amounts, its reaction with the polyol silicate should do litte harm. The gelling and gassing effects have been observed where excessive amounts of moisture in the solvent or in hydrated minerals was present and they were not included in the compositions sufficiently in advance of the zinc dust to permit reaction of the moisture with the polyol silicate. Often, the amount of the inorganic filler other than metallic zinc, which may be included in the compositions is about 0.1 to 1000 weight percent, preferably about 1 to 600 weight percent, based on the polyol silicate present, and depending on the filler type, absorption and ultimate use. The total amount of metallic zinc based on the total of the inorganic fillers and zinc in the galvanic coating compositions may be as little as about 10 weight percent or less, but is preferably more than about 50 weight percent where a good galvanic coating is important.

It may be advantageous to include zinc oxide in some of the compositions, especially the multi-package compositions, of the present invention since it may cause gassing or decomposition of the zinc paint on long standing in sealed containers, even if the zinc oxide is present in relatively small amounts, particularly if it has absorbed any moisture. The zinc oxide may accelerate curing and hardening of the coatings containing other fillers, particularly coatings with relatively small amounts of zinc. The zinc oxide can be included in the multi-package, zinc dust compositions, for instance, those containing the polyol silicate in solution in an organic solvent in one package, and zinc dust and zinc oxide in the other package, with or without a solvent such as methyl ketone or a compatible hydrocarbon. Preferred intermediate two-package systems containing zinc in one and polyol silicate in the other may also contain a curing catalyst, for instance, of the type discussed herein. The zinc oxide may be in the zinc package. The amount of zinc oxide in the compositions may be a minor proportion sufficient to enhance the curing properties when the composition is cured as a coating on a substrate. Finely divided metallic zinc may have zinc oxide formed on its surface. It may be further advantageous to include in certain of my compositions a total amount of zinc oxide of, for instance, about 1 to 50 weight percent, preferably about 3 to 10 weight percent, based on the zinc employed. The zinc oxide is preferably essentially anhydrous, e.g. essentially zinc hydroxide free.

The coating compositions of this invention may also contain a curing catalyst in a minor amount sufficient to increase the rate of curing when the compositions are applied and cured as coatings on a suitable substrate, and exposed to moisture, for instance, that in the atmosphere. These catalysts may, with advantage, be a combination of materials which, together with the zinc dust, filler, solvent and polyol silicate, while in an anhydrous state remain in an unreaction condition, but upon evaporation of the solvent and exposure to atmospheric moisture in a coating, catalyze the deposition of silica and reaction to form a fast hardening zinc silicate coating. For instance, weakly-basic amines such as the unsaturated heterocyclic amines or triethanol amine polyol silicates added to the paint (strong amines are generally not desirable since they may cause brittle coatings with poor adhesion and deteriorate the binder on aging) may be a curing accelerator as well as a stabilizer. Minor amounts of the acid salts of zinc such as zinc chloride, zinc acetate, zinc octoate and mixtures of the acids and acidic salts are curing accelerators, and it is particularly advantageous to use these salts in conjunction with minor amounts of weakly-basic amine buffers, an alumina filler, particularly hydrated alumina, or chrom oxide to stabilize the compositions against lumping and gassing. Other catalysts include zinc chromatic yellow, alkali metal alcoholates, and the like. Other catalysts may include minor amounts of other metal chlorides such as chrom chloride, magnesium chloride, aluminum chlorohydrate, etc., in conjunction with a weakly-basic amine stabilizer or alumina, including hydrated alumina, which tend to inhibit the gelling and gassing tendencies of the metal chloride in the presence of the zinc dust.

Other materials which act as cross-linking agents to provide rapid heat-curing formulations are minor amounts, say about 0.5 to 20%, based on the polyol silicate present of solvent-soluble copolymers such as methlated or butylated melamine, formaldehyde copolymer resins such as the commercial products known as Uformite mm83 from Rohm and Haas Co. and Amino Formaldehyde resin product 500-15 made by Koppers Company, or similar solvent-soluble amino-formaldehyde resins. These may merely be added during formulation of the paint. Other catalysts or coating hardeners may be employed and include compounds which may react with the zinc dust and binder during curing, e.g. chlorinated compounds such as $CCl_4$ or alkali metal alkoxides such as potassium methylate. The curing catalysts may be added to the polyol silicate composition at the time desired, and may be included in the liquid organic solvent solution of the binder before metallic zinc is added, or along with the zinc or other fillers. These compositions also preferably contain an inorganic filler, especially alumina, hydrated alumina, chrome oxide and talc, and preferably may be marketed with metallic zinc as a single package paint, and may be carefully buffered, or they may be marketed as a two-package formulation to later be combined with metallic zinc to form galvanic coating compositions. Thus, a particularly attractive marketable product may contain the polyol silicate binder, organic solvent, buffer and curing catalyst, with or without a filler. The amount of each of the curing catalyst and buffer which may be included in these various compositions is often about 0.00001 to 10 weight %, preferably about 0.001 to 5 weight % (depending on the catalyst and stabilizer), based on the polyol silicate. When curing catalysts are present with the filler and binder, the filler should not be present in amounts, considering its extent of hydration, that may cause slow gelling of the binder before use. This is particularly true with hydrated talcs, clays and the like. Curing catalyst compositions may be made containing an alkoxyalkanol solvent such as 2-ethoxyethanol, a minor amount of acidic zinc salt, e.g. zinc chloride, and a sufficient amount of hydrated alumina or chrome oxide and/or weakly-basic amine buffer which will increase the stability of the paint, yet enhance the curing of the coating comprising the polyol silicate in which the catalyst is used. The combination of a hydrated alumina, weakly-basic amine buffer and zinc chloride in the paint works very well— the zinc chloride causing rapid curing and the alumina and weakly-basic amine buffer stabilizing the paint against gelling, gassing or thickening.

Curing of the film containing polyol silicate reaction product and zinc dust containing fillers may occur without any added curing accelerator or hardener; however, although it may not be necessary it may be advisable to accelerate the cure and to improve the hardness where abrasion of the coating may occur, such as on decks of ships and steelcoated walkways. Improved hardness and faster cures may be obtained by using catalysts which may cause more rapid reaction of the silicate or silicate products of curing and the zinc dust or filler by deposition of the silica between the packed zinc dust and filler particles in a more adhesive form, or reaction to bind the zinc particles together. Generally, the deposition of and/or reaction of the adhesive silicate with the zinc dust should occur after most of the solvent evaporates to allow better packing of the zinc particles and a harder film.

In two-package systems, the catalyst or accelerator may be added to either package, depending on which it is most compatible. The catalyst or accelerator may change from an inactive catalyst to an active one when the film containing it is exposed to moisture during curing, yet remain inactive with the anhydrous binder and/or zinc dust or filler. Such is true with esters of acids and complex metal salts which hydrolyze on exposure of the film to moisture in the air, or compounds which, on addition of the zinc dust, are released to form catalysts which accelerate hardening. In other cases, the accelerator, such as zinc oxide, either on the zinc particles or separately added to the composition, may, when mixed with the polyol silicate binder, upset the equilibrium by pH change and produce silicate structures which cure the coating more rapidly.

In other cases, two or more compounds may contribute as accelerators for curing and hardening, such as, for instance, hydrated alumina or magnesium silicate and zinc chloride or zinc chloride and alkoxy alkanols together, and may each be used advantageously in two-package compositions for rapid curing. A great variety of hardening agents are known, which may be used in two component compositions such as (minor amounts, e.g. about 0.0001 to 1% based on the polyol silicate binder) acids, metal acid chlorides and other salts, anhydrides, hydrolyzable esters of acids, alkali alcoholates, zinc chromate, iron oxide, and minor amounts of lead and chrome components, etc. Copper compounds may cause galvanic degradation of the zinc coating itself.

In other cases, very minor amounts of chloride compounds such as hydrochloric acid, $CCl_4$, zinc chloride, aluminum chlorohydrate, or other metal chloride, may enter into a reaction with the ZnO on the surface of the zinc dust to give a zinc oxychloride or aluminum oxychloride bond insitu with the silicate-zinc bond and deposition of adhesive silica all contributing to form harder coatings which may have a tendency to mud crack. The uses of accelerators and hardeners may not be necessary and need not be limited to the above reactions and the actual reaction mechanism of the polyol silicate with zinc dust to cure as a galvanic protective film is unknown, and its great advantage in forming easier-to-use paints producing superior zinc silicate bonded zinc dust films was totally unexpected.

The polyol ortho silicate products of the present invention can be used to make either single or multiple package coating compositions of exceptional properties. Thus, one package or component may contain as its essential ingredient the polyol ortho silicate, and this component is designed to be mixed with another package containing finely divided zinc as its essential ingredient. These packages can be mixed to form a galvanically-protected coating composition at or near the time the composite is to be applied to a ferrous metal or ferrous metal scale covered supporting substrate or otherwise used and cured or can be made into a single component paint. The polyol ortho silicate in the first package of a multiple package paint can be made from the various ratios of polyol to ortho silicate as designated above, and the multiple package form of the invention is useful over the broad range of polyol to ortho silicate ratios disclosed herein. The polyol ortho silicate reaction product may be made with or without the removal of alcohol during or after the ester-exchange reaction, and any alcohol present in the product may not be disadvantageous, except to lower flash point and increase tendencies to dry spray. Glycol ethers can be used as co-solvents and tend to esterify into the compositions on standing and, when used as the major solvent, give less volatile and higher flash point compositions having a longer shelf-life. Also, the resulting coatings may be harder than those in which the solvent is predominantly hydrocarbon. In the case of the multiple package coating compositions, the separate packages are often combined shortly before use, and extended storage of the mixture is usually not contemplated. In these situations, the instability of the mixed product due to the conjoint presence of fillers, moisture impurities, the polyol silicate binder (having higher hydrolysis) and zinc may not be disadvantageous, since they often are applied as a coating prior to any reactions to cause gas, gel, form lumps or thicken extensively as a liquid paint.

The single-package composition or first composition or first component of the multiple package system often contains polyol ortho silicate dissolved in a solvent which may be or include the alcohol formed in the ester-exchange reaction or any excess polyol reactant, but the solvent portion of the component may advantageously be composed to a substantial, and preferably to a major, extent of an added or extraneous organic solvent of the types described herein such as an alkoxyalkanol and/or hydrocarbon. These solutions contain sufficient solvents so that they can be readily handled, and often the amount of solvent is 0 to about 600 wt. %, preferably about 100 to 400 wt. %, based on the polyol silicate. The amount employed may be affected by the binder composition and its silica content. The polyol silicate component or the finely divided zinc component of the multiple package systems may also contain other ingredients such as inorganic fillers of the types described above, particularly one or more of silica, alumina, clay, chrome oxide and the like, stabilizers or buffers and curing catalysts, as well as all of these types of materials. The components of the package may contain minor amounts of other fillers which may act as suspending agents, anti-sag agents, or thickening agents such as bentonite, asbestos, montmorillonite, hydrated alumina and the like, and may contain treated fillers such as quaternary ammonium-treated clays.

In another form of the invention, particularly useful in automatic coating during which a near instant cure is required, a combination of finely divided zinc, suspending agent or agents, anti-sag agents, a minor amount of a curing catalyst, e.g., acidic zinc salt such as one or both of zinc chloride and zinc acetate or the like, a minor amount of a thickening agent, e.g. polyvinyl butyral, and an organic solvent of the types described herein, such as a ketone, e.g. methyl ethyl ketone, with or without aromatic-containing hydrocarbon, may serve as one component of the package. The materials may form a relatively non-settling, non-gassing, non-gelling slurry of dispersion which is stable for months or years and is ready for immediate use upon mixing with the other package comprising the polyol silicate with solvent and dispersing fillers. When the packages are mixed, they may be useful for several days or weeks and when a longer pot life is necessary, the mixture may be reactivated by adding more of the polyol silicate component to prevent gelling. Either of the packages may contain inorganic fillers, including suspending and anti-sag fillers as additional ingredients, and particularly useful are one or more of alumina, bentonite, clays, chrome oxide, iron oxide, asbestos, hydrated alumina, zinc oxide, talc, and silica, but preferably, the fillers are put in the polyol silicate package. Zinc oxide is preferably in the package containing the finely divided zinc, and the zinc oxide ultimately serves to give a faster curing coating. The component containing the finely divided zinc may have this ingredient in substantial amounts based on the total zinc and filler component, while the curing catalyst is a minor component dissolved in the solvent, if present at all. Frequently, the solvent to finely divided zinc ratio is about 1 weight part solvent to about 1 to 15 weight parts of zinc. Also, the curing catalyst, e.g. zinc chloride, may be optionally included as a minor ingredient in the solvent-zinc slurry component, e.g. about 0.0001 to 15 weight %, preferably about 0.001 to 1%, based on the zinc, or about 0.0003 to 3 weight % of the polyol silicate in the other component. It is advantageous to use the zinc chloride in conjunction with an alumina filler with the zinc formulation.

In the many products of the present invention, the amounts of their various components and their chemical nature may affect the characteristics of coatings obtained from these compositions and, for instance, control over the ratio of polyol silicate to metallic zinc and any other particulate fillers present may be significant in producing compositions which cure quickly to hard, strongly adherent coatings. If an inappropriate amount of an ingredient is included, the resulting coating may be objectionably soft, and the proper total ratio of metallic zinc, and any other particulate filler, to the polyol silicate reaction product that is employed may depend on the particulate size of the metallic zinc or other filler and thus upon the surface areas of these materials. Zinc oxide which often contains zinc hydroxide may cause severe gassing of the single package compositions. Zinc oxide, however, whether added as such or present on the surface of the metallic zinc, apparently reacts to some extent with any chlorine compounds present and with the polyol silicate binder or the curing catalyst to enhance the contact of the solvent and the polyol silicate with the surface of the metallic zinc, thereby causing faster hardening of the coating, although possibly causing mud cracking. Some fillers, such as alumina, neutral talc and clay and oxidation products of the zinc, apparently reduce the degradation of the metallic zinc, particularly if the filler is neutral and does not contain a metal which will build an electric chemical reaction with the zinc, causing its degradation such as copper compounds. The galvanic life of the coating may increase by the provision of greater amounts of metallic zinc in the compositions.

I have found that the polyol silicates of this invention in the presence of zinc dust have reduced tendencies to gas or form lumps when a minor amount of a weakly basic amine is added to the paint. Examples of these weakly basic amines include the unsaturated heterocyclic amines such as the pyridines, pyrimidines, pyrroles, pyridazines, picolines, lutidines, etc., often having up to about 12 carbon atoms. These examples of amines include the polyol silicate reaction products of this invention made from polyalkanol amines such as triethanol amine, e.g., the product of the reaction of Ethyl polysilicate 40 (40 wt. parts), triethanol amine (50 wt. parts) and 2 ethoxyethanol (70 wt. parts) or the reaction product of equal mols of triethanol amine and tetraethyl orthosilicate. These products can be made by heating the reactants together at about 120°C. to effect ester-interchange. Other weakly basic amines may also be used to stabilize the zinc silicate paints against gassing and lump forming. Strong amines are not desirable and tend to cause degradation of the binder upon aging and cause mud-cracked films in the polyol silicate zinc coatings. The amount of the weak base employed should be sufficient so that the composition is stabilized, e.g., does not form lumps or gas when zinc dust is present. The actual amount of this added buffering amine necessary may depend on the presence of other salts or acidic materials which when present may require the use of greater amounts of amine sufficient to complex and inhibit gassing and agglomeration of the zinc to cause cementing. Suitable amounts of amine are often in the range of about 0.5 to 10 or more weight % based on the weight of the polyol silicate, and the amine may be added to the polyol silicate, which may include solvent, before the zinc is included and the amine-containing intermediate products marketed or handled as such.

Other objects, features, and advantages of the invention herein disclosed will be readily apparent from the following description of certain embodiments in the following examples, but variations and modifications of the invention may be effected without departing from the spirit and scope of the novel concepts presented.

The invention will be further illustrated by the following specific examples in which, if not indicated otherwise, the percentages are on a weight basis.

EXAMPLE I

| REACTANTS | MOLES | PARTS BY WEIGHT |
|---|---|---|
| Tetraethyl orthosilicate (containing less than 3% dimer and polymer) | 4.8 | 1000 |
| Ethylene Glycol | 7.25 | 450 |
| CATALYST | | |
| Sulfuric Acid (98% $H_2SO_4$) | | 1 to 3 drops |
| LIQUID VEHICLE FOR BINDER | | |
| Methyl Ethyl Ketone Solvent (Mixed with equal weight of above binder) | | 200 |
| INORGANIC MATERIAL | | |
| Zinc Dust | | 500 |
| Zinc Chloride | | 2 |
| Talc (Sierra Mistron Monomix) | | 100 |

1000 Grams of substantially anhydrous tetraethyl orthosilicate, containing less than 3% by weight of a dimer plus polymer, together with 450 grams of ethylene glycol are mixed together in a suitable reaction vessel equipped with heating means, a stirrer and a condensing head having a take-off for condenser. The mixture is heated to a temperature of about 100°-110°C. and 1 to 3 drops of sulfuric acid (98% $H_2SO_4$) are added.

During the first few minutes after the sulfuric acid addition, the mixture in the reaction vessel turns yellow, but clears up toward the end of a 3-minute period. Ester-exchanged alcohol starts distilling off overhead. The rate of such distillation is controlled so as to regulate the rate of reaction and to prevent overheating. Evaporation of the liquid in the reaction vessel tends to cool the liquid. Consequently, control of the rate of distillation controls to some extent the temperature of the reaction mass. The amount of alcohol removed and collected controls the polymer mass, viscosity and structure.

Distillation may be carried out at atmospheric or subatmospheric pressure to remove the last traces of free alcohol. Collection of the condensed alcohol (and any other condensed distillate) is continued until 425 to 450 grams of alcohol have been distilled and collected. At about this point, the reaction mass in the vessel exhibits a tendency to gel or become objectionably viscous, due to excessive polymerization reaction. The mass may be diluted with a solvent such as toluene. Heating is thereupon discontinued and a small proportion of toluene, in the neighborhood of 200 ml. is added to cool the reaction mass and dissolve the polymer that has formed as a result of the polymerization reaction between the silicate and the glycol. Upon thinning the reaction mass with toluene, the resulting solution was removed from the reactor. After the reaction was run and weight balances obtained, it was noted that the glycol used was found to have about 1% by weight of water, which apparently did not cause any problems with the product or reaction.

A weight balance shows the following:

| | PARTS BY WEIGHT |
|---|---|
| Overhead | |
| Alcohol | 425 |
| Recovered Solution | |
| Polymer product | 953 |
| Toluene (added to dissolve and liquefy polymer product) | 173 |
| Lost | |
| Solids (in bottom of reactor) | 41 |

The recovered polymer solution had the following characteristics and constituents:

| | |
|---|---|
| Viscosity | 8 cps. |
| Odor | toluene only |
| Silica (Equivalent on $SiO_2$ basis) | 24.8% |
| Liquid (colorless) | 75.2% |
| Active polymer product | 84.7% |
| Toluene | 15.3% |

After the cooled solution had been removed from the reactor, 100 parts by weight of such solution, referred to as "OP4" were used to make up a mixture containing zinc and having the following composition:

| | |
|---|---|
| OP4 | 100 |
| Zinc chloride (Zn Cl₂ Anhydrous) | 2 |
| Methyl ethyl ketone (MEK) | 100 |
| Zinc Dust | 500 |
| Talc (a platy magnesium silicate) | 100 |

As to procedure, the OP4, MEK and zinc chloride are mixed thoroughly and the zinc dust added to the resulting mixture in a high shear blender. The pigment suspension so obtained is applied to a ferrous metal surface, for example, by brushing the suspension onto a cold-rolled non-sandblasted steel panel. The suspension is easily applied and not lumpy, and after 10 minutes gives a very hard, strongly adhering coating. After drying for a further 15 minutes, the coating upon being tested for water and oil solubility is found unaffected by both. Upon top coating the surface of the coated panel with a high-build vinyl coating, excellent adhesion is exhibited. The coated and scored panel also shows excellent resistance to salt corrosion when exposed to a spray of a 5% salt solution at 95°F., even after long aging.

The coating, which is from 2 to 3 mils in thickness when dry, shows an absence of cracking, good adhesion by the cross-hatch test, no loss of adhesion from 1/16 inch knife scores, and good heat resistance. There is substantially no loss of adhesion or of toughness when the coating is heated for brief periods to 1100°F., although prolonged heating at 1100°F. shows that oxidation of the coating takes place.

A bending test shows no loss in adhesion when bent 90° and only a slight loss when bent through 180°. An impact test shows superior results by comparison with other known zinc silicate coatings.

The reactions that take place in carrying out the method of the foregoing example, wherein the polymer is substantially non-hydrolyzed and anhydrous conditions are maintained, lead to the formation of a polymer portion having the novel "backbone" structure represented by the grouping

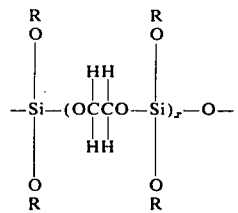

wherein R is ethyl or hydroxyethyl (pendant glycol) and x is 1 or a higher number.

EXAMPLE II

2500 Grams of ethyl silicate condensed, containing 95.5% of tetraethylorthosilicate monomer, 4% dimer and 0.5% trimer and some higher polymers, are mixed with 1120 grams of ethylene glycol in a 5 liter flask equipped with a pot thermometer and a reflux thermometer, stirrer, and short receiver. An immiscible dispersion occurs on stirring this mixture, but upon heating the mixture with continued stirring to about 105°C. (pot temperature) and upon adding as catalyst 3 drops of concentrated sulfuric acid (98% $H_2SO_4$), the mixture shortly clears up and within a few minutes, ethyl alcohol starts distilling off. A total of 1125 grams of ethyl alcohol is collected up to the point when the contents of the vessel started to thicken noticeably. The contents of the vessel are then cooled and 100 grams of xylene are added. The resultant liquid product is stable and active as a binder.

The binder so prepared is hereinafter designated as "Silicate No. 1." It remains stable and active as a binder for a period of at least six months, and probably much longer.

EXAMPLE III

500 Grams of "Silicate No. 1" are mixed with 500 grams of methylethyl ketone and 2 grams of zinc chloride solution, together with 200 grams of dried talc powder (Sierra Neutral platy talc) highly sheared into the binder. 2500 Grams of zinc dust is then slowly stirred into the composition, and the resulting mixture is thoroughly blended. The resultant product when stored in a one gallon sealed can and kept therein over a six-month period remains stable and useful as a highly adhesive galvanic coating, without any noticeable change upon aging over this length of time. The resulting paint is hereinafter called "Paint 1a."

EXAMPLE IV

"Paint 1a" is used in a system for continuously and automatically dip-coating cleaned steel parts. For this purpose, the parts are placed in a wire mesh screen container, and after being dipped in Paint 1a are removed and the excess paint liquid thrown off centrifugally while, at the same time, spreading the coating evenly over the surfaces of the parts undergoing treatment, especially in and about any tubular holes and adjacent areas. The parts so coated are then dumped into a pointed wire screen to minimize contact between the wet painted surfaces and the supporting surfaces of the screen. Rapid drying of the coating takes place upon agitation of the screen-supported parts in circulated warm, moist air under a hood. The coatings cure in just a few minutes.

Thereafter, upon testing the coated parts for thickness, hardness, immersion in a variety of solvents, adhesion when exposed to salt fog (5% salt at 95°F.) and outdoor exposure, the following test results are obtained:

| | |
|---|---|
| Thickness of coating | 1.5 mils (average) |
| Hardness (pencil) | 4H |
| Adhesion by cross-hatch method | Excellent |
| Brittleness (bend) | Not brittle |
| Heating to 750°F. for 4 hours | No effect |
| Heating to 1100°F. for 1 minute and dashing into cold water | No effect |
| Solubility in boiling water | None noticeable |
| Solubility in boiling xylene | None noticeable |
| Solubility in hot lube oil at 300°F. | No effect |
| Outdoor exposure, 45° tilt to south | No rust after 6 months |
| Salt fog (5% salt - 95°F.) | No rust after 2000 hours |
| Solubility in boiling salt water | None noticeable |
| Hot water immersion | No effect. |

When the paint is sealed in a can and kept over a six-month period, no pressure builds up. The paint is easily dispersed and the tests noted above upon being repeated at the end of the six-month period give identical results to those obtained by tests on the fresh paint.

No differences of any significance and no degradation of the paint are ascertainable during a 200 hour aging period.

In a similar evaluation when the glycol alkyl silicate binder described was diluted with an equal volume of xylene instead of the methyl ketone and 2-½ wt. parts of zinc dust added per part of diluted binder, the resultant paint was kept in perfect useful condition for a period of one and one-half years. The coatings from this binder were excellent providing a hard, quick curing and adhesive and highly protective coating for steel.

When the glycol alkyl silicate binder was diluted with an equal volume of a high flash aromatic solvent and 2-½ parts of zinc dust and ½ wt. part of a platy silica flour (Noviculite) and one three-thousandths of one part of triethyl amine added to the mix and applied as a coating on a clean steel substrate, the coating dried rapidly, was adhesive and protective. (Pencil hardness 3H — Salt spray 5% salt 95° F. — greater than 3000 hours — no rust). This paint mix was kept for 1-½ years and found to be non-gassing as a coating and did not settle to a hard layer on the bottom.

EXAMPLE V

In preparing a paint designated as Paint 1b, 500 grams of the glycol alkyl silicate binder from Silicate No. 1 are mixed with 500 grams mesityloxide, 4 grams of zinc chloride, 2500 grams of zinc dust and 200 grams of talc, employing a high shear blender to effect thorough blending and mixing. Tests identical to those made in Example IV indicated that excellent coatings are obtained with nearly identical properties to those obtained in the testing of Paint 1a.

EXAMPLE VI

500 Grams of the glycol alkyl silicate binder designated previously as Silicate No. 1 are mixed with 500 grams of methylisobutyl ketone, 2 grams of zinc chloride, 2500 grams of zinc dust and 200 grams of talc. Upon being tested in an identical manner to the tests above recited, the coating composition designated as Paint 1c gives identical results except that the coating produced therefrom is somewhat softer, but it passes all of the tests to which Paint 1a was subjected.

EXAMPLE VII

500 Grams of Silicate No. 1 are mixed with 500 grams of xylene, 2500 grams of zinc dust and 50 grams of neutral talc. The resulting coating from the coating composition, designated as Paint 1d, passes all of the tests described above, but the resulting coating is somewhat softer and less adhesive than the coating from the application of Paint 1a.

EXAMPLE VIII

500 Grams of the glycol alkyl silicate binder, Silicate No. 1, are mixed with 50 grams of methylethyl ketone and 450 grams of xylene, together with 2500 grams of zinc dust, 10 grams of bentonite, and 60 grams of talc. Four grams of zinc chloride are added and the mix is subjected to high shear mixing in a Waring Blendor. The resulting paint, here designated as Paint No. 13, appears to be a little softer than Paint No. 1a, but equal to the latter in all other respects.

In order to provide a harder coating than, for instance Paint 1a, various forms of finely divided silica, such as Cabosil, a finely divided pyrogenic silica aerogel, can be added in an amount equal to about 5 grams of the other ingredients of Example III, or a still harder coating is obtainable by adding 100 grams of Minusil of an average particle size equal to 5 microns.

EXAMPLE IX

2500 Grams of ethyl silicate "condensed" and 1125 grams of ethylene glycol are heated to 110°C., and 5 drops of toluene sulfonic acid dropped in to catalyze the ester-alcohol exchange. Alcohol is distilled off as in Example II until 830 grams of ethanol have been removed. The removal of the alcohol is stopped before a high polymer is produced. The residual mixture in the reaction vessel, which is termed Silicate Binder No. 2, produces a somewhat softer and less adhesive coating, but all of the coatings pass the test heretofore set forth.

EXAMPLE X

950 Grams of ethyl silicate condensed 450 grams of ethylene glycol and 100 grams of propyl trimethoxy silane are heated to 105°C., and two drops of concentrated sulfuric acid added as catalyst. The mixture clears up with the volatilization of alcohol. After a total of 480 grams of alcohol have been removed, the colorless viscous liquid remaining in the reaction vessel is made into a series of paints in the same proportions as in Example III, but in smaller quantities. Identical testing procedures give similar results to those shown in Example IV, but all of the resulting coatings are harder and superior to those obtained from paint 1a, as in Example IV.

In the paint produced in accordance with this Example, the backbone is believed to contain some

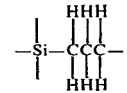

bonds in addition to the

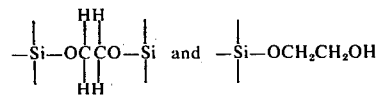

bonds that are thought to be present in the coatings of my invention as exemplified in my foregoing examples.

EXAMPLE XI

1200 Grams of ethyl silicate condensed and 670 grams of propylene glycol, with 2 drops of concentrated sulfuric acid to catalyze the ester-alcohol exchange are mixed and heated, as in Example I, to 110°C. 637 grams of alcohol are removed before further polymerization is stopped by cooling the residual mass. The resulting mass is very viscous. Paints made from this viscous binder designated Silicate Binder No. 4, but using smaller quantities of the binder than shown in Example II for Silicate No. 1, give coatings that are harder and slightly less adhesive but satisfactorily passing all tests.

Aerosol cans (200 ml. capacity) are filled with 30 ml. of Silicate Paint (Ex. No. 4), 60 ml. of Freon 11 and 60 ml. of Freon 12, with steel bolt as an agitator to permit adequate mixing upon being shaken. These cans in a sealed state kept their contents in good conditions, ready for use in touch-up galvanizing of surfaces.

EXAMPLE XII

Any of the foregoing paints is suitable for application as a thin primer coating upon steel parts that are to be formed into prefabricated structures by welding, since the primer coating permits welding right through the coating. After being welded, as in the erection of a building from such prefabricated structures, the erected structure is recoated with a thicker coat of the same zinc silicate coating composition.

It is feasible to carry these operations out in an automated production line upon cleaned and sand or shot blasted structural pieces, which are then dried and either stored for erection later on or are erected immediately, or are topcoated with a thicker coat of the same zinc silicate coating composition, without the need for removing any rust that may have formed. In the welding operation, the zinc silicate coat is coverted into the wholly inorganic silicate — ZnO, SiO, which exhibits no burnback in automatic welding tests and is not detrimental to the strength and other properties of the weld when the coat has a dry thickness of less than ¾ mil.

EXAMPLE XIII

To the glycol alkyl silicate polymer as produced, e.g. in Example I, prior to adding any solvent, there are introduced into the reaction vessel 200 grams of 2-ethoxy ethanol and heating is continued until 120 grams of additional ethyl alcohol are driven off and collected. At this point, the contents of the vessel start to thicken, the heating is stopped and the reaction mass cooled by the addition thereto of 50 ml. of xylene. The resultant product containing a mixture of glycol, ethyl, and ethoxyethyl silicate polymers is diluted with an equal volume of methylethyl ketone and 0.25% by weight of the mixture of zinc chloride added. 200 Grams of the resulting liquid mass are mixed under high shearing action with 500 grams of zinc dust of from 0.5 to 10 microns maximum dimension and .50 grams of fine platy talc. The resultant mix was stable in a paint can for months without developing appreciable gas pressure and without hardening or thickening. Where applied as a coating on a clean steel panel, the coating cures rapidly to a hardness overnight of 4H. Adherence is excellent.

EXAMPLE XIV 250 g. of polyethylene glycol (200 mol. wt.) and 145 g. of tetramethyl orthosilicate were heated together to a temperature of 95°C. and one drop of concentrated sulfuric acid (98%) was added. As a result of ester exchange, 60 g. of alcohol were distilled off and recovered. The bottoms solidified in the flask to a rubbery gel, but were dissolved upon the addition of hot xylene with stirring. The resulting binder was suitable for use in a ceramic coating.

EXAMPLE XV 1350 g. of sodium methylate, 1300 g. of silicon in finely divided form, and 4500 g. of methyl alcohol were slurried together in a large flask equipped with a condenser. At a pot temperature of 80°–90°C., vigorous evolution of hydrogen occurred. The distillate was collected in a second reaction vessel and each 100 g. thereof was reacted with 27.2 g. glycol, using ¼ drop of sulfuric acid as catalyst. Methyl alcohol was distilled off from the second reaction vessel and circulated back to the initial flask containing the finely divided silicon. The methyl alcohol removal was stopped prior to gelling. Periodically, more silicon and methanol were added as they were used up. Otherwise, the reaction was a continuous one to produce as the product glycol methyl silicate or glycol silicate, the ratio of glycol to effluent from the second vessel determining whether glycol methyl silicate or glycol silicate was produced. The distillate from the first reactor contained a compound having about 20% by weight of silica. The final effluent had about 32% by weight of silica.

The bottoms were recovered and diluted with MEK, weight for weight, to provide a binder solution suitable for use in zinc dust coatings.

EXAMPLE XVI

In this example, a novel glycol silicate binder is prepared by an equilibration reaction between (1) the product of a glycol alkyl silicate in which the pendant groups are predominately glycol residues; and (2) condensed ethyl silicate.

In the first step of making the glycol silicate, the starting materials are:

2805 g. ethyl silicate condensed (containing 95% tetraethyl ortho silicate monomer and 5% dimer)
3340 g. ethylene glycol.

These materials were mixed and heated to 110°C. in a 3-neck flask equipped with a thermometer, stirrer, a short column, take-off condenser and receiver. Two (2) small drops of sulfuric acid were added and the mix cleared up as alcohol started coming off. A total of 2480 g. of alcohol was collected. The residue remaining in the flask was recovered as a very thick semi-solid bottoms and was thought to contain predominately tetra glycol silicate.

To 7.2 oz. (0.78 moles) of this bottoms product (tetra glycol orthosilicate) were added 8.8 oz. (1.2 moles) of ethyl silicate condensed in a small round bottom 3-neck flask equipped as above. Upon the addition of ½ drop of concentrated (98%) sulfuric acid to the reaction mass when heated to 110°C., the mix immediately cleared up and alcohol started distilling off. 67 g. of alcohol were collected before the bottoms started to polymerize to a nearly solid condition. Prior to complete solidification, the polymerization reaction was stopped and the bottoms utilized in making zinc dust coatings by dilution of the bottoms with an equal volume of methyl isobutyl ketone (MIBK). The incorporation into one part of the diluted binder solution of 2.5 parts by weight of zinc dust of a particle size substantially within the range of from about 2 to 10 microns, and 0.001 part by weight of zinc chloride provides a zinc-containing coating composition that gives galvanic protection to ferrous substrates. There may also be added to the composition 2.5 parts by weight of alumina ($Al_2O_3$) of −325 mesh particle size and the product is a galvanic coating composition.

EXAMPLE XVII

The equation for the reaction is as follows:

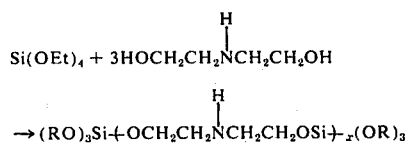

wherein R is an ethyl group and $x$ is an integer of 1 or higher. Also, there is some product present having both hydroxyl groups on the alkanol amine attached to the same silicon atom as follows:

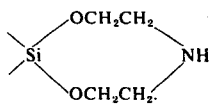

In carrying out this reaction:

150 g. of diethanolamine and 230 g. of tetraethyl orthosilicate were charged into a 500 ml. flask equipped as previously recited herein. Upon heating the charge to 110°C., the reaction started without the addition of any catalyst, and the reaction was continued until the reaction mass started to solidify, at which point the heating and removal of alcohol were stopped. Prior to stopping, 113 g. of alcohol had been removed and recovered. Since this amount of alcohol was equivalent to 2.46 moles, and since 1.43 moles of diethanolamine and 1.1 moles of ethyl silicate had been charged, the logical conclusion was that nearly all of the diol is incorporated into the backbone grouping shown in the above equation. This would indicate a much higher ratio of ethanolamine went into the backbone structure than was ever obtained when glycol was used as the reactant that furnished the (OH) groups. It is surmised that in addition to the bridge compound formed by the diol between two silicon atoms, some product containing the alkanol amine diol with both hydroxyls bonded to the same silicon atom occurred.

Of the residue left in the reaction flask, which is here termed the bottoms product, 25 g. were mixed with 25 g. of MEK and 170 g. of zinc dust (Fed. HE Superfine) and the resulting dispersion was applied to a panel of cold rolled steel. After being dried in 2 minutes, the coating was cured in one hour, but was not as hard as the glycol silicate coating similarly made.

EXAMPLE XVIII

To 300 g. of the product, Product No. 2 of the Table I above, were added 490 g. of butyl alcohol and the product heated to 110°C. Ethyl alcohol was distilled therefrom 300 g. of distillate had been collected, at which point the reaction mass was cooled. The binder solution so obtained had a flash point of over 100°F. by the Pansky Martin closed cup method. When compounded with zinc dust and ceramic fillers, the products made good protective coatings.

EXAMPLE XIX

To 300 g. of the product, Item No. 2 of the Table above, were added 30 g. of dibutyl tin oxide and 30 g. methyl triethoxy silane. The resulting mixture was heated to 110°C. and a small amount of ethyl alcohol distilled therefrom. The resultant product was useful in zinc dust coating formulations, particularly useful when antifoulant type coatings are required such as for the outside of ship hulls.

EXAMPLE XX 200 g. of tetraglycol silicate made as in Example XVI were blended with 200 g. of a partially hydrolyzed ethyl-silicate binder which was prepared as follows: 473 g. anhydrous ethyl alcohol and 143 g. condensed ethyl silicate (28% silica) were mixed and heated to 65°C. and a solution of 0.14 g. hydrochloric acid (37%) in 9.7 g. water added to the above slowly over a one hour period.

25 g. of the above hydrolyzed binder were mixed with 25 g. of tetraglycol silicate (made as in Example XVI) and 70 g. zinc dust (Fed. HE Superfine Zinc Dust) added. The above resultant paint was applied to a sandblasted steel panel as a 2-½ mil film. The coating cured rapidly to a satisfactory coating, but was not nearly as adhesive or hard as my non-hydrolyzed glycol alkyl silicate coatings in a ketone solvent and was not as stable in a one-package formulation.

EXAMPLE XXI 61 g. of ethyleneglycol and 300 g. of tetra 2-ethoxy ethyl silicate were heated to 130°C. and one drop of concentrated sulfuric acid added thereto. 137 g. of 2-ethoxy ethanol were distilled therefrom. The resultant bottoms product was blended with an equal volume of methyl isoamyl ketone and a coating formulation tested as follows:

1 part blended bottoms and ketone mixture
0.003 part zinc chloride
2.8 parts zinc dust.

The above formulation was applied to a clean steel test panel. The coating cured rapidly and gave good protection. The flash point of the paint (Pensky-Martin Closed Cup) was over 100°F. This paint, because of its high flash point, is more useful in painting in enclosed confined areas.

EXAMPLE XXII 99.5 trimethylol propane and 385 g. tetraethyl orthosilicate were heated to 120°C. and one drop sulfuric acid added. A very vigorous reaction ensued: After the alcohol was removed by distillation, the bottoms was cooled and diluted with methyl isoamyl ketone and tested with zinc dust as a paint, and was found to give a passable coating.

EXAMPLE XXIII 184 ml. ethyl silicate condensed and 100 g. triethanolamine were heated to 120°C. Alcohol started coming off at 145°C. 98 ml. of alcohol were removed. Upon continued heating, a total of 165 ml. ethyl alcohol were removed. The bottoms was dissolved in an equal volume of methyl isobutyl ketone and tested with 2-½ parts of zinc dust and 0.002 parts of zinc acetate in a coating. The coating dried slowly to a hard zinc silicate type coating with good protective properties.

The structure of the triethanolamine (TEA) silicate is much more complex than is the glycol alkyl silicate polymer. The TEA alkyl silicate is probably a polymer containing the bridge between two molecules and other compounds contained therein, such as:

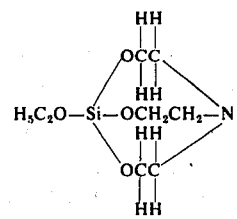

and mixed compounds depending on the degree of reaction and alcohol removal as well as the ratio of TEA and alkyl silicate. The coatings from zinc dust and TEA alkyl silicate are generally inferior in hardness, adhesion and protective value than the more adhesive glycol alkyl silicate polymers.

EXAMPLE XXIV

In a 5 liter, 3-necked, round bottom pyrex glass flask, equipped with a stirrer, 2 plate column, distillation head, receiver, and condenser, were charged 3500 g. ethyl silicate condensed (containing 4% dimer and 1% of higher polymers, and 95% tetraethyl ortho silicate) and 520 g. of anhydrous ethylene glycol and heated while stirring to 110°C. and 1 drop of concentrated sulfuric acid added. Alcohol released by the ester-exchange reactions was distilled and collected to yield 772 g. ethyl alcohol and a bottoms product that was a colorless liquid.

It was noted that this composition would not gel on further heating to 160°C. as is the case when ratios of glycol to silicate are between 1 and 4 moles of glycol per mole of silicate which always gel if the alcohol released is removed to the point where the molecular mass is excessively high. The range of .1 to 0.9 moles of glycol per mole of silicate, and the range when excess glycol is present over the 4 moles of glycol per mole of silicate will not gel on heating to 160°C. no matter how much alcohol is removed. It is advantageous to take these important facts into consideration in designing a plant to make the glycol alkyl silicate polymer without the possibility of gelling up the reactor.

The product bottoms from above were found to contain no free hydroxyl groupings by infrared and NMR analysis indicated the strong possibility of bridge compounds. The product was found to be a mixed distribution of glycol ethyl silicate polymers with some unreacted tetra ethyl ortho silicate with the average distribution of

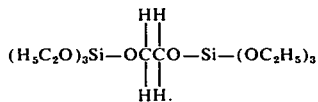

This product and similar bridged polyethanol amine silicate products and tertiary butyl polyol silicate ester exchange reaction products are particularly useful as cross-linking agents for silicone hydroxy functional fluids such as the 2000 viscosity polymethyl siloxane functional OH fluids used for making silicone rubbers and resins. The cross-linking reaction may be accelerated by heat, or the addition of a catalyst such as trace amounts of dibutyl tin dilaurate, zinc octoate, cobalt naphthenate, trimethyl borate, or iron octoate or an acid compound such as dibutyl phosphite or acetic acid, and similar compounds. The polymer rubber or resin so produced is useful in coatings, as adhesion promoters, caulks, sealants, etc. The optimum ratio of the above silicate product to functional fluid depends on the degree of functionality of the silicone hydroxy fluid and the ultimate application. Uses include the treatment of glass and metal, and plastic and wood substrates so that plastics having reactive groupings, with the glycol alkyl silicate-silicone polymer may be bonded more adequately to it. Ranges of from about 1 to 70% mole glycol alkyl silicate polymer based on the silicone functional fluid are useful.

EXAMPLE XXV

This example demonstrates the preparation of tetra glycol silicate in an excess of glycol by heating condensed ethyl silicate and glycol together to 110°C., adding a drop of sulfuric acid catalyst, removing all the alcohol ester exchanged and then adding more condensed ethyl silicate to form by transesterification and equilibration and the desired glycol ethyl silicate polymer with removal by distillation of alcohol formed.

The apparatus was the same as described in Example XXIV. Charge: 2 lbs. 6.4 oz. ethylene glycol and 1 lb. 9.6 oz. ethyl silicate condensed (contg. 95% monomer the remainder being mostly dimer). Heated above charge to 115°C., added 2 drops of concentrated sulfuric acid and distilled off 820 ml. ethyl alcohol. 3.78 lbs. of ethyl silicate condensed were then added and 4 drops of concentrated HCl, as catalyst was added. The alcohol released through ester exchange was distilled from the mix to the point of solidification and then a charge weight of xylene equivalent in mass to the bottoms was added to dilute the product into a usable binder. The solution was a non-viscous pale straw liquid. When mixed with 1 to 4 parts by weight of zinc dust and applied as a coating, to a steel substrate, the paint coating cured to dry to touch in 8 min. and cured to insolubility in organic solvents or water in 2-½ hours. The coating did not mucrack up to 30 mils.

To another part portion of the xylene solution of the binder was added ¼ part of high flash VM&P naphtha and 2.5 wt. parts of a 50:50 blend of novaculite and zinc dust and applied to a clean steel substrate and tested in salt spray application. After 2000 hours, the 3 mil. coating which had been scored was perfect in all respects, and the scored portion was completely filled in with zinc hydroxide products. This shows the galvanic and protective action of this coating, even with the low zinc content. A silicone rubber topcoat was applied over a portion of the zinc dust silicate primer described above. The coating combination in salt spray testing was highly superior.

In another experiment, 1 wt. part of an alumina (Alcoa T61 325 mesh and finer) particulate was added to ⅓ weight part of the above binder. This coating was pigmented with a small amount of $TiO_2$ and applied over the zinc silicate coating to provide a permanent attractive white porous, blister free coating even after 3000 hours in the salt spray. In another test, 5% of red iron oxide was added to the alumina to give an attractive reddish colored topcoat with excellent protective qualities.

To another portion of the xylene solution of the binder was added 0.001 part of triethyl amine, 2-½ wt. parts of fine zinc dust (HE Superfine) and the mix blended in a Waring Blendor. The paint was kept in suspension for a period of 1-½ years, yet when applied as a 2 mil. coating over steel, it cured rapidly to a hard, protective galvanic coating which cured dry to touch in 10 min., dry hard and water and solvent insoluble in 2 hours and withstood more than 3000 hours in the salt spray test.

To another portion of the xylene solution of the binder was added 1 wt. part of zinc dust and 1 wt. part of Novaculite mineral —325 mesh silica flour. The paint was kept in suspension for several months and reapplied as a topcoat over a zinc silicate substrate and found to cure hard and have excellent protective properties in atmospheric exposure and salt spray. Another portion of this paint was applied to a clean steel substrate and found to perform excellently in all the above respects and tests.

To another portion of the xylene solution of the binder was added 2 wt. parts of (Novaculite mineral flour - 10 micron size) and applied as a coating over a zinc silicate primer over a steel substrate. The top coat was porous, never blistered after 3000 hours in the salt spray, and appeared as perfect as freshly applied.

To another portion of the xylene solution of the binder was added 2 wt. parts of Novacite (325 mesh and finer flour) and 1/10 weight part of a 50% solution of $TiO_2$ ball milled dispersion in isopropyl alcohol. This coating was nearly bright white and very attractive. It gave excellent protection to a dull colored zinc silicate substrate even after 2000 hours in the salt spray (5% salt, 95°F.) and remained as perfect as originally put in. The coating was hard, adhesive, yet porous, and attractive. A silicone rubber topcoat was applied on the above topcoat to provide a shiny glossy white surface coating combination, which was also water repellent as well.

EXAMPLE XXVI

This example illustrates a continuous process for making glycol alkyl silicate polymer from silicon metal powder as base. The following equations demonstrate the sequence of the reaction involved:

cate. The contents are heated while stirring slowly to 195°C. and the silicon metal alcohol slurry from B charging flask, charged steadily to reactor A at the same rate the tetraethyl silicate and unreacted alcohol is fractionally distilled therefrom. The evolution of hydrogen through the cold condenser served to remove the unreacted alcohol and product. By continually fractionating the TEOS from the alcohol and recharging the unreacted alcohol with more alcohol as it is used along with the Si metal in the slurry, a continuous automatic equilibrium balance is attained with the resultant preparation of about 1-½ pounds of ethyl, 2 ethoxy ethyl silicate product per day. The mixed alkyl silicate product was then reacted as in the second equation with ethylene glycol while fractionating all the alcohol removed by inter ester exchange, 2 drops of concentrated sulfuric acid added at 100°C. to start the ester exchange and alcohol removal. This was carried out continuously.

In the next step, a ratio of ⅝ mole equivalent of the tetraglycol silicate containing excess glycol was passed into the next reactor and 1 mole of ethyl silicate heated to 100°C. to effect an equilibration reaction in the presence of a trace of catalyst, the glycol alkyl silicate product being the bottoms after continually fractionating off the ethanol, so produced by the equilibration ester exchange reactions. The product was useful in zinc silicate primer formulations.

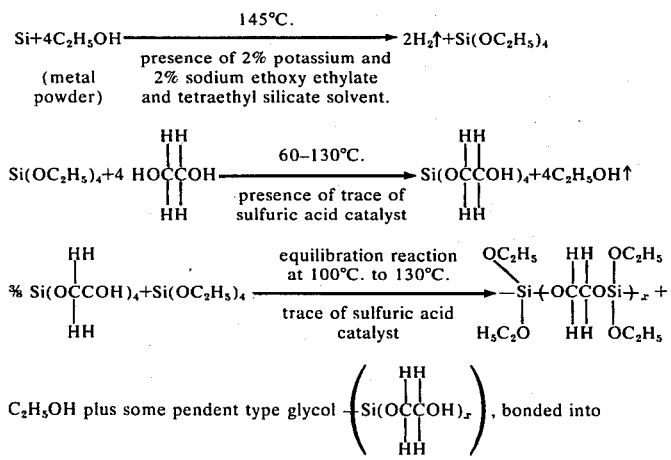

the polymer. The sodium and potassium ethoxy ethylate catalyst was prepared under anhydrous conditions by the addition of alkali metal to the glycol ether. Reactor A is a pyrex glass 1 liter round bottom, 3-neck flask equipped with a heater, thermometer and controller, mantle, glass stirrer and paddle with attached 10 theoretical plate packed distillation column with take-off receiver and return and a hydrogen gas vent on the reactor, receiver beyond the condenser. Also attached is a charging flask (B) of a slurry of 1 gram mole of silicon metal powder, which has been ball milled for 10 hours to reduce particle size, in 4 moles of anhydrous ethyl alcohol and the slurry kept homogeneous by a stirrer and attached to an inlet tube for continuous addition of the silicon-alcohol slurry to Reactor A at the same rate the product and unreacted alcohol are distilled from the reaction zone. A thermometer and temperature controller carefully control the temperature of the reacting zone of the flask. The charge to reactor A was 24 g. of Na metal, 6 g. K metal, 310 g. ethoxy ethyl alcohol and 200 g. tetra ethyl ortho sili-

EXAMPLE XXVII

To the reaction flask and apparatus described in Example XXIV was added 1800 gms. ethyl silicate condensed (containing 95% tetra ethyl ortho silicate and 5% of higher silicate polymers) and 780 g. of ethylene glycol and 100 g. of diethanol amine. No acid catalyst was added or was necessary for the ester exchange occurring between 120 and 145°C. pot temperature. 940 g. of alcohol was removed, at which point the mix separated into two layers and neither layer was found usable in a coating. The bottom layer was insoluble in either xylene or methyl ethyl ketone. However, in an identical run, the alcohol removal was stopped just prior to separation and the product found useful as a binder in zinc silicate coatings.

EXAMPLE XXVIII

In this example, Example XXV was repeated with the change that in the second step of equilibration, ethyl silicate 40 (a siloxane silicate polymer averaging 5 Si per molecule) was substituted for the condensed ethyl silicate. Eight pounds of the ethyl silicate 40 were used instead of the 3.78 lbs. of ethyl silicate condensed, to make a copolymer of glycol alkyl polysiloxane silicate. The product upon removal of some alcohol — stopping prior to gelling — and diluting with a solvent was evaluated and found to give commendable zinc silicate coatings and had good pot life properties in the single package.

A combination inorganic zinc silicate and an organic epoxy zinc coating were prepared by the addition of varying amounts of the novel glycol alkyl silicate polymer to the epoxy zinc paint (Epon Resin 1001). The curing produced a commendable coating of the mixed organic and inorganic variety. The coating had good adhesion.

EXAMPLE XXIX

A mixed ester silicate was prepared by heating to 110°C. in the presence of a trace of sulfuric acid catalyst, 2 moles of methyl cellosolve and 1 mole of condensed ethyl silicate and the ethyl alcohol removed therefrom by distillation to yield the mixed ethyl, methoxy ethyl silicate. One mole of this mixed ester was reacted with one mole of ethylene glycol in the presence of a trace of sulfuric acid catalyst at 100° to 130°C. with the release and removal by distillation of the ethyl alcohol to form the polymer "methoxy-ethyl glycol silicate." Alcohol removal was stopped just prior to gellation of the bottoms product and the product dissolved in a high flash aromatic containing naphtha (1 part product to ½ part by weight of naphtha). For each part of diluted bottoms, 2 weight parts of zinc dust and 0.01 weight part of Cabosil M5 and ¼ weight part of −325 mesh kaolin was added and mixed on a high shear blender to form a homogeneous paint. The paint was test applied to the inside of a steel salt storage receptacle for softening water. The paint dried overnight before the brine was added. The receptacle was examined 1-½ years after coating and found to be rust free. The dry thickness of the film, which was brush applied was between 1 and 4 mils. The paint itself had a high flash point (closed cup over 95°F.).

EXAMPLE XXX

A mixed ethyl and Cellosolve silicate was prepared by heating in the presence of a trace of sulfuric acid 3 moles of Cellosolve (2-ethoxy ethanol) with one mole of tetraethyl ortho silicate and ethyl alcohol was released by ester exchange and removed by distillation therefrom. One mole of this mixed ester and 0.4 mole of tetraglycol silicate prepared essentially as in Example XXVI were heated to 110°C. in the presence of 1 drop of sulfuric acid catalyst, and the remaining alcohol, released by ester exchange, was removed by distillation, and prior to gelling, alcohol removal was stopped and the product bottoms was diluted with ½ its weight of high flash naphtha (aromatic containing) and for each part of this solution was added 1-½ parts of zinc dust and ½ part of talc, blending in a high shear mixer. The homogeneous paint resulting was test applied to a steel basement sewage sump, spraying to a dry thickness of 3 mils and allowing to dry 1 day before use. After 1-½ years, the coating was perfect with no rust, while an uncoated overflow sump next to the coated one, and having been exposed to the same corrosive conditions, had completely corroded. The paint had a Pensky Martin Flash point of 106°F. and was particularly suitable for coating in inside areas where vapor toxicity and flash danger are problems.

EXAMPLE XXXI

Two pound moles of anhydrous ethylene glycol were reacted with one pound mole of tetraethyl ortho silicate by heating to 75°C. in the presence of 2 drops of sulfuric acid. An ester exchange reaction took place and the alcohol formed was not removed from the reaction mixture. The product solution cleared in a few minutes, was cooled, and had the following properties: wt. % silica, 18.0; Gravity at 25°C., 0.99; Viscosity at 25°C., 7.5 cps. The reaction product was a white, colorless liquid with the odor of alcohol. This binder was tested for suitability in zinc dust coatings right after making, by mixing 1 wt. part of the binder solution with three weight parts of zinc dust. The resultant coating composition was applied at 3 mil (wet) to a clean, steel panel and dried to a 2 mil firm, adhesive and hard coating drying to touch in 10 minutes, to handle in 20 minutes, and to hard and insoluble in acetone in 1 hour. The pot life of the zinc-containing composition was several days; however, when the composition was placed in a container and sealed, gassing occurred and the slurry gelled solid in about 2 weeks. The binder solution without the zinc, was tested at 4-month intervals for a period of 2-½ years and found to be active and gave a good coating using the same formulation with zinc during this period. The binder deteriorated very little over this period. Fillers such as "Cabosil" (trademark), silica, zinc oxide, clay, asbestos or talc were also used with the zinc dust in similar formulations with satisfactory results.

EXAMPLE XXXII

Three pound moles of ethylene glycol were reacted by ester exchange with one pound mole of tetraethyl ortho silicate by heating to 80°C. in the presence of 2 drops of 66°Be Sulfuric acid, whereupon the solution cleared up. No alcohol was removed from the reaction. The product was cooled and analyzed: Wt. % silica, 14.9; Gravity at 25°C., 1.02; Color, water white and clear; Odor, ethyl alcohol; Viscosity at 25°C., 8 cps.; Solubility, miscible with an equal volume of xylene — but if zinc dust was added, 2 layers formed. This binder solution was aged for 2-½ years while testing a sample every 4 months for stability and was found to be stable during this time.

Zinc formulation using this binder were tested periodically. The formulations included as filler zinc dust or zinc dust and zinc oxide in a ratio of one wt. part binder solution to 2-½ to 5 wt. parts of filler. In each case, coatings were applied to clean, steel surfaces at a 3 mil. wet film thickness, and the coatings dried to touch in about 10 minutes, becoming soft at first, but hardening well in over 2 hours to form a galvanic coating for the steel which had long lasting protection for the steel surface, when exposed for 2-½ years outside. In each case, however, the product always gassed in sealed containers and gelled in several days. The following table gives these formulations:

TABLE II

| Composition | 14–1 | 14–2 | 14–3 | 14–4 | 14–5 | 14–6 | 14–7 | 14–8 |
|---|---|---|---|---|---|---|---|---|
| Wt. parts binder solution | 10 | 10 | 10 | 10 | 10 | 10 | 10 | 10 |
| Zinc oxide | 5 | 5 | | 1 | 3 | .3 | 3 | 3 |
| Zinc dust | 25 | 45 | 40 | 40 | 40 | 40 | 40 | 40 |
| Polyvinyl butyral | | | | | | 0.3 | 0.3 | 0.3 |
| Talc (neutral platy) | | | | | | | 1.5 | 1.5 |
| Alcoa Alumina (T61) 325 mesh | | | | | | | | 3.0 |

All of the coatings were firm and adhesive to the clean steel panel, and gave long-lasting protection and could be topcoated promptly (after 3 hours).

EXAMPLE XXXIII

To make the binder, 1 pound mole of tetra-2-ethoxy ethyl silicate $Si(OCH_2CH_2OCH_2CH_3)_4$ (Gravity at 25°C., 1.015; Mole wt., 384; $SiO_2$, 15.7%) was heated with 2 moles of ethylene glycol to 75°C. and 3 drops of 66°Be sulfuric acid added. An ester interchange reaction took place and the product cleared to a colorless solution. The solution was cooled and analyzed. 11.8 wt. % silica and a flash point (Tag closed cup) of over 100°C. This binder was found to be stable for 2-½ years, checking each four months in a zinc dust formulation using a ratio of 10 wt. parts of binder solution to 30 wt. parts of zinc dust. The coatings dried to touch in about 10 minutes, and were hard and ready to topcoat in about 1 hour. These coatings applied to steel panels were tested 4000 hours in salt fog, and found to be satisfactory when they were applied at 2-½ mil. or greater. Outside exposure of the coated steel for 2 years showed the coatings gave complete protection, even in scored areas. Various fillers, suspending agents and anti-sag agents were tried in these compositions, all being compatible and used successfully, included in these fillers were bentones, clays, talcs, asbestos, silicas and zircon.

EXAMPLE XXXIV

To show the very superior hardening action and excellent adhesion of two component systems of this invention comprising zinc dust, methyl ethyl ketone (MEK) and a soluble zinc salt such as zinc chloride as one component, and a glycol alkyl silicate binder (called GAS) having a reacted ratio of 1.5 moles of glycol per mole of silicate as the second component, the following table lists first component slurries (FC) which were prepared and aged for a period of 2-½ years:

TABLE III

| Composition | 79–3 | 79–4 | 79–5 | 79–6 | 79–7 | 79–8 | 79–9 |
|---|---|---|---|---|---|---|---|
| Zinc dust, lbs. | 5 | 5 | 5 | 5 | 6½ | 5 | 5 |
| Methyl ethyl ketone (MEK), ozs. | 8 | 11 | 20 | — | — | — | — |
| Methyl n-butyl ketone, ozs. | — | — | — | 11 | 8 | 8 | 8 |
| Zinc chloride 2H$_2$O, grams | 10 | 10 | 30 | 30 | 0 | 24 | 28 |
| Silica (Cabosil M5), ozs. | 0 | 0.75 | 0.75 | 0.75 | 0 | 0 | 3 |
| Talc, ozs. | — | — | — | — | — | — | 2 |

Each of these slurries was stable and non-gelling over a 2-½ year period (the slurry of Run No. 79-7 was too thick to use satisfactorily as a coating and 79-9 settled out and formed a hard to mix-in layer after 2-½ years).

The second component (SC) was prepared by ester exchange between 1.2 moles of ethylene glycol with 1 mole of tetraethyl ortho silicate in the presence of an acid catalyst and with stirring, removal of alcohol therefrom by distillation and dilution with 0.5 wt. part of xylene. This product which was stable over a 2-½ year period analyzed 24 wt. % silica; Gravity at 25°C., 1.0395; Acidity calc as HCl, 0.001; Silica content, calc as $SiO_2$, 24.3 wt. %.

TABLE IVA

Coating Compositions of Component FC and Component SC

| Series | 1 | | | | 2 | | | | 6 | | | | 11 | | | 11A | | | 12 | | |
|---|---|---|---|---|---|---|---|---|---|---|---|---|---|---|---|---|---|---|---|---|---|
| Composition | 1 | 2 | 3 | 4 | a | b | c | d | a | b | c | d | 1 | 2 | 3 | 1 | 2 | 3 | 4 | 1 | 2 | 3 |
| Wt. parts of FC | | | | | IN EACH TEST 150 g. of the first component was charged | | | | | | | | | | | | | | | | | |
| Identity of FC | | 79–5 | | | | 79–9 | | | | 79–6 | | | | 79–4 | | | 79–6 | | | | 79–3 | |
| Wt. parts of SC | 10 | 20 | 5 | 30* | 10 | 15 | 20 | 20* | 10 | 20 | 5 | 30 | 10 | 20 | 5 | 10 | 20 | 5 | 10 | 10 | 20 | 5 |
| Properties of Coatings | | | | | | | | | | | | | | | | | | | | | | |
| Fresh FC | | All Excellent | | | | Fair (Inferior to 1 series) | | | | Fair (Inferior to coatings made with MEK) | | | | Excellent | | E | E | G | E | E | E | E |
| 6 Months Old FC | | Same | | | | Same | | | | Same | | | | Same | | | Same | | | E | E | G |
| 2½ Year Old FC | | Same | | | | Same | | | | Same | | | | Same | | | Same | | | | Same | |
| Pot Life of Mix | 1 mo. | 2 mo. | 1 mo. | 2 mo. | | | | | | | | | All above 1 week pot life | | | | | | | | | |
| Coating Properties | | | | | | | | | | | | | | | | | | | | | | |
| After mixing | E | E | E | E | F | F | F | F | F | F | F | F | E | E | E | E | G | E | | All | | |
| After 1 Day | E | E | G | E | F | F | F | G | F | F | F | F | E | E | E | E | E | F | | Excellent | | |
| After 3 Days | G | E | X | E | F | F | F | G | F | F | F | F | E | E | G | E | E | F | E | | | |

TABLE IVA-continued

| Series | 1 | | | | | | | 2 | | | | 6 | | | | 11 | | | 11A | | | | 12 | | |
|---|---|---|---|---|---|---|---|---|---|---|---|---|---|---|---|---|---|---|---|---|---|---|---|---|---|
| Composition | 1 | 2 | 3 | 4a | 4b | 4c | 4d | | a | b | c | d | 1 | 2 | 3 | 1 | 2 | 3 | 4 | 1 | 2 | 3 |
| After 5 Days | F | G | X | E | F | F | F | | E | F | F | F | F | E | E | F | G | E | | F | E | |

E - Means very superior, hardness 2H to 4H and highly superior adhesion to clean steel.
G - Means a good coating, hardness H to 2H and adhesion to clean steel excellent.
F - Means fair coating of hardness H and somewhat lower.
X - Means gelled.
\* - Composition SC also contained a small amount of polyvinyl butyral (PVB), i.e. 5 weight parts of 5% solution of PVB in MEK.

It can be noted how little binder is required with this system to give excellent coatings. All of these coatings withstood 4000 hrs. in the salt fog test at 2 mil. dry film on clean steel. The ratio of polyol alkyl silicate to zinc in these compositions is as low as 1 of paint to 20 zinc and this permits less cost.

EXAMPLE XXXV

This example describes a two component coating system based on zinc dust in one component and talc and glycol alkyl silicate binder in the other. Binder 59-1 was prepared by mixing 22 lbs. of the ethylene glycol-tetraethyl ortho silicate (ratio of glycol to tetraethyl ortho silicate of 1.3 moles/1 mole) with 18 lbs. of methyl n-butyl ketone, 6 oz. of silica (Cabosil M5) and 6 g. of zinc chloride. The composition was stored in an unlined steel can. This binder had a gravity of 0.93 at 25°C. and contained 12.0 wt. % silica. To make the talc dispersion, 1.5 lbs. of binder 59-1 was mixed with 35 g. Sierra fine, neutral platy talc. To make the coating formulations, 2-½ weight parts of zinc dust and 1 part of the talc dispersion were mixed and applied to clean steel panels. The coating was dry to touch in 10 minutes, dry to handle in 15 min., and hard enough to topcoat in 1 hour. The coatings had excellent adhesion, even to clean steel, had excellent galvanic protection at plus 6000 hrs. in salt fog at 95°F., and 5% salt at a film thickness of 3 mils., scored.

EXAMPLE XXXVI

This example shows 2-package system comprising as one package, zinc oxide and zinc dust, and as the other package glycol alkyl silicate (ratio of 1.3 : 2 moles glycol/mole of tetraethyl ortho silicate) in a hydrocarbon solvent. For example, a glycol alkyl silicate made to have a reacted ratio of 1.3 moles of glycol per mole of silicate was diluted with 0.5 volume of xylene to form a binder solution which was stable over a 2-½ year period. This solution was further mixed with less than ½% Cabosil M5 to form the first component. The second component was a blend of 5% zinc oxide and zinc dust. To form the coating, 3 parts of the second component was blended with one weight part of the first component, and the mixture was applied as a coating to clean steel. Even when application of this paint occurred in a rain storm, the coating cured adequately to produce a highly superior coating, giving lasting galvanic protection to steel substrates. The pot life of the mix was about 10 days, at which time the coating composition did not gel, but made a somewhat softer coating. The coatings (2.5 mil) withstood 5000 hrs. in salt fog and 2-½ years outside, curing scored areas without rusting.

EXAMPLE XXXVII 10 wt. parts of a copolymer (91% polyvinyl chloride, 3% polyvinyl acetate and 6% polyvinyl alcohol in a 20% resin solution in MEK having a viscosity of 60 cps. at 25°C., said solid polymer having a gravity of 1.39) and 200 g. of binder 59-1, described above in Example XXXV were blended together to form a stable vehicle. To form a galvanic paint, 3 wt. parts of zinc dust was mixed with 1 wt. part of the vehicle, and this composition was applied as a coating to a ferrous substrate. The coating hardened to a tough, adhesive, galvanic protective coating overnight. After 1-½ years exposure of a scored steel panel having a 2 mil. dry film of this coating, no rusting had occurred. Vinyl topcoats adhered well to this coating.

EXAMPLE XXXVIII 10 wt. parts of polyvinyl acetate resin having a viscosity (20 wt. % in Acetone) of 19 on a Ford No. 4 Cup at 25°C. and a specific gravity of 1.18 was used to make a stable glycol silicate binder containing this resin by mixing 10 wt. parts with 180 wt. parts of binder 59-1 described in Example XXXV. To make a galvanic paint, 1 part of the resin containing binder was mixed with 2.5 wt. parts of zinc dust. The paint, applied as a 4 mil. wet film to clean steel panels, gave excellent protection, and the coating was moderately firm and adhesive.

EXAMPLE XXXIX

Using a low molecular weight polyvinyl butyral resin, a 15 wt. % solution was made in MEK (this polyvinyl butyral is characterized by a 20% soln in 95% alcohol having a viscosity of 55 cps). 1.85% of this low molecular weight resin solution was dissolved in binder 59-1, described in Example XXXV, to form a binder solution which was stable over a period of 1-½ years. To make a paint, 2.5 wt. parts of the binder solution containing the resin was mixed with 7.5 wt. parts of zinc dust, and applied as a coating to clean, cold rolled steel. The resultant coating was somewhat flexible when applied as a ½ mil. coating and was very adhesive and gave protection to the steel against rusting over a period of 1 year. Vinyl paints adhered well to this coating.

In another experiment, 10 wt. parts of the 15% soln of the resin was mixed into 30 wt. parts of a neutral talc dispersion having 35 g. talc in 1.5 lbs. of binder 59-1 to form a stable binder which contains 3.7% polyvinyl butyral resin. This blend was stable for a limited period, and to form a coating, 2.5 wt. parts of zinc dust was added to the binder resin blend and applied to a clean, cold rolled steel panel at ½ mil. thickness and at 1 mil. thickness. Both coatings were extremely flexible, hardening rapidly in 10 minutes to permit handling, and capable of taking any kind of bending operation such as is required in the forming of rolled steel into stamped parts. This kind of coating makes possible the application of an inorganic zinc to cold rolled steel for rust protection until used for making formed parts, and permits the further addition of similar coatings to the formed parts after forming without further treatment.

The ½ and 1 mil. coated steel panels did not rust out in a 1 year period.

EXAMPLE XL

This example describes the making of a colloidal silica-ethyl silicate copolymer mixture and co-reacting this with a glycol alkyl silicate to form a block copolymer useful in binders in zinc-containing coatings. Excess 2-ethoxyethanol was mixed with a commercial 30% alcoholic silica sol, and alcohol and water were stripped from the mixture until 50% silica remained in solution. To 1.25 pounds of the resulting solution were added 3.8 lbs. of tetraethyl ortho silicate, and 190 ml. ethyl alcohol were distilled therefrom to 160°C., whereupon 1.13 lbs. of ethylene glycol was added and 840 ml. more of alcohol removed. The ester-exchange product was a syrupy, white liquid, useful in zinc coatings. In a more desirable experiment, 2.2 moles of ethylene glycol, 1.25 lbs. of the 50% colloidal silica-ethoxyethanol mix and 7 lbs. of tetraethyl ortho silicate were mixed, and 2100 ml. of ethanol distilled therefrom to produce a homogeneous, glycol alkyl silicate-colloidal silica copolymer sol useful in zinc-containing coatings.

EXAMPLE XL-A

This example describes the making of a glycerol alkyl silicate zinc galvanic paint formulation and the testing thereof. 416 grams of an ethyl silicate containing 8% dimer and 92% monomer (tetra ethoxy silane) was mixed with 93 grams glycerol (USP) and 100 grams of 2-ethoxyethanol and heated in a 3-necked flask to 80°C. in the presence of 2 drops of 66° Be sulfuric acid at which temperature a 50 g. sample was pipetted from the solution, cooled and was found to have a gravity of 0.95 and a silica content of 19%. A 10 g. portion of this liquid was mixed with 30 g. of zinc dust and applied as a coating on cold rolled steel. The coating cured slowly but hardened moderately in 1 day.

The remainder of the product in the flask was heated to effect further ester-exchange and the ethyl alcohol released was distilled therefrom until a total of 170 g. was removed. Periodically and at approximately equal intervals during the ester-exchange reaction, 10 ml. aliquots were removed by pipette and evaluated with zinc dust as a galvanic paint in screening tests. It was noted that as the ester-exchange continued, the products made better and harder coatings and the further the ester-exchange occurred.

The final residue was cooled and, upon cooling, solidified to a gel which would cold flow over a period of time but was easily broken on fast impact. This gel was insoluble in water but dissolved in MEK. This material in MEK, glycol ethers and alcohol free solvents made an excellent zinc dust primer, hardening rapidly and giving exceptional coatings having superior resistance to salt fog.

EXAMPLE XL-B

This example describes the making of a glycol-2-ethoxyethyl silicate as follows (and the evaluation thereof in zinc coatings). Charge 416 wt. parts (to a 2 liter RB flask) tetraethoxy silane, 460 wt. parts 2-ethoxyethanol and 129 wt. parts ethylene glycol. Here, the OR groups on the silicate product are either 2-ethoxyethyl groups or pendant hydroxyethyl groups. There was removed from the mixture 390 grams of ethyl alcohol while heating to 138°C. pot temperature, and the recovered bottoms was a clear, colorless liquid having a gravity of 1.049 at 25°C. and a silica content of 17.4% and a Pensky Tag Flash Point of greater than 100°C.

10 weight parts of the bottoms product was blended with 30 wt. parts of zinc dust, and in other similar tests with the zinc containing 5% neutral talc, and in another test with the zinc containing 5% kaolin. Coatings 3 mils thick were applied to cold rolled steel and found to cure to touch in 15 min. and hard in 1 hour. In another experiment, carbon tetrachloride was added to the zinc-dust containing slurry to effect a harder coating, and in another similar test ½% of ethyl hexoic acid was added to the silicate product prior to mixing with the zinc dust to effect more rapid curing. All of the resulting products had good salt spray resistance (4000 hours salt fog with no rust). The resultant binders were stable for over a 2-½ year period with no gelling.

It should be noted that the 2 ethoxy ethanol in Examples 13, 21, 29, 30, 40A, and 40B contained between 0.2 and 0.5% water, by Karl Fisher Method of Analysis.

EXAMPLE XLI

This example describes the making of a methoxy ethyl glycol silicate as follows: Charge to liter flask 416 grams tetraethoxy silane, 404 grams methoxy ethanol, 124 grams ethylene glycol, and 2 drops sulfuric acid, 66° Be. The mixture was heated and alcohol distilled therefrom. The bottoms product had a gravity of 1.075, a silica content of 18.5% and weighed 640 grams. The maximum pot temperature was 130°C. The product was tested as the immediately preceding example with zinc dust and was found to give good coatings and to have a shelf life of over 2-½ years.

EXAMPLE XLII

In this example, a mixed glycol and polyethylene glycol-glycol alkoxysilicate reaction product was prepared by charging 1.5 moles tetraethoxy silane, 0.85 mole ethylene glycol and 0.15 mole polyethylene glycol of 200 mol. wt. in a reaction vessel. The mixture was heated to 70°C. in a liter RB flask and 1 drop of sulfuric acid was added. 105 ml. of ethyl alcohol was distilled from the reaction mixture, and 56 g. of xylene was then added to the mixture. The gravity of the product at 30°C. was 1.0, and the product was water white and clear and had a silica content of 24.1%. When tested in a proportion of 1 part binder to 5 parts zinc dust, the product gave a slow curing coating having good protective properties against rusting when finally cured.

EXAMPLE XLIII

I have discovered that the addition of minor amounts of solvent-soluble polyvinyl butyral and similar polyvinyl alkylal polymers or copolymers, with or without other vinyl and organic compounds, to my single package compositions containing polyol silicates, having a hydrolysis of about up to 45%, gives improvements for certain applications. These compositions may or may not contain zinc dust. In single package or multi-package coating compositions of this invention in which the solvent is either predominantly alcohol or 2-ethoxy ethanol, the amount of polyvinyl alkylal is often about 10 to 65%, preferably about 10 to 30%, based on the polyol silicate. In single package systems, the proportion of monofunctional solvent must be substantial, with the binding having a silica control of from 5 to 10% because of the required dilution with monofunctional OH compound to prevent gelling. Polyvinyl alkylals can be prepared from the reaction of polyvinyl alcohol with lower alkanals having, e.g., up to about 5 carbon atoms, and more preferably from reaction of polyvinyl acetate dissolved in an alcohol with the aldehyde. The acetal-type groupings in the structure of the butyraldehyde derived polymer is

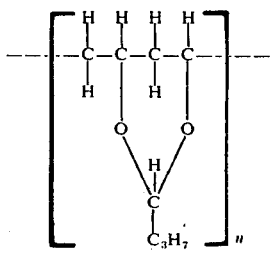

with a certain proportion of the groupings, as polyvinyl alcohol (at 2 to 30%). The polyvinyl alkylal polymers have minor amounts of polyvinyl alcohol or polyvinyl acetate groupings, for example, about 5 to 25% of the vinyl groups may be polyvinyl alcohol groups. The polymers may have about 50 to 90% acetal-type groups. To be useful in my coatings, the polymers must be of an appropriate molecular weight and composition to be soluble and compatible in minor proportions in my compositions and not cause them to gel before use. Such molecular weights may often be in the range of about 20,000 to 50,000. In addition, the polymers should be used to the extent that in situations where a subsequent organic topcoat is applied to the zinc-glycol silicate primer containing the organic polymeric compounds, they will not be present in composition or extent that will cause porr adhesion and poor bonding compatibility with top-coats applied thereon. I have found that when the polyvinylaldehyde copolymers are properly used, their advantages are increased life of the coating in salty atmospheres, less zinc degradation through white zinc rust and with resultant longer life of the coating, improved galvanic protective properties, better flexibility, improved adhesion to substrate and improved adhesion of vinyl and other compatible solvent-based organic plastic coatings.

By increasing the amount of polyvinyl butyral copolymer in the cured film of the glycol alkyl silicate coating to greater than about 2%, flexible coatings are possible which are useful for coating roll-steel stock which is sold in coils and which is capable of being bent and formed in conventional shaping and bending apparatus and which may be subsequently recoated over the zinc primer with the same or other coatings, either before or after forming, without rusting or rust undercutting occurring during storage or handling. Since some of the compositions can be made to cure rapidly (in seconds or minutes), automated coating devices can be utilized for coating cold rolled steel. Heat curing cycles of as rapid as 30 seconds at 150°C. is possible in these coatings when methylalkanol and butylalkanol melamine formaldehyde copolymers are used in conjunction with the butyral and polyol silicates.

Other polymeric compounds which may be used alone, but preferably as copolymers in minor amounts in my compositions, are given below. While the polyvinyl alcohol alone is quite insoluble - as copolymers with a great variety of vinyl compounds, it becomes compatible and gives reaction OH groups which react by ester exchange with the silicate grouping, giving preferred products for use in the zinc coatings.

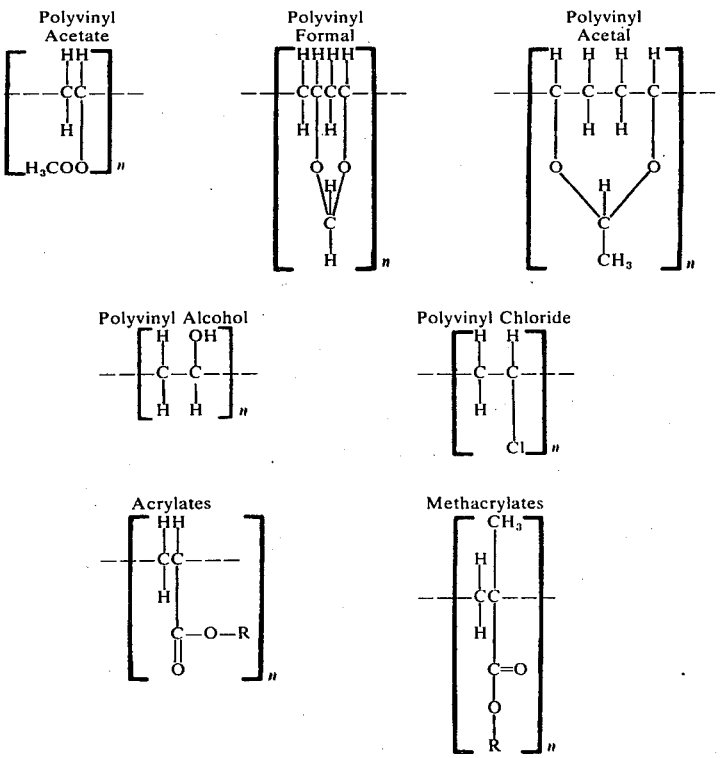

and particularly the hydroxylated acrylates and methacrylates. The R in these formulas is usually lower alkyl such as methyl or ethyl. The polymers may also be polyvinyl pyrollidone or polyoxyalkylene glycols; however, these latter polymers may be water soluble and remain in the zinc coating, and should be washed out prior to top coating to achieve good adhesion. Other resins such as minor amounts, e.g. about 5% based on the polyol silicate, of methylated or butylated melamineformaldehyde or other aminoplast resins may be added to the compositions to promote rapid heat curing and improve properties of the coating.

Some of the commercial polyvinyl butyral products useful in my zinc-containing polyol silicate coating compositions include the following, with a characterization of their properties: Butvar (Monsanto) with ranges in viscosity of 10% solution in 95% alcohol of 55 cps. for B79; and up to 1570 cps. for B72A; Union Carbide's polyvinyl butyral, No. XYHL, which was a copolymer of 0.5% polyvinyl acetate, 19.5% of polyvinyl alcohol, and 80% polyvinyl butyral having a specific gravity of 1.12 and an inherent viscosity of 0.9 (ASTM D1243-58 + Procedure A). I have found generally that in the glycol silicate binders in ketone solvents, 2% or less of the polyvinyl butyrals was compatible and stable. In the glycol silicate binders in glycol ether, i.e. alkyl-capped glycol, solvents, much higher levels of solubility were possible for longer shelf-life stability without gelling.

Experiments illustrating use of polyvinyl butyral in my polyol silicate binders in zinc dust and ceramic coatings include the following in Table V, and in Examples LXIV c, d, e, f and k; LXV a, b and c: LXIII.

SCl - is the second component, a glycol alkyl silicate which is defined as SC in Example XXXIV.
SC2 - is another glycol alkyl silicate binder and filler mix containing 5% of finely-divided neutral platy talc in the glycol silicate binder composition 59-1 (described in Example XXXV).
SC3 - binder was a reaction product described in Example XXXIII.
SC4 - is a mix of the reaction product of 150 g. tetraethyl silicate condensed, 44.7 g. glycol, 28.6 g. 2-ethoxyethanol heated to 100°C. in the presence of 1 drop HCl, then cooled, and 1.g. $ZnCl_2$ and 10 g. finely-divided platy talc were added and diluted with 150 g. 2-ethoxyethanol.

EXAMPLE XLIV

The preparation, properties and use of polyol silicates compounded into single-component formulations with zinc dust are described below:

A glycol-ethyl silicate binder was prepared by heating 1.3 moles of ethylene glycol with 1 mole of tetra ethyl ortho silicate in the presence of a sulfuric acid catalyst and removing the alcohol released, dissolving the resultant bottoms product in sufficient xylene to liquefy. The resultant product was stable over a 2-½ year period, not changing during this period. The product (GASB) had the following properties:

TABLE V

| Ingredients | Exp. 45-1 | 2 | 3 | 4 | Composition, Parts By Weight 5 | 6 | 7 | 8 | 9 | 10 |
|---|---|---|---|---|---|---|---|---|---|---|
| methyl-n-butyl ketone | 40 | 40 | 40 | | 45 | | | | | |
| PVB1 | 2 | 10 | 4 | | | | | | | |
| PBV2 | | | | 10 | | 4 | | 30 | 50 | 0.45 lbs. |
| PVB3 | | | | | | | 10 | | | |
| zinc chloride | 6 | 5 | 4 | | | | | | | |
| zinc dust | 135 | 105 | 400 | 100 | | 200 | 250 | 250 | | 13 lbs. |
| SC1 | 4.5 | 4 | 3 | | | | | | | |
| SC2 | | | | 30 | 380 | | | 70 | 60 | 4 lbs. |
| SC3 | | | | | | 50 | | | | |
| SC4 | | | | | | | 90 | | | |
| Results | thickened and gelled in 2 hrs. | gelled in 5 min. | thickened to unusable consistency | gelled in 5 days (good for 2-pkg.) | | | | binder stable but with zinc gelled in 2 days | binder solid in 4 hours | |
| Description of coating and paint | not run | not run | not run | very flexible | binder stable | binder stable without zinc | | | not run | binder without zinc very stable 1 yr., paint good over 2 wk. per |
| Cure description | not run | not run | not run | coating hard and adhesive | 5 min. very flexible, hard and adhesive coating | | | | not run | |

(NOTE: limited shelf life in binder in a ketone solvent necessitates the use of small amounts, e.g., less than 2%, when long storage is contemplated.)

In other compatability tests using 5% of the SCl, the glycol alkyl silicate binder in ketone gels in 2 to 5 days and 6.8% gels the binder in 4 hours. By adding a polyvinyl butyral having fewer reactive groupings, higher levels with improved shelf-life stability can be used.

Designations for preceding table:

PVB1 - is a 20% solution of polyvinyl butyral (PVB) in methyl-n-butyl ketone. This lower molecular weight polyvinyl butyral is characterized by a 10% solution in 95% alcohol having a viscosity of 55 cps. at 25°C.
PVB2 - is a 15% solution of polyvinyl butyral (PBBI) in methyl ethyl ketone (MEK).
PVB3 - is 10% PVBI in MEK.

| GASB | |
|---|---|
| % silica | 24.12 |
| specific gravity at 25 | 1.05 |
| % acidity as HCl | 0.001 |
| appearance | colorless, clear liquid |
| % xylene | 20 |
| freezing point | less than −30°F. below zero. |
| solubility | soluble in xylene, ketone, cyclohexane, oxygenated solvents, glycol ethers, etc. |

It was formulated into a single-component paint as follows:

| | |
|---|---|
| 2 lbs. | GASB |
| 3 lbs. | methyl ethyl ketone (MEK) |
| 1.5 oz. | Cabosil M5 (a pyrogenic silica) |
| 10 g. | zinc chloride (ZnCl$_2$.2H$_2$O) |
| 13 lbs. | zinc dust (No. 1 in table). |

The GASB, MEK and zinc chloride were blended with the Cabosil M5 and the zinc dust added and sheared briefly into the liquids. The paint was packaged in a one-gallon epoxy-lined can and sealed for 2-½ years at from 65 to 95°F., and after this period was placed on a paint shaker for ½ minute, opened and found to be homogeneous and easily used as a paint. The paint was applied (2 mils dry) to cold rolled steel panels, drying to touch in less than 4 minutes and to a hard coating in about ½ hour, and could be topcoated without deleterious effects after 4 hours. The completely cured coating had a pencil hardness of 4H. Salt fog (5% salt - 95°F.) tests for a three-month period on a scored panel revealed exceptional protection - no rust or rust undercutting, and the scored area was completely healed. The mixed paint had a gravity of 2.35 at 25°C. No gassing or balling up and gelling of the paint occurred during this period.

EXAMPLE XLV

Here, a direct comparison of the curing rates of zinc dust coatings made with binders of hydrolyzed silicates and binders made from the same hydrolyzed silicates with a minor amount of polyol ester-exchanged into the product, shows an advantage of my innovation. Also, comparisons in methods of making and variations in ingredients are described with the effect on the resulting coatings.

Ethyl Silicate 40 is a polymeric siloxane containing an average of slightly over 5 siloxane groupings per molecule and is prepared from tetraethyl ortho silicate by partial hydrolysis in the presence of a trace of hydrochloric acid with distillation of alcohol released therefrom with condensation and neutralization. The equation for the reaction is given:

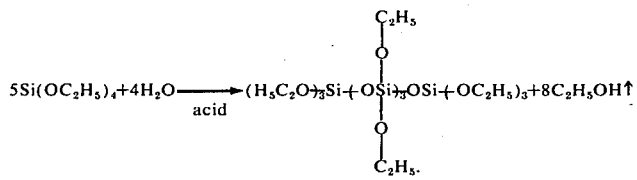

This product is an average theoretical product; however, the actual composition may have monomer, dimer, trimer, tetramer, cyclic pentamer, and many higher cyclic and cross-linked polysilicates having up to about a maximum of 18 SiO groups per molecule but having an average composition of about 5 SiO groups per molecule. The resultant product had 40 wt. % silica and a specific gravity of 1.053 and was a distribution of monomeric, dimeric and polymeric siloxanes.

The following was charged to a large reactor:

- 3,045 weight parts of the above Ethyl Silicate
- 10,351 weight parts 2-ethoxyethanol
- 209 weight parts water.
- 0.53 weight parts conc. sulfuric acid added to the water as catalyst.

The mixture was heated to reflux with removal of all ethyl alcohol formed by ester-exchange up to 138°C. (approximately 5,070 weight parts). The remaining bottoms product had a gravity at 25°C. of 1.055 and a silica content of 20 wt. %. The product (45-I) was calculated to be 54% hydrolyzed and condensed.

A small portion of product 45-I was mixed with 3 wt. portions of zinc dust and tested as a coating by painting a cold rolled steel panel. It was discovered that the coating would not cure, even after several days, and in order to attempt to accelerate cure, the blend was made acid until it contained 0.06 wt. % HCl. This higher acid product coating cured to insolubility in acetone after exposing the coating to moist air at 85°F. for 96 hours. This curing is not considered to be rapid enough to be accepted as a usable material since it is so slow, yet, as can be seen below in Table VI, even as little as 11% ethylene glycol in the reaction product accelerated the cure time to only ½ hour.

To test the effect of ester-exchanging ethylene glycol into the above polymeric siloxane, the siloxane was slit into several portions and glycol and acid added as follows:

TABLE VI

| Ingredients | Run | Composition, Weight Parts | | | | |
|---|---|---|---|---|---|---|
| | | 2 | 3 | 4 | 5 | 6 |
| Polymeric Siloxane (45-1) | | ← in each case 1,000 weight parts were added → | | | | 3160 |
| Ethylene Glycol | | 155 | 310 | 620 | 155 | 363 |
| Hydrochloric Acid 37% | | 1.6 | 3 | 3 | 4.8 | 10.4 |
| 2-Ethoxyethanol | | | | | 1155 | 3523 |
| (All the above mixtures were heated to 110°C. and cooled.) | | | | | | |
| Cure Time | | | | | | |
| (2 mils dry coating) in test with zinc dust on steel panel (3 parts zinc:1 part binder) | | ← Dry to touch in about 15 minutes → | | | | |
| | | ← Dry to insolubility in acetone in about ½ hour → | | | | |
| | | ← Could topcoat in 2 hrs. → | | | | |

To make improved coating binders from the above products of Table VI, polyvinyl butyral (Butvar 79) was added to each product, and the composite was tested as a zinc dust-containing coating; i.e., 0.4%, 1%, 2%, 3%, 4%, 5% and 10%. In every case but the last two higher ratios, the film cured to a hard and acetone-insoluble, insoluble coating in about 40 minutes. In another test, 0.1% Bentone 27 (xylene wetted) was sheared into the binders to produce a non-sagging paint.

The above experiments, except for polyvinyl butyral addition, were also carried out on a binder prepared by mixing initially the same stoichiometric amounts of water, glycol, 2-ethoxyethanol, tetraethyl silicate and acid catalyst and hydrolyzing, ester-exchanging and removing alcohol all in one step. The resultant product had identical properties and use characteristics, and in similar experiments it was found that any combination could be used, provided that the final equilibration temperature was reached and an acid catalyst was present.

In a third series of experiments similar to the above, stoichiometric mole amounts of 2-methoxyethanol was substituted for the 2-ethoxyethanol with satisfactory results. It was found that alkoxyalkanols were suitable, provided they are volatile enough to evaporate from the coating.

In a fourth series of similar tests, minor amounts (10%) of glycerol, polyethylene glycol (200 and 400 molecular weight) were found to be compatible with the glycol in ester-exchange with the silicate and produced binder paints containing zinc dust which cured well and to commendable coatings.

In a fifth series of tests, it was shown that on varying the degree of hydrolysis of the silicate, the relative mole amount of polyol should be decreased to provide a stable binder useful in coatings. This decrease is based on and calculated from the ratio of moles of monoalkoxy groupings on the silicon atoms in the siloxane polymer per mole of hydroxy grouping on the polyol and the broad range and preferred range are given in the specification. The hydrolysis of the binder may with advantage range between 0 and 75% when polyol is added and the optimum hydrolysis range is about 50% hydrolyzed or less as shown in this example and others throughout this specification.

In a sixth series of similar tests, various fillers were added to the binder besides the zinc dust. It was concluded that when the polyvinyl butyral was present, the extensive dilution of the zinc dust with larger quantities of other fillers was not as desirable nor necessary. It was concluded then that fillers that should be added, aside from the zinc, are those which helped suspend the zinc dust, stabilized the slurry against gelling or gassing, and prevented sag.

EXAMPLE XLVI

This series of tests demonstrates the importance of using an acidic catalyst in ester-exchange of the ethylene glycol, and the accelerated curing and hardening of zinc coatings resulting from the presence of the acid in the mix.

| Silicate Reactant A | |
|---|---|
| Tetra kis 2-methoxy ethyl silicate | B.P. 133–134°C. |
| | $n_D^{25}$ 1.41917 |
| | d 25°C. 1.054 |
| | $SiO_2$ = 18.1% |
| Polyol Reactant B | Ethylene glycol |

Binder 46A

No acid catalyst used (acid free) and heated only to 50°C.

328 grams Silicate (Reactant A).

62 grams ethylene glycol (Reactant B) were heated to 50°C.; all became clear, although it was not known whether ester-exchange occurred. A small sample was taken and gravity found to be 1.07, $SiO_2$ of 15%, acidity neutral.

The above was tested in a zinc dust coating on steel (3 mils wet film) by mixing 1 wt. part binder 46A and 3 wt. parts of zinc dust. The film did not cure after several days of exposure to the atmosphere showing that an acidic material is necessary for the desired reaction to occur.

Binder 46B 130 wt. parts of the binder 46A (above) was heated to 110°C. with 28 wt. parts of ethylene glycol, and tested as in the case of Binder 46A with zinc dust. The coating would not harden after several days aging.

Binder 46C

Addition of acid during ester-exchange. Another 130 grams of the product 46A was mixed with 1/2 drop (0.02 ml.) concentrated HCl (37%) and heated to 100°C., cooled and tested as in a zinc coating as with Binder 46A. Now the film cured rapidly to a hard, adhesive coating. Note that only a trace of acid is necessary for obtaining a workable binder which cures with zinc. It was estimated that the binder had only 0.005% acid calculated as HCl.

Binder 46D

Demonstration of advantage of using a larger amount of acid. To another 130 grams of product 46A was added 0.1 ml. concentrated hydrochloric acid and heated to 100°C., cooled and tested as a binder 46D using 3 grams of zinc/1 gram binder as above. This product cured even more rapidly than Binder 46C and formed a harder coating. Binder 46D had 0.0285% HCl based on binder.

Binder 46E

Demonstration of advantage of using even a larger amount of acid in the binder. To 30 grams of Binder 46A from example above, was added 0.1 ml. concentrated hydrochloric acid (37%) and heated to 100°C. The mix was cooled and tested as above with zinc to determine its value as a binder. The product cured even more rapidly than either Binder 46C or 56D, and was found to be stable over a long period of time as a binder. Once the acid catalyst reaction of polyol and silicate have taken place, the addition of a basic material such as asbestos, talc or even sodium ethylate or methylate does not destroy the ability of the binders to harden well with zinc dust to form hard adhesive zinc silicate coatings.

Binder 46F

Demonstration of inability to use an excessive amount of a weak acid such as acetic acid. To 30 grams of Binder 46A was added 0.1 g. glacial acetic acid, and the mix was heated to 100°C. Again, this binder was evaluated as above with zinc dust. The mix gelled with zinc dust in only 10 minutes. The coating on steel was soft and not acceptable.

EXAMPLE XLVII

In each experiment below, the binder was prepared by heating the ingredients together to 100°C. without removal of alcohol, cooled and evaluated in a zinc dust paint by mixing 1 wt. part of resultant binder with 3 wt. parts of zinc dust and applied as paint to a clean steel panel.

EXAMPLE XLVIII

This example shows the advantage of using a polyol, hydrocarbon ether silicate and particularly in this case, a glycerol hydrocarbon ether (ethoxyethyl) as a highly useful self-curing binder for making ethoxyethyl glycol silicate galvanic coatings.

3000 weight parts of the 2-ethoxyethyl polysilicate (or polysiloxane) from Example XLV, designated as 45-1, was mixed with 248 weight parts of glycerol and 0.03 weight parts of 37% hydrochloric acid and heated to 115°C., cooled and evaluated in zinc dust coating formulations. During this syntheses, it was found to be advantageous to add the glycerol very slowly to the heated polysiloxane to prevent precipitation of a white, solid material from solution. The resulting binder could be diluted with a hydrocarbon (paraffinic, naphthenic or aromatic) or other organic solvent or could be used as is or diluted with 2-ethoxy ethanol. When mixed in various ratios with zinc dust and optionally other fillers (e.g. clays, talcs, and the like), antisag and suspending agents, and optionally polyvinyl butyral, the galvanic coatings resulting were hard, adhesive, self-curing and highly protective to steel containing substrates. When applied to wet sandblasted steel surfaces (while still wet), this coating cured to an exceptionally hard, adhesive and rapidly self-curing galvanic coating, preventing any rust with undercutting and scratches being self-curing. As in many of the other polyol silicate-zinc dust coatings described herein, and particularly those having zinc chloride therein, this versatility in use even over wet sandblasted surfaces permits less costly, safer and more healthful and simpler methods of preparing the surface of the steel — by water sandblasting — without any loss of protective abilities of the excellent galvanic coating thereon.

In addition, the finished zinc-glycerol, ethoxyethyl silicate paint had a flash point (Pensky Tag closed cup) of over 104°F. and could be regarded as a single package system with adequate pot life to allow mixing large batches and being stable enough to ship to the locus of use as a homogeneous zinc dust paint. Salt spray tests (5% salt at 95°F.) for 4 months on a 3 mil test film on 20 gauge steel panels (wet sandblasted), showed no signs of rust or rust undercutting.

In a similar series of experiments, the ratio of glycerol was increased to 466 grams glycerol per 3000 grams polysiloxane, and in another series to 1000 grams glycerol per 3000 grams polysiloxane. In the former example, the catalyst was 3 drops of 37% HCl and in the latter test, no acid catalyst was used, but a trace was present in the 2-ethoxyethyl polysilicate. The zinc binder compositions made with these glycerol-hydrocarbon ether silicates and zinc dust self-cured rapidly to highly protective galvanic coatings. Salt spray (5% salt at 95°F.) tests for 4 months on a 3 mil test film on 20-gauge steel panels showed no signs of rust or rust undercutting. In order to achieve stability against gelling with higher ratios of glycol to silicate, dilution with a monohydroxy compound such as 2-ethoxy ethanol was employed.

In a similar series of experiments, polysiloxanes which were hydrolyzed to 10, 25, 40, 60 and 70%, respectively, were similarly made as described above using as the ratio of about one-half mole reactive hydroxyl in the polyol per each mole of ester-exchangeable mole grouping on the polysilicate. All of these made excellent zinc dust-silicate coating giving long life protection against rusting in moist and salty atmospheres, to the ferrous substrates.

TABLE VII

| Ingredients | Run 47-1 | 47-2 | 47-3 | 47-4 | 47-5 | 47-6 | 47-7 |
|---|---|---|---|---|---|---|---|
| | | | | Composition, Weight Parts | | | |
| Tetraethoxy silane | 208 | 208 | 208 | 208 | 20.8 | 208 | 208 |
| Ethylene Glycol | 62 | 62 | 62 | 62 | | 62 | 62 |
| Diethylene Glycol | 10 | 30 | | | | | 30 |
| Polyethylene Glycol 400 | | | | | | | |
| Glycerol | | | 30 | 10 | 5 | 10 | |
| Polyethylene Glycol 200 | | | | | | | 30 |
| 2 Ethoxyethanol | | | 10 | 275 | 15 | 275 | |
| HCl (37%) Mixture talc added to binder when hot | 0.05 | 0.05 | 0.05 | 0.05 | 0.1 | 0.62 | 0.05 |
| Additional Ingredients Added to Above Isopropanol t-butanol | | | | | | | |
| Results of Test with Zinc Dust in Coating | Coatings poor, drying. | slow | Cured adequately to give a good, hard protective coating having excellent spray (at 3 mils) protective properties over 4000 hrs. | Coating softer but adequate for protecting. | Cured in 1 hr. to yield a fairly hard coating. | Much harder than 47-4. | coating cured slowly but formed a hard, film, adhesive coating. |

| Ingredients | Run 47-8 | 47-9 | 47-10 | 47-11 | 47-12 | 47-13 | 47-14 |
|---|---|---|---|---|---|---|---|
| | | | Composition, Weight Parts | | | | |
| Tetraethoxy silane | 208 | 208 | | | | | 104 |
| Ethylene Glycol | 62 | 124 | ADDED 100 WT. PARTS 47-9. | | | ADDED 70 WT. PARTS | |

TABLE VII-continued

| Ingredients | Run 47-8 | 47-9 | 47-10 | 47-11 | 47-12 | 47-13 | 47-14 |
|---|---|---|---|---|---|---|---|
| Diethylene Glycol | | | | | | 47-9. | |
| Polyethylene Glycol 400 | 30 | | | | | | 100 |
| Glycerol | | | | | | | |
| Polyethylene Glycol 200 | | | | | | | |
| 2 Ethoxyethanol | | 180 | | | | | |
| HCl (37%) Mixture talc added to binder when hot | 0.05 | 0.1 | | | | | |
| Additional Ingredients Added to Above | | | | | | | |
| Isopropanol | | | 80 | | | | |
| t-butanol | | | | 5 | 10 | 20 | |
| Results of Test With Zinc Dust in Coating | Coating cured to a softer film than 47-7. | Firm, hard coatings resulting in each case. Dried slowly (15 min.) but cured in about ¾ hr. to insolubility in acetone. The binders were exceptionally stable. | | | | | Coating too slow drying to be useful in most applications. |

EXAMPLE XLIX

This series of examples shows the utility of using glycol alkyl silicates having the reacted mole ratios of ethylene glycol to tetraethyl silicate of 2 to 1, 1.8 to 1 and 2.4 to 1 in zinc dust paints comprising MEK and having a shelf life of over 2½ years. 3000 grams of condensed ethyl silicate having 90% monomer, 8% dimer and 2% trimer, and 1350 gms. ethylene glycol were heated to reflux and 5 drops of sulfuric acid added and 1,325 g. ethyl alcohol distilled therefrom. The product had a mole ratio of glycol/silicate of 2/1. Similar reactions were made, adjusting in each case the mole ratio of glycol/silicate to 1.8/1 and 2.4/1. To 50 g. of each of these products was added 50 g. MEK and 250 g. fresh zinc dust. The resultant paint was homogeneous and usable after 2½ years aging in a simple container, and when applied to a cold rolled steel panel, said coating was hard, adhesive and highly protective in salt fog tests. Portions of the zinc silicate paints made from these glycol silicates were mixed with zinc chloride in proportions ranging from 0.5 to 10%, and the resultant paint mixes applied over steel panels containing mil scale. The 3 mil dry films were tested over extended periods for galvanic protection and were found to withstand 4000 hours of salt fog testing (95°F. and 5% salt) with no further rusting or rust undercutting, demonstrating the utility of these valuable coatings even over rusty surfaces.

EXAMPLE L

In this experiment, 1000 g. ethyl silicate condensed (95% monomer) was heated to 112°C. with 290 g. ethylene glycol and ½ drop of butyl titanate added with no noticeable ester-exchange reaction as evidenced by no distillation of alcohol. Thereafter, 0.1 g. of boric oxide ($B_2O_3$) was added and still no reaction took place. When 0.03 ml. of concentrated sulfuric acid was then added, alcohol started coming off rapidly showing the transesterification reaction had started. The alcohol was removed to a point of product gelling, and the product cooled and was dissolved in MEK and 30 g. of hexamethyl disiloxane (a known silicone capping agent) added at 80°C. This material acted as a capping agent for any silanol groups which may have formed during aging. 105 wt. parts of the product binder was mixed with 2 parts of zinc chloride, 40 parts of talc and 100 parts of MEK, and 700 parts of zinc dust, and the slurry was well-mixed and stored for 2½ years. The product paint in a common tinned paint can was completely stable as a single package paint for over 2½ years, and the coating made therefrom was satisfactory, giving a galvanic, self-curing protective film over a steel substrate. The coating gave excellent salt fog protection (3 mil dry film — no rust, 3000 hours salt fog at 95°F., 5% salt) on a cold rolled steel panel.

EXAMPLE LI

In an open beaker the following were mixed together and heated to 110°C.

24.8 g. Ethylene glycol
74.4 g. Ethyl Silicate 40 (a siloxane and silicate polymer having an average of 5 SiO groups per molecule and having a distribution of from 1 SiO to 15 SiO groups per molecule and having 40 weight % silica and a gravity of 1.051)
201.0 g. Butyl cellosolve
0.4 ml. HCl (as catalyst).

This binder was stable for 2-½ years and was tested on several occasions during this period with zinc dust as a zinc coating using 1 weight part binder to 3 weight parts of zinc dust and was found to work excellently as a galvanic paint for a steel substrate. The coating was slow drying because of the low volatility of the solvent but produced an excellent coating.

EXAMPLE LII

Mixed and heated to 80°C. in an open beaker the following:

74.4 g. Ethyl Silicate 40
4.68 g. Water
7.5 g. Ethylene glycol
212 g. Methoxy ethanol
0.1 ml. HCl The binder sample was tested periodically as in Example 51 with zinc dust as a galvanic coating and was found to work excellently over an extended period. The binder was calculated to have 70% hydrolysis and condensation.

EXAMPLE LIII 74.4 g. Ethyl Silicate 40 as described in Example LI
4.68 g. Water
4.0 g. Ethylene glycol
212 g. Methoxy ethanol 0.1 ml. HCl.

The binder was sample tested periodically as in Example LI with zinc dust as a galvanic coating and was found to work excellently as a galvanic paint.

EXAMPLE LIV

In a glass flask reactor, the following were mixed and heated to reflux and alcohol removed by distillation therefrom to a point of gelation 3.75 lbs. Ethyl Silicate 40 (described in Example LI)
1.24 lbs. Ethylene glycol
2.85 lbs. 2-Ethoxy ethanol.

The maximum pot temperature reached was 135°C., at which time the mix gelled solid. To solubilize the mix, varying increments of 2 ethoxy ethanol were added and heated each time to 135°C. to attempt to find the amount required to permanently solubilize the mix. It was noted that as in former examples, a slight mole excess of monofunctional compound, in this case 2 ethoxy ethanol is necessary to prevent excessive gelling or polymer buildup due to excessive polymerization. This mole ratio is based on the number of ester-exchangeable groupings in the hydrolyzed binder and the need for excess monofunctional compound is especially important to avoid gelling when there are numerous $$-\underset{|}{\overset{|}{Si}}-O-\underset{|}{\overset{|}{Si}}-$$

(siloxane) groupings per polymeric reactant molecule and the ratio of polyol/silicate is such as to allow formation of the high polymeric structure. The ethoxy ethanol acts as a chain terminator to stabilize the mix. When the above mix was diluted with an additional 1.80 lbs. of ethoxy ethanol, it did not gel on heating, and eventual dilution with ethoxy ethanol was made to give a total charge and weight balance as follows:

| | |
|---|---|
| 3.75 lbs. Ethyl Silicate 40 | |
| 6.55 lbs. 2-ethoxy ethanol | Properties: clear, |
| 1.24 lbs. Ethylene glycol | colorless, gravity |
| 11.54 lbs. total change | 1.04 at 25°C. Silica 16%. |
| 2.3 lbs. Ethyl alcohol distilled therefrom | |
| 9.24 lbs. Product. | |

A number of excellent stable binders were made from the above by dilution with various hydrocarbon ethers and solvents as follows and storage samples made for testing:

a. Dilute 50:50 with 2 ethoxy ethanol and added various proportions of a strong mineral acid as follows and stored for 2½ years and tested periodically.

a-1. 50:50 with 2 ethoxyethanol - gravity 0.98 at 25°C. - 8% Silica.

a-2. 75:25 with 2 ethoxy ethanol (Binder): 2 ethoxy ethanol.

Properties of (a-2) gravity 1.01 at 25°C.; 12% Silica.

In each case, 1 pint of each of the above was mixed with the following ratios of HCL (37% and evaluated as a binder over an extended period.

½ ml. HCl
¼ ml. HCl
1 ml. HCl
2 ml. HCl.

All samples were useful over extended periods of time and all yielded excellent coatings with zinc dust.

Various other fillers and suspending agents were tested with these binders — i.e. neutral talc, kaolin, alumina, including hydrated alumina, chrome oxide, and bentonite, and found to give favorable coatings with the zinc.

EXAMPLE LV 3.0 lbs. ethyl silicate condensed containing 6% dimer and 2% trimer
2.61 lbs. 2 ethoxy ethanol
0.9 lbs. ethylene glycol were mixed and heated to 147°C., and a total of 2.528 lbs. of alcohol was stripped off. I calculated that this was nearly the theoretical amount of alcohol present.

| | |
|---|---|
| 20% silica | Product analysis |
| .0016 acidity | (called Silicate |
| 1.079 gravity | No. 55). |

The following dilutions were made with Silicate 55 to form stable binders:

| (55a) | 50 wt. pts. above Silicate No. 55 |
| | 50 wt. pts. 2 ethoxy ethanol |
| | 0.5 wt. pts. Hydrochloric acid (37%) | mixed in a beaker at room temperature and found to be stable and yield excellent inorganic zinc silicate coatings in a ratio of 1 binder to 2 to 8 wt. parts of zinc dust.

| (55b) | 50 wt. pts. Silicate No. 55 | |
| | 50 wt. pts. Propylene glycol methyl ether | Mixed at |
| | 0.2 wt. pts. Hydrochloric acid | room temperature |
| | 10 wt. pts. Neutral Magnesium Silicate. | |

This binder was again very useful in zinc silicate coatings in a ratio range of 1 binder to 6 zinc dust.

Other fillers tried were kaolin, bentonite, alumina, silica, and zircon, and were found to give a variety of good coatings with the zinc dust.

EXAMPLE LVI

In a small beaker, the following were heated to boiling

4½ wt. pts. Glycerol
8 wt. pts. Isopropoxytrimethoxy silicate
10 wt. pts. Propylene glycol methyl ether heated to 80°C. to effect ester exchange. The product was cooled and tested in zinc dust coatings as in Example LV, and found to perform excellently to give hard adhesive coatings.

EXAMPLE LVII

The procedure for Example LVII was repeated using 34.2 g. Hexaethoxy disiloxane
12.4     Ethylene glycol
74.4 g. Propylene glycol methyl ether
1 g. Hydrochloric acid (37%).

This made a satisfactory coating with zinc dust in a 1 binder to 4 zinc dust ratio, drying slowly to a hard, adhesive coating.

EXAMPLE LVIII

There were charged to a large glass-lined reactor fitted with a fractionating column the following:

```
2,950 lbs.  Ethyl Silicate 40 (containing 42.6%
            silica as SiO₂)
4,442 lbs.  2-ethoxyethanol (containing 0.2% water)
  956 lbs.  ethylene glycol
─────────
8,348 lbs.  Total.
```

These ingredients were mixed well, and a solution of 185 g. of sulfuric acid dissolved in 200 g. water and diluted to 1 gallon with 2-ethoxyethanol was added to the reactor. The resulting mixture was heated to boiling, and 1,930 lbs. of ethyl alcohol was fractionally distilled therefrom, leaving in the reactor 6,318 lbs. of the ester-exchange ethylene glycol — 2-ethoxyethyl silicate in a 2-ethoxyethanol solvent. This material is designated Binder 58A below.

To make the final binder (58B), 3,882 lbs. of additional 2-ethoxyethanol (containing 0.2% water) and 1,800 lbs. of a 20% solution of polyvinyl butyral (Monsanto Butvar 79) in 2-ethoxyethanol were added to Binder 58A at 80°C., and the mixture was heated to 80°C. for at least 10 min., then cooled and drumed. The resulting product (Binder 58B) contained 10.5% silica as $SiO_2$ and 3% polyvinyl butyral solids. It was noted that if about 1,000 g. of finely-divided zinc dust dispersed in 2 lbs. of 2-ethoxyethanol, was blended with the entire batch (12,000 lbs.) of Binder 58B, the resulting product could safely be packaged in unlined steel drums. It may be found advantageous, but not necessary, to add from 10 to 30 lbs. of a 30% solution of zinc chloride or other zinc salt in 2-ethoxyethanol into the 12,000 lbs. batch to accelerate the rate of cure of zinc coatings utilizing this binder. In many formulations, the zinc salt addition is not preferred.

This product was found to be quite stable over a 3½ year period of aging, and when mixed with 2 to 5 wt. parts of fine zinc dust per weight part of Binder 58B, made a zinc coating having good flexibility, hardness, adhesion, and giving good protective properties when coated on steel. A 3 mil dry coating on cold-rolled steel gave exceptional protection even in scored areas under salt fog testing for a 6 month period at 95°F., and with a 5% salt solution.

EXAMPLE LIX 20 lbs. of Bentone 27 (National Lead) was dispersed in 80 lbs. naphthol spirits and 100 lbs. of 2-ethoxyethanol was added to gel the bentone. The gel was then dispersed into 3,000 lbs. of Binder 58 A, and 1,000 lbs. of Novacite was added to form a thick slurry. The slurry was diluted with 1,500 lbs. of naphthol spirits, a Rule 66 approved solvent, which had a flash point over 100°F. Into this mixture was blended 100 lbs. of methylated melamine-formaldehyde resin (Rohm & Haas). From 1 to 3 weight parts of zinc dust per part of Binder 58A was stirred into this mix to form an easy-to-apply paint. A 1 mil film of the paint dried to insolubility in methylethyl ketone solvent in less than 1½ hours, had excellent adhesion and gave excellent protection under water to steel substrates for exceptionally long periods.

EXAMPLE LX

Binder 60
A mixture of
{ 1,100 lbs. Binder 58B
  1,100 lbs. 22% polyvinyl butyral in 2-ethoxyethanol solvent
    850 lbs. xylene, and
    600 lbs. methyl alcohol was heated to 80°C. for 10 minutes, cooled and tested in zinc paint formulations in a 1 wt. part zinc dust to 1 wt. Binder 60 ratio. The product was found to be particularly suitable as a single-package, zinc silicate flexible paint suitable for maintenance and preconstruction use, as well as for continuous coil coating, with a life of over 2 years, and giving exceptional protection to steel substrates when applied thereon or over coatings or treatments thereon. The flexibility allowed the film to be formed, bent, etc., into various shapes from a coiled roll. The coating could either be topcoated with another zinc silicate itself, an organic vinyl, epoxy, a chlorinated alkyd, vinyl acrylic, or silicone-polyester type top coating or other coating such as porous ceramic polyol silicate coatings, etc.

EXAMPLE LXI

An ethylene glycol-ethyl silicate binder (containing 24% silica) which was prepared by ester-exchanging 3 moles of ethylene glycol with 2 moles of tetraethyl orthosilicate in the presence of a trace of sulfuric acid with removal of alcohol therefrom to push the reaction to the point just before gelling. To make the final paint, 200 wt. parts of this product was mixed with 100 parts of a solution of 22% polyvinyl butyral in methylethyl ketone, 500 wt. parts methylethyl ketone and 100 wt. parts methanol. This solution was stable for long periods, and when mixed with zinc dust in a ratio of 1 to 2 wt. parts of zinc per wt. part of solution, formed an excellent, stable paint which had a pot life of many months and was found to be particularly useful for application by dipping or spraying to form excellent, adhesive films which were quite flexible and adhering even to nonsandblasted steel.

EXAMPLE LXII

A stable, very easily mixed, and non-settling zinc silicate paint was provided by first making the anti-settling binder by mixing 286 lbs of Binder 58A with 100 lbs. of a 22% solution of polyvinyl butyral in 2-ethoxyethanol, 90 lbs. 2-ethoxyethanol and 15 lbs. of melamine-formaldehyde resin (Koppers No. 500–15). The mixture was heated to 70°C. 20 lbs. of Bentone 27 (a montmorillonite mineral - specially treated) (National Lead), 100 lbs. naphthol spirits and 10 lbs. of methanol were added to form a gel. This gel was then high sheared into the binder mixture. To make the final paint, 1,400 lbs. of zinc dust was slowly stirred into the sheared mixture to make a stable, single-component, non-gasing zinc silicate primer paint. Minor amounts of curing accelerators such as zinc chloride could be added. This paint had exceptional stability over extended periods without settling hard, forming any lumps, gasing or decomposing. The films from this paint, although not immediately as hard as some zinc silicates, was quite firm and extremely adhesive and very protective, particularly under water and salt water for long periods. The coating could be rapidly heat cured to a handable hardness at elevated temperature, e.g. 70°C., for a minute. This product is particularly suitable for preconstruction primers or coil coatings to allow fast curing, continuous operations and are excellent adhesions for topcoats of epoxy, vinyl, acrylic, silica polyester, and polyol silicate ceramic coatings.

EXAMPLE LXIII

In this example, a 2-ethoxyethyl polysilicate was made by ester-exchanging Ethyl Silicate 40 with ⅓ mole excess 2-ethoxyethanol in the presence of a trace of sulfuric acid while removing the alcohol released. The resultant product, having 20% silica as $SiO_2$ and being a solution of the 2-ethoxyethyl polysilicate in 2-ethoxyethanol, was split into 12 portions and appropriate amounts of water added to hydrolyze the product from 40% theoretical (as is Ethyl Silicate 40) to 45, 50, 55, 60, 65, 70, 75, 80, 85, 90, 95, and 100 theoretical % hydrolyzed, respectively. It is assumed that 100% hydrolysis (theoretical hydrolysis and condensation) is equivalent to 1 mole of water added for each 2 moles of ester-exchangeable groupings on the silicon atoms in the silicate. The amount of zinc dust in these compositions was 0.5 to 10 weight parts per weight part of binder. Can-stable, single-package formulations can be made with lower than 45% hydrolyzed silicates, while when using silicates hydrolyzed to a greater extent, the products have shorter can-life in the presence of zinc. The can-life of the products decreases progressively as the extent of hydrolysis increases. It is often advantageous to have enough glycol or polyol to accelerate the cure, but excessive amounts, while accelerating the cure, may cause very slow evaporation from the film, requiring longer curing time to reach the point when the film can be topcoated, with an organic or similar zinc silicate coating. The presence of excess non-volatile, water-soluble glycol or other higher molecular weight water-soluble polyols prevents sticking of top-coats, until this material has either evaporated, reacted or been washed-off. Proper curing is important so that the topcoat will have good adhesion. In prior art zinc coatings, the zinc was allowed to weather to a corrosion product of zinc carbonate, which allows topcoating without problems; however, in the presence of considerable salty air, the corrosion products may be $Zn(OH)_2$ or $Zn_2SO_3$ in industrial atmospheres and may cause water-solubility of the coating products, inhibit the adhesion of organic topcoats, and actually require pretreatment with a wash primer such as polyvinyl butyral. By incorporating or reacting polyvinyl butyral with the polysilicate or along with a small amount of melamine-formaldehyde resin provides better adhesion of organic or inorganic zinc topcoats to the zinc silicate primer.

The resistance to gelling of the binder containing substantial polyvinyl butyral, and particularly of the one-package zinc paint, is dependent on the extent of dilution with excess monohydroxy compound, particularly 2-ethoxyethanol, and if much polyvinyl butyral is in the binder, the silica content of the binder should be low, say about 4 to 10%, to maintain anti-gelling properties. At a hydrolysis of 0 to about 45 or 50% for the system of this example, the zinc-silicate product is suitable as a single package. At greater hydrolysis levels the stability goes down rapidly and the tendency to gas goes up. The polyvinyl butyral lowers the stability much more when the silicate is more than 50% hydrolyzed, and may require much more dilution with a monohydroxy compound to be stable. If there be a low level of silica, e.g. about 4% in the binder, the ratio of binder to zinc should be correspondingly higher to give the proper ratio to achieve the hardest coating.

At a hydrolysis of 40–45% for the polyol-alkoxyalkyl silicate in a 2-ethoxyethanol solvent, and having a polyvinyl butyral content in the binder of about 10 wt. %, the silica content of the binder may be about 4 to 8% to be most suitable as a single-package mix, or else it may gel. Of course, the molecular weight and hydroxyl content of the polyvinyl butyral have an effect on the tendency to gel and high dilution of the product with more functional OH components may be necessary to prevent such gelation, and have a balanced binder in which the ratios are such as to inhibit gelling as is described herein. In place of a portion of the zinc dust, many fillers can advantageously be used as a diluent — particularly aluminum oxide, aluminum hydrate, chrome oxide, novaculite, etc.

Ceramic coatings in which all of the zinc is replaced by such fillers, along with suspending fillers, have exceptional properties and can be applied as single-package compositions. For example, it may be advantageous to make high temperature resistant coatings by using Binder 58A, without zinc dust being added, with about 0.1 to 15 parts of filler per part of binder. One or more suitable solvents may be included in such compositions, and these solvents may be of the types previously mentioned such as hydrocarbons, ethers, alcohols and ether alcohols. The various polyol silicate products described herein may be used in these ceramic coatings. Filler includes alumina, silica, zircon and similar refractory materials and minor amounts of suspending fillers such as asbestos bentonite, talc, and the like.

EXAMPLE LXIV 1000 lbs. tetramethyl silicate was made by the reaction of methyl alcohol with silicon metal in the presence of a sodium methylate catalyst. The methyl silicate product was mixed with 1019 lbs. of 2 ethoxyethanol, 95 lbs. water and ½ lb. concentrated HCl and 302 lbs. ethylene glycol added, the mixture was heated to reflux, distilling therefrom all methanol released by ester-exchange, leaving a solution of a mixed glycol — 2 ethoxyethyl ester of the polysilicate in a 2 ethoxyethanol solvent and having 19 to 20% silica, calculated as $SiO_2$. It was noted that the ester-exchange reaction and hydrolysis reaction could be carried out in situ provided the mix is acidic. The product solution was called Binder A. It should be noted that equivalent molar proportions of ethyl silicate, methoxyethyl silicate, or 2 ethoxyethyl silicate could be substituted for the methyl silicate in the hydrolysis and ester-exchange reaction; however, with the latter two, less than 2 ethoxyethanol solvent need be used to achieve the 20% silica binder. The methoxyethyl and 2 ethoxyethyl silicates can be very cheaply synthesized from the reaction of the alkoxyalkanol with silicon metal in the alkoxyalkyl silicate as solvent in the presence of an alkali metal alkoxyalkoxide catalyst.

a. To 50 lbs. Binder A, 20 lbs. naphthol spirits (an aromatic free hydrocarbon solvent passing Rule 66 and having a flash point greater than 100°F. (closed cup) and having a final boiling endpoint of less than 340°F.), and 0.7 lbs. finely divided chrysotile asbestos (called Calidria Asbestos) and the mix stirred together to disperse. 80 lbs. of zinc dust (2 to 30 micron) was added and stirred in to make a very stable, single component paint which was non-gassing and non-gelling, and when applied to steel panels, gave long-lasting corrosion protection thereto.

b. The product from a) was modified by adding thereto 10 lbs. of finely divided Novaculite silica flour to give a long-lasting paint and a good protective zinc film. Similarly, the following fillers were substituted in various amounts (depending on thixiotropy) for the Novaculite flour, alumina, magnesium carbonate, calcium carbonate, talc, kaolin, attapulgus clay and finely divided Ferro-phosphorous or phosphates — a synthetic by-product of the phosphorous reducing furnaces. These fillers were found to be compatible and work well to form a non-gelling paint with the zinc dust which was non-gassing and gave a hard, protective film when properly compounded. Since zinc dust is getting quite expensive and in short supply, these neutral type fillers often can be used as a substantial volume proportion to cut costs and yet not produce a vastly inferior coating.

c. To 2250 lbs. of Binder A was added, with heat to 60°C., 900 lbs. of 2 ethoxyethanol and 500 lbs. of a 22% solution of polyvinyl butyral (molecular weight 50,000) in a 2-ethoxyethanol solvent. The resultant product on cooling produced a very stable binder which, when used in proportions of 2 to 6 parts zinc dust/part binder, gave excellent zinc coatings. A small amount of zinc chloride (0.1 to 20 g. per gallon added as a solution in 2-ethoxyethanol produced coatings that hardened more rapidly, particularly when aluminum oxide (hydrated or calcined) was also present in the zinc paint medium. Excessive zinc chloride or zinc oxide, together cause gassing as often as does moisture added to the mix after the zinc has been added. It is preferable to expose any moisture containing solvents and fillers to the polyol silicate binder prior to adding the zinc dust, since the binder often reacts with any moisture to make the system anhydrous. The presence of alumina, particularly hydrated alumina, magnesium silicates, etc., absorbs acidic materials from the mix and extends the lift of the single-package formulations. By increasing the percentage of hydrocarbon, the settling and lumping of the zinc may be decreased. It should be noted that dilution with mono-functional OH compounds is necessary when considerable polymerizing butyral is heated to prevent gellation.

d. In place of the 2 ethoxyethanol used in c) above, either or both xylene or ethyl benzene was used to give a good paint having rapid curing properties.

e. To 10 lbs. of the binder product from c) was added 10 lbs. of 22% polyvinyl butyral in 2-ethoxyethanol, and 10 lbs. of xylene and 6 lbs. of ethyl alcohol were mixed with 36 lbs. of zinc dust to give a permanently stalbe zinc dust paint which gave a flexible coating on curing which would even adhere to an epoxy-zinc or organic coating, and yet give added protection to the steel surface underneath. This binder had 5% silica and a pH of 4 to 6. The coating composite underwent mild forming operations without substantial cracking or peeling, and when applied to mildly sand- or shot-blasted cold rolled steel and cured, underwent even the most severe forming operations without peeling or cracking.

f. To the binder product of e) (without zinc) was added 2% by weight of methylated melamine-formaldehyde polymer and various amounts of zinc dust added - from ratios of 1/1 to 3/1 zinc to liquid. The coatings were heat-cured in about 30 seconds at 70°C. and were particularly good for use on substrates in which fast heat curing is possible. The coatings were exceptionally good for underwater use.

g. In the above examples, suspending agents 2% bentone, 1 to 2% hydroxyl propyl cellulose, minor amounts of attapulgus clay, fibrous asbestos and hydrated alumina were very useful in various combinations or singly to provide excellent, well suspended zinc paints. The addition of minor amounts of suspending agent helpers such as quaternary ammonium compounds, amides, amines may help the suspension be more lasting.

h. Similar binders were made as in using glycerol, pentaerithritol and sorbitol in the proper range of OH in the polyol to ester-exchangeable grouping on the silicate and found to be suitable for paints.

i. Binder A was mixed with 3, 4, 5, and 6 weight parts of 150 mesh (and finer) tabular alumina and found to produce excellent, hard, heat-proof coatings which were found to be useful for mold surfaces for casting of steel, resistors and electronic components. Color coatings were made by adding minor amounts (½ to 10 weight percent of cobalt aluminate (blue), chrom oxide (green), iron oxide (red) or $TiO_2$ (white), and in addition, minor amounts of silanes were added to improve the water repulsion characteristics and increase the dielectric properties. The above ceramic coatings were found to be stable for years. The addition of as little as a small fraction of a percent of fibrous asbestos or bentone 27 prevented settling of these paints, and improved ease of application, sag, evenness in application and drying characteristics.

j. Binder A was mixed (diluted) with 1% water and found to work well in the above formulations curing more rapidly but being more susceptible to gelling and gassing if gel promoting agents were present, and having a lower pot and shelf life, although satisfactory for most applications.

k. This formulation is considered to be the optimum for cost, shelf stability, non-settling, rapid cure to an exceptionally hard coating and relative ease of use. Note that the base formulation does not include suspending agents - bentone - which improves the characteristics:

250 g. Binder A
20 g. Hydrated alumina (extremely finely divided)
3 g. 30% Zinc chloride in 2 ethoxyethanol solvent
5 g. Polyethylene glycol 600
700 g. Zinc dust
100 g. Fine (1 to 10 micron) Novaculite flour where mixed together and sealed in a paint can for 3 years and retested, found to be easily shaken or stirred into a homogeneous paint mix, having no gas or lumps and which made a very hard adhesive, rapid-curing coating. Aluminas, and particularly hydrated alumina, are very desirable as diluents for the zinc dust to neutralize excess acid and extend the pot life with zinc and other fillers. The combination with zinc chloride and other metal acid chloride or other metal acid salts in combination with the hydrated alumina gives a more rapidly curing coating. Using the same formula above, a second paint was made, but 10 g. bentonite and 100 ml. ethyl benzene were gelled and dispersed in the liquid vehicle prior to adding the zinc chloride and other ingredients without alumina.

EXAMPLE LXV

Binder B was made as follows: 1000 lbs. of tetraethyl ortho silicate and 450 lbs. of ethylene glycol were heated with ½ lb. concentrated (37%) hydrochloric acid and 450 lbs. alcohol were distilled therefrom to yield a viscous silicate product having a silica content of 24%. This product was made into the following binders and paint products:

a. 20 lbs. of Binder B was mixed with 10 lbs. polyvinyl butyral (30% in MEK), 10 lbs. of methyl alcohol, and 50 lbs. MEK. The binder was stable and when 1 weight portion was mixed with 1.1 weight parts of zinc dust, there was formed a stable, single-package paint product with excellent shelflife and an application to a substrate and curing gave a flexible, zinc silicate coating.

b. The same fillers in Example LXIV were found suitable in this example substituting Binder B, as are the same solvents and pigments. The Binder B paint, however, was more stable in single component paints with less monofunctional compounds present since there are fewer reactive sites for crosslinking.

c. A variety of neutral organic solvents, including alcohols, alkoxyalkanols and hydrocarbons with boiling points up to 210°C. were added to Binder B and found to be satisfactory as solvents. Included are also solvents such as liquid propane, being used as a cosolvent with a more polar solvent to dissolve and propel the zinc containing filler and organic polyol silicate paint from an aerosol container, ready for usage in the field, aboard ship, inn maintenance touch-up work and in the home.

EXAMPLE LXVI

Two Binders C and D were prepared and shown very useful in this example. Binder C was prepared by heating to about 90°C. 200 g. ethylene glycol, 340 g. ethyl silicate 40, 20 g. 2 ethoxyethanol and ½ ml. of 37% hydrochloric acid. Similar binders were prepared using 50 and 100 grams of ethylene glycol instead of 200 grams and were satisfactory but not as good as the 200 gram-derived product in coating and gelling formulations. Binder D was prepared identically to Binder C except that after reaction, 12 g. of polyalkanol amine silicate (the reaction product by ester-exchange of 1 mole diethanol amine and 1 mole tetraethyl ortho silicate was added.

Binders C and D are indefinitely stable by themselves or in anhydrous environments; however, Binder C is self-gelling in the presence of moisture and a basic material, whether the basic material be present in a filler or added with the moisture or prior to moisture, and cured when exposed to moisture either as a thin film exposed to air, moisture or by adding a small amount of water to cure or gel the mix. Fillers may be added prior to the gelling to form ceramic shapes. Binder D cures simply on exposure to minor amounts of moisture on a thin film or a mixture of filler and Binder D together to form a self-curing coating. Particularly good fillers are alumina, silica, chrome oxide, zircon, zinc dust, aluminum silicates and the like. Both binders C and D are inexpensive and very useful for making zinc dust silicate coatings (single or multi-package) according to this invention.

The advantages of the systems are the versatility of self-curing and that coating formulations can be so compounded and adjusted to give reproducible curing times, which cure extremely rapidly when applied as a refractory or filler containing slurry as a film on a metal surface or a mold or other substrate. Binder C can be gelled as desired with various gel agents, including moisture and ammonia, ammonia water, ammonium acetate, carbonate or lactate water solutions, or using a mildly basic filler which acts as the base to cure or gel the slurry in the presence of moisture. The amount of moisture or aqueous solutions of base, controls the time required to gel. It is often advantageous to gel the mix in the presence of considerable filler, homogeneously dispersed in the binder, either as a coating or to form a solid ceramic shaped material in a pattern mold therefore. Once poured as a liquid slurry into a shaped pattern mold and gelled (cured), the remaining solvent can be allowed to evaporate, if necessary, or the ceramic material heated to drive off the remaining organic materials to form a totally ceramic material having the shape so cast and formed into a mold. The molds so formed are useful in many high temperature applications. Their advantage over conventional molds are less shrinkage due to syneresis, more reproducible and controllable curing times, controlled by the amount of water added, greater green strength, and lower fired strength which allows easy removal of the mold after casting of steel therein, particularly where thin delicate steel castings are made which tear and crack if the mold is too strong, and ease of use — since they are permanent, one component slurries and can be gelled at will be added moisture or gel agents. If 2-package systems are used and the binder and gel agent are mixed prior to adding the refractory filler, the system has the added advantage that the binder itself has an indefinate stability — ready for use at any time for years. Refractories include alumina, fused silica, zircon, mullite, clays, and other well known refractories.

The system is also adaptable for ceramic shell molding, which is building up of multiple self-curing ceramic coatings on a disposable pattern material of the shape desired to form the molds thereof, then removal of the pattern material and firing the mold prior to pouring metal therein to form a casting of the exact configuration of the disposable patterns.

To demonstrate the advantages of the weakly basic amine stabilizing agent, the following examples have been carried out.

EXAMPLE LXVII

To make the glycol silicate binder, the following reactants are heated to 100°C. while mixing: 58.9 wt. % Ethyl polysilicate 40, 36.62 wt. % ethylene glycol, 4.4 wt. % 2-ethoxyethanol, 0.08 wt. % hydrochloric acid (37%). The above reactants form a product called No. 42-3 with the following properties: 25% silica as $SiO_2$, gravity 1.074 at 23°C., refractive index (at 23°C.) 1.4131, % hydrolysis 42%, and stability at 20°-28°C. over 3-½ years.

In making a single package paint using binder No. 42-3, 8 wt. parts montmorillonite and 100 wt. parts of toluene are highly sheared together and the following ingredients are blended in the following sequence: 100 wt. parts 2-ethoxyethanol, 200 wt. parts of 42-3 (the above binder), 5 wt. parts 2-methyl pyrimidine, and 1000 wt. parts zinc dust, 2-20 microns. The paint product cured dry to touch in 5 minutes, hard in one hour, and had exceptional life in a salt fog atmosphere (3+ mil over 3 months). The paint remained sealed without serious deleterious effects of gassing, or agglomeration and cementation of the zinc dust particles to form lumps or a hard layer on the bottom of the can.

In making another single package paint, 8 wt. parts montmorillonite and 100 wt. parts toluene are highly sheared together, and the following ingredients are added in sequence: 60 wt. parts 2-ethoxyethanol, 10 wt. parts 2-methyl pyrimidine, and 500 wt. parts zinc dust. The paint product cured dry to touch in 5 minutes, hard in one hour and had exceptional life in a salt fog atmosphere at 95°F., 5% salt fog (similar to the ASTM procedure), at 3+ mils [dry film thickness], and lasting over 3 months. The paint remained non-gassing and in an easy to use form while sealed in a can, yet when opened it was easy to mix and had not thickened appreciably and gave a good, fast curing coating.

EXAMPLE LXVIII (EXPERIMENT 65-1)

A binder was made from 100 wt. parts of the No. 42-3 binder and 5 wt. parts pyridine (binder 66-1). To make the paint, I mixed 20 wt. parts of 66-1 binder, 10 wt. parts denatured alcohol and 100 g. zinc dust. Coatings of this composition were applied to cleaned rolled steel panels to yield extremely hard coatings when cured, but slightly mud-cracked. In a similar experiment the pyridine was reduced to 1/5 of this amount and produced a stable composition giving better coatings with less mud cracking.

EXAMPLE LXIX

Experiment No. 65-2: Experiment 65-1 was repeated using benzozothiazole instead of pyridine. A 3 mil film was applied to a cold rolled, cleaned steel panel and found to cure to a hard, adhesive useful and protective coating.

Experiment No. 65-3: Same as 65-2 above except picoline was substituted for pyridine. Same application and results were as above in 65-2.

Experiment No. 65-4: Experiment 65-1 was repeated while using N-methyl-2-pyrrolidone instead of pyridine with similar results as above in 65-2.

Experiment No. 65-5: Experiment 65-1 was repeated using 8-hydroxy quinoline instead of pyridine. Using the same applications procedure as in 65-2, similar hard, adhesive zinc silicate coatings were produced and the paint was nongassing and easy to mix.

Experiment No. 64-2: A stabilizer-curing-accelerator was made by heating 90 wt. parts of Ethyl polysilicate 40, 50 wt. parts of triethylanol amine and 70 wt. parts of 2-ethoxyethanol to a temperature of about 120°C. The resulting product which is an accelerator, is stable at room temperature 20°–280°C. for at least 3 years. The following were mixed together to form a coating paint, 10 wt. parts of above accelerator, 200 wt parts of binder 42-3, 100 wt. parts ethylbenzene, 12 wt. parts montmorillonite, 800 wt. parts zinc dust (2–10 microns), 200 wt. parts of alumina, and 50 wt. parts of iron phosphide (submicron and micron size). The mix was stable for 8 months when sealed in a can, yet gave a highly superior coating which had a hardness of 6H, was 100% adhesive (with cross-hatch test using ⅛ in. squares) and gave good protection in salt fog testing as compared to conventional zinc silicate paint after exposure for 2 months at 95°F. in 5% salt fog testing at over 3 mil thickness (dry) film.

It is claimed:

1. An essentially anhydrous polyol silicate composition consisting essentially of solvent-soluble, polyol silicate ester-exchange reaction product of (1) silicate consisting essentially of a member selected from the group consisting of (a) ortho silicates having ester-exchangeable groups of 1 to 6 carbon atoms selected from the group consisting of alkyl, hydroxyalkyl, alkoxyalkyl and hydroxyalkoxyalkyl; (b) siloxanes of (a); and (c) mixtures of (a) and (b); with the proviso that when (1) is (a), (1) has one or more groups selected from the group consisting of hydroxyalkyl, alkoxyalkyl or hydroxyalkoxyalkyl; and (2) aliphatic polyol which is esterexchangeable with (1) said reaction product being made by reacting (1) and (2) in amounts providing a ratio of hydroxyl groups of (2) of about 0.15 to 1.8 moles per mole of ester-exchangeable group of (1); and said reaction product being in a liquid organic solvent.

2. A composition of claim 1 in which (1) is siloxane having up to about 7 siloxane groups per average molecule and the solvent consists essentially of alkoxyalkanol in molar excess based on the ester-exchangeable groups of the reaction product.

3. A composition of claim 1 wherein the solvent has as an essential component a member selected from the group consisting of methyl ketones other than acetone, alkoxyalkanols, alkanols, hydrocarbons, and mixtures thereof.

4. A composition of claim 1 in which the reaction product is free of the major portion of alcohol formed in said ester-exchange reaction.

5. A composition of claim 4 wherein the mole ratio of hydroxyl groups provided by (2) is about 0.35 to 1.5 per mole of ester-exchangeable groups of (1).

6. A composition of claim 1 in which (1) is tetraalkoxyalkyl silicate, mixed silicates having alkyl and alkoxyalkyl groups, siloxanes thereof or of tetraalkyl silicate, having up to about 10 SiO groups per average molecule, and mixtures thereof.

7. A composition of claim 1 which contains an acidic zinc salt catalyst.

8. A composition of claim 1 in which (2) is ethylene glycol and (1) is tetraalkoxyalkyl silicate, mixed silicates having alkyl and alkoxyalkyl groups, siloxanes thereof or of tetraalkyl silicate, having up to about 10 SiO groups per average molecule, and mixtures thereof.

9. A composition of claim 8 in which ester-exchangeable groups of (1) are ethyl or ethoxyethyl.

10. A composition of claim 9 which is in a solvent consisting essentially of ethoxyethanol and in which the ester-exchangeable groups of (1) are predominantly ethoxyethyl.

11. A composition of claim 10 having filler therein selected from the group consisting of finely-divided silica, metal oxides and metal silicates.

12. A composition of claim 11 in which the filler contains one or more of talc, alumina and zinc oxide in an amount sufficient to improve the curing properties of the composition.

13. A composition of claim 11 which contains an acid zinc salt curing catalyst for the composition.

14. A method of making essentially anhydrous glycol silicate product which comprises conducting in the presence of an acidic catalyst, an ester-exchange reaction between (1) silicate consisting essentially of ortho silicate having alkyl or alkoxyalkyl groups of 1 to 6 carbon atoms, and (2) aliphatic diol, said reaction product being made by reacting (1) and (2) in amounts providing a ratio of above 1.8 moles of hydroxyl groups of (2) per mole of ester-exchangeable group of (1) to obtain a substantially non-gelled intermediate product having the formula $(HOMO)_4Si$ in which M is the aliphatic diol minus two hydroxyl groups, reacting said intermediate product with (1) in the presence of an acidic catalyst to obtain a solvent-soluble product, the ratio of ester-exchangeable group of (1) present during said latter reaction being about 0.2 to 11 moles per mole of hydroxyl group of said intermediate.

15. The method of claim 14 in which (2) is ethylene glycol.

16. The method of claim 15 in which (1) is tetraethyl silicate.

17. The method of claim 14 in which the ratio of hydroxyl groups provided by (2) per mole of ester-exchangeable group of (1) is greater than 4:1.

18. The method of claim 17 in which the reaction of (1) and (2) is conducted until the reaction mixture is semi-solid.

19. The method of claim 18 in which the ratio of ester-exchangeable groups of (1) is about 0.3 to 5 moles per mole of hydroxyl group of said intermediate present in the latter reaction.

20. An essentially anhydrous polyol silicate product consisting essentially of solvent-soluble polyol silicate ester-exchange reaction product of (1) silicate consisting essentially of a member selected from the group consisting of (a) ortho silicates having ester-exchangeable groups of 1 to 6 carbon atoms selected from the group consisting of alkyl, hydroxyalkyl, alkoxyalkyl and hydroxyalkoxyalkyl; (b) siloxanes of (a); and (c) mixtures of (a) and (b); with the proviso that when (1) is (a), (1) has one or more groups selected from the group consisting of hydroxyalkyl, (a) alkoxyalkyl or hydroxyalkoxyalkyl; and (2) aliphatic polyol esterexchangeable with (1), said reaction product being made by reacting (1) and (2) in amounts providing a ratio of hydroxyl groups of (2) of about 0.15 to 1.8 moles per mole of ester-exchangeable group of (1).

21. A product of claim 20 in which ester-exchangeable groups of (1) are alkyl or alkoxyalkyl.

22. A product of claim 21 in which (2) is selected from the group consisting of ethylene glycol, propylene glycol and glycerol.

23. A product of claim 22 in which the ester-exchange reaction is acid-catalyzed and is conducted at a temperature of about 50° to 160°C.

24. A product of claim 20 which contains a zinc acid salt curing catalyst.

25. A product of claim 20 which contains one or more of talc, alumina and zinc oxide in an amount sufficient to improve the curing properties of the composition.

26. A product of claim 25 which contains a zinc acid salt curing catalyst.

27. A product of claim 20 in which said ratio is about 0.3 to 1.5:1.

28. A product of claim 20 in which the ester-exchange reaction is acid-catalyzed.

29. A product of claim 28 in which the esterexchange reaction is at a temperature of about 50° to 160°C.

30. A product of claim 29 in which (2) is ethylene glycol and (1) has ester-exchangeable groups which are ethyl or ethoxyethyl.

31. An essentially anhydrous polyol silicate product consisting essentially of solvent-soluble, polyol silicate ester-exchange reaction product of (1) silicate consisting essentially of a member selected from the group consisting of ortho silicates having ester-exchangeable groups of 1 to 6 carbon atoms selected from the group consisting of alkyl, hydroxyalkyl, alkoxyalkyl and hydroxyalkoxyalkyl, siloxanes thereof and their mixtures, and (2) aliphatic polyol ester-exchangeable with (1) and consisting essentially of a member selected from the group consisting of diethanol amine and triethanol amine, said reaction product being made by reacting (1) and (2) in amounts providing a ratio of hydroxyl groups of (2) of about 0.15 to 1.8 moles per mole of ester-exchangeable group of (1), said esterexchange reaction being conducted at a temperature of about 50° to 160°C.

32. A product of claim 31 in which said esterexchangeable groups of (1) are alkyl or alkoxyalkyl.

33. A product of claim 32 in which said esterexchangeable groups are ethyl or ethoxyethyl.

34. A product of claim 31 in which the ratio of hydroxyl groups provided by (2) is about 0.35 to 1.5 moles per mole of ester-exchangeable group of (1).

35. An essentially anhydrous polyol silicate product consisting essentially of solvent-soluble, polyol silicate esterexchange reaction product of (1) silicate consisting essentially of a member selected from the group consisting of ortho silicates having ester-exchangeable groups of up to 6 carbon atoms selected from the group consisting of alkyl, hydroxyalkyl, alkoxyalkyl and hydroxyalkoxyalkyl, said groups being predominantly alkoxyalkyl groups, siloxanes thereof and their mixtures, and (2) aliphatic polyol ester-exchangeable with (1), said reaction product being made by reacting (1) and (2) in amounts providing a ratio of hydroxyl groups of (2) of about 0.15 to 1.8 moles per mole of ester-exchangeable group of (1).

36. A product of claim 35 in which said ester-exchangeable groups are predominantly ethoxyethyl.

37. A product of claim 36 in which the ratio of hydroxyl groups provided by (2) is about 0.35 to 1.5 moles per mole of ester-exchangeable group of (1), the esterexchange reaction is acid-catalyzed and conducted at a temperature of about 50° to 160°C.

38. An essentially anhydrous polyol silicate composition consisting essentially of solvent--soluble, polyol silicate ester-exchange reaction product of (1) silicate consisting essentially of siloxane of ortho silicate having esterexchangeable groups of 1 to 6 carbon atoms selected from the group consisting of alkyl, hydroxyalkyl, alkoxyalkyl and hydroxyalkoxyalkyl, and (2) aliphatic polyol which is esterexchangeable with (1) said reaction product being made by reacting (1) and (2) in amounts providing a ratio of hydroxyl groups of (2) of about 0.15 to 1.8 moles per mole of ester-exchangeable group of (1).

39. A composition of claim 38 wherein the mole ratio of hydroxyl groups provided by (2) is about 0.35 to 1.5 per mole of ester-exchangeable groups of (1).

40. The composition of claim 38 in which ester-exchangeable groups of (1) are alkyl or alkoxyalkyl.

41. The composition of claim 40 in which said esterexchange reaction product is in a solvent selected from the group consisting of alkoxyalkanol, alkanol, hydrocarbon, and mixtures thereof.

42. The composition of claim 41 in which (1) is a siloxane having up to about 7 SiO groups per average molecule.

43. A composition of claim 42 in which (2) is ethylene glycol.

44. A product of claim 38 in which the ester-exchange reaction is acid-catalyzed.

45. A product of claim 44 in which the esterexchange reaction is at a temperature of about 50° to 160°C.

46. A product of claim 45 in which (2) is ethylene glycol and (1) has ester-exchangeable groups which are ethyl or ethoxyethyl.

47. A product of claim 46 which contains a sufficient amount of zinc oxide to improve the curing properties of the composition.

48. A product of claim 46 which contains zinc acid salt curing catalyst.

49. An essentially anhydrous polyol silicate product consisting essentially of solvent-soluble polyol silicate, acidcatalyzed, ester-exchange reaction product of (1) silicate consisting essentially of a member selected from the group consisting of ortho silicates having ester-exchangeable groups of 1 to 6 carbon atoms selected from the group consisting of alkyl, hydroxyalkyl, alkoxyalkyl and hydroxyalkoxyalkyl, the siloxanes thereof, and their mixtures, and (2) aliphatic polyol selected from the group consisting of ethylene glycol, propylene glycol and glycerol, said reaction product being made by reacting (1) and (2) in amounts providing a ratio of hydroxy groups of (2) of about 0.35 to 0.9 mole per mole of ester-exchangeable group of (1).

50. A product of claim 49 in which the esterexchange reaction is at a temperature of about 50° to 160°C.

51. A product of claim 50 in which (2) is ethylene glycol.

52. A product of claim 51 in which (1) has esterexchangeable groups which are ethyl or ethoxyethyl.

53. A product of claim 52 which contains a zinc acid salt curing catalyst.

54. A product of claim 53 which contains one or more of talc, alumina and zinc oxide in an amount sufficient to improve the curing properties of the composition.

55. An essentially anhydrous polyol silicate composition consisting essentially of solvent-soluble, polyol silicate esterexchange reaction product of (1) silicate consisting essentially of a member selected from the group consisting of ortho silicates having ester-exchangeable groups of 1 to 6 carbon atoms selected from the group consisting of alkyl, hydroxyalkyl, alkoxyalkyl and hydroxyalkoxyalkyl, siloxanes thereof and their mixtures, and (2) aliphatic polyol which is ester-exchangeable with (1) said reaction product being made by reacting (1) and (2) in amounts providing a ratio of hydroxyl groups of (2) of about 0.15 to 1.8 moles per mole of ester-exchangeable group of (1); and a minor, stabilizing amount of unsaturated heterocyclic amine.

* * * * *

UNITED STATES PATENT AND TRADEMARK OFFICE
CERTIFICATE OF CORRECTION

PATENT NO. : 3,932,339

DATED : January 13, 1976

Page 1 of 2

INVENTOR(S) : GORDON D. McLEOD

It is certified that error appears in the above-identified patent and that said Letters Patent are hereby corrected as shown below:

In the ABSTRACT, second column, line 17, delete "to" and insert therefor --or--.

In the ABSTRACT, second column, line 8 from bottom, delete "to" and insert therefor --or--.

Column 3, line 8, correct the spelling of --fast-curing--.

Column 5, line 2, delete the first "be" in the sentence.

Column 11, line 63, delete "of" at end of line.

Column 17, line 2, correct the spelling of --where--.

Column 19, in the formula, after the second "Si" insert a --left parenthesis--, and after the third "Si" insert a --hyphen--.

Column 19, line 26, delete "or" and insert therefor --of--.

Column 19, line 62, after "be" insert --made--.

Column 19, line 65, delete "of" and insert therefor --or--.

Column 20, line 26, in the formula after the arrow, insert a --left parenthesis-- between "Si" and "OMO".

Column 20, line 30, delete "of" at end of line and insert therefor --or--.

UNITED STATES PATENT AND TRADEMARK OFFICE
CERTIFICATE OF CORRECTION

PATENT NO. : 3,932,339
DATED : January 13, 1976
INVENTOR(S) : GORDON D. McLEOD

It is certified that error appears in the above-identified patent and that said Letters Patent are hereby corrected as shown below:

Column 20, line 36, after "polyol" delete "or" and insert therefor -- to --.

Column 22, line 42, after "over" insert -- about --.

Column 28, line 11, delete "of" and insert therefor -- or --.

Column 33, line 2, delete "200" and insert therefor -- 2000 --.

Column 34, line 18, put quotation marks around -- "condensed" --.

Column 35, line 18, correct the spelling of -- converted --.

Column 58, line 43, delete "56D" and insert therefor -- 46D --.

Claim 11, line 1, delete "10" and insert therefor -- 9 --.

Claim 13, line 1, delete "11" and insert therefor -- 12 --.

Signed and Sealed this

Fifth Day of October 1976

[SEAL]

Attest:

RUTH C. MASON
*Attesting Officer*

C. MARSHALL DANN
*Commissioner of Patents and Trademarks*